(12) United States Patent
Bednarowicz et al.

(10) Patent No.: US 10,643,067 B2
(45) Date of Patent: May 5, 2020

(54) SYSTEM AND METHOD OF HANDWRITING RECOGNITION IN DIAGRAMS

(71) Applicant: MyScript, Nantes (FR)

(72) Inventors: Romain Bednarowicz, Nantes (FR); Robin MéLinand, Nantes (FR); Claire Sidoli, Nantes (FR); Fabien Ric, Nantes (FR); Khaoula Elagouni, Nantes (FR); David Hebert, Nantes (FR); Fabio Valente, Nantes (FR); Gregory Cousin, Nantes (FR); Maël Nagot, Nantes (FR); Cyril Cerovic, Nantes (FR); Anne Bonnaud, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 14/955,155

(22) Filed: Dec. 1, 2015

(65) Prior Publication Data
US 2017/0109578 A1    Apr. 20, 2017

(30) Foreign Application Priority Data
Oct. 19, 2015 (EP) ..................... 15290271

(51) Int. Cl.
*G06K 9/00* (2006.01)
*G06F 17/27* (2006.01)
(Continued)

(52) U.S. Cl.
CPC ..... *G06K 9/00476* (2013.01); *G06F 3/04883* (2013.01); *G06F 16/353* (2019.01);
(Continued)

(58) Field of Classification Search
None
See application file for complete search history.

(56) References Cited

U.S. PATENT DOCUMENTS 5,847,712 A * 12/1998 Salesin ................. G06T 11/001
345/428
5,867,596 A    2/1999 Kano et al.
(Continued)

FOREIGN PATENT DOCUMENTS

EP    1973063    1/2011

OTHER PUBLICATIONS

"Alan Kay Demos GRaIL", dated Jan. 18, 2009. URL: https://youtube.com/watch?v=QQhVQ1UG6aM.
(Continued)

*Primary Examiner* — Shervin K Nakhjavan
(74) *Attorney, Agent, or Firm* — McDermott Will & Emery LLP

(57) ABSTRACT

A system, method and computer program product for hand-drawing diagrams including text and non-text elements on a computing device are provided. The computing device has a processor and a non-transitory computer readable medium for detecting and recognizing hand-drawing diagram element input under control of the processor. Display of input diagram elements in interactive digital ink is performed on a display device associated with the computing device. One or more of the diagram elements are associated with one or more other of the diagram elements in accordance with a class and type of each diagram element. The diagram elements are re-displayed based on one or more interactions with the digital ink received and in accordance with the one or more associations.

16 Claims, 88 Drawing Sheets

(51) Int. Cl.
  *G06T 11/20* (2006.01)
  *G06F 3/0488* (2013.01)
  *G06F 16/35* (2019.01)
  *G06K 9/22* (2006.01)

(52) U.S. Cl.
  CPC ..... *G06F 17/2705* (2013.01); *G06K 9/00402* (2013.01); *G06K 9/00416* (2013.01); *G06K 9/00436* (2013.01); *G06K 9/222* (2013.01); *G06T 11/206* (2013.01)

(56) References Cited

U.S. PATENT DOCUMENTS

| | | | |
|---|---|---|---|
| 6,525,749 B1 | 2/2003 | Moran et al. | |
| 6,647,145 B1* | 11/2003 | Gay | G06F 3/03545 178/18.01 |
| 7,218,779 B2 | 5/2007 | Dodge | G06F 3/04883 382/177 |
| 7,298,903 B2 | 11/2007 | Wang et al. | |
| 7,324,691 B2 | 1/2008 | Li et al. | |
| 7,330,184 B2 | 2/2008 | Leung | |
| 7,352,902 B2 | 4/2008 | Li et al. | |
| 7,394,935 B2 | 7/2008 | Chen et al. | |
| 7,440,616 B2 | 10/2008 | Li et al. | |
| 7,496,232 B2 | 2/2009 | Bishop et al. | |
| 7,616,333 B2 | 11/2009 | Wakeam et al. | |
| 7,904,810 B2 | 3/2011 | Chen et al. | |
| 7,945,097 B2 | 5/2011 | Biswas et al. | |
| 8,014,607 B2 | 9/2011 | Saund et al. | |
| 8,316,299 B2* | 11/2012 | Asaka | G06F 3/0488 715/716 |
| 8,718,375 B2 | 5/2014 | Ouyang et al. | |
| 8,782,549 B2* | 7/2014 | Ouyang | G06F 3/0236 715/773 |
| 9,171,204 B2* | 10/2015 | Acharya | G06K 9/3283 |
| 10,048,824 B2* | 8/2018 | Jung | G06F 3/0481 |
| 2003/0007683 A1* | 1/2003 | Wang | G06K 9/00456 382/159 |
| 2003/0215145 A1 | 11/2003 | Shilman et al. | |
| 2004/0155869 A1* | 8/2004 | Robinson | G06F 3/0219 345/168 |
| 2004/0252888 A1* | 12/2004 | Bargeron | G06K 9/222 382/188 |
| 2005/0063592 A1 | 3/2005 | Li et al. | |
| 2005/0063594 A1 | 3/2005 | Li et al. | |
| 2006/0061780 A1 | 3/2006 | Chen et al. | |
| 2006/0098871 A1* | 5/2006 | Szummer | G06K 9/00422 382/173 |
| 2006/0210173 A1* | 9/2006 | Jurion | G06K 9/00436 382/229 |
| 2006/0218171 A1 | 9/2006 | Wakeam et al. | |
| 2008/0195931 A1* | 8/2008 | Raghupathy | G06K 9/00402 715/230 |
| 2008/0232690 A1 | 9/2008 | Saund et al. | |
| 2014/0177962 A1 | 6/2014 | Torgerson | |
| 2014/0313216 A1 | 10/2014 | Steingrimsson | |
| 2014/0325435 A1* | 10/2014 | Jung | G06F 3/04845 715/790 |
| 2015/0206005 A1* | 7/2015 | Jung | G06K 9/00402 382/189 |
| 2017/0068868 A1* | 3/2017 | Carbune | G06K 9/222 |
| 2017/0109578 A1* | 4/2017 | Bednarowicz | G06K 9/00476 |

OTHER PUBLICATIONS

International Search Report for Related Application No. PCT/EP2016/001720, dated Jan. 20, 2017, EPO—Internal, WPI Data.
Plimmer et al., "Beautifying sketching-based design tool content: Issues and experiences," 6th Australasian User Interface Conference, 2005.
Wang et al., "Exploring sketch beautification techniques," CHINZ'05, Jul. 2005, pp. 15-16.
Fiser et al., "Shipshape: A drawing beautification assistant," The Eurographics Association 2015.

\* cited by examiner

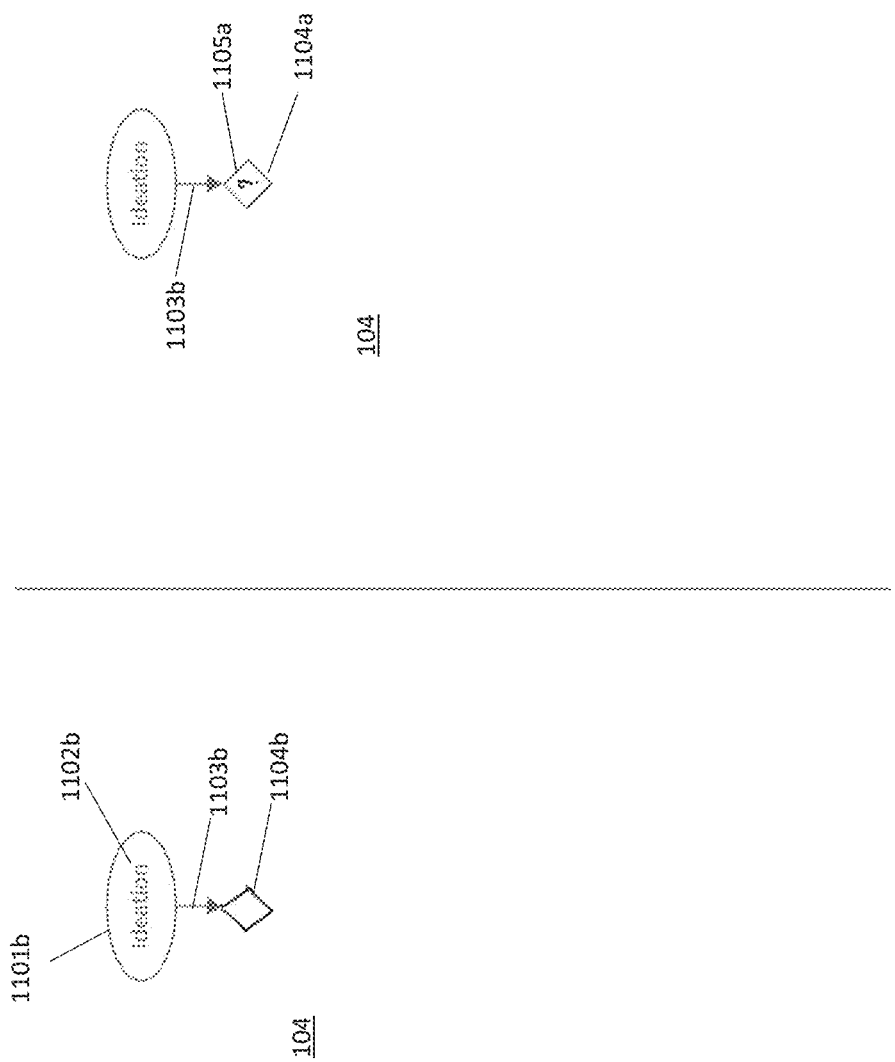

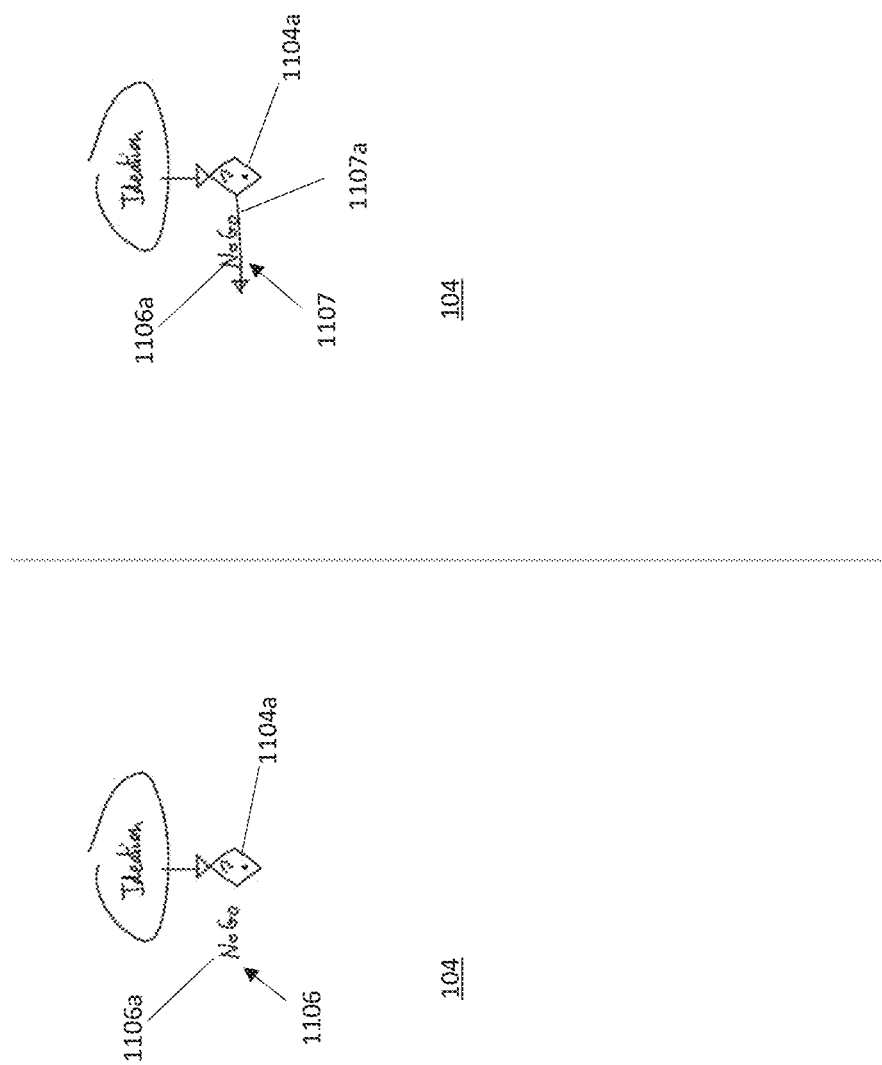

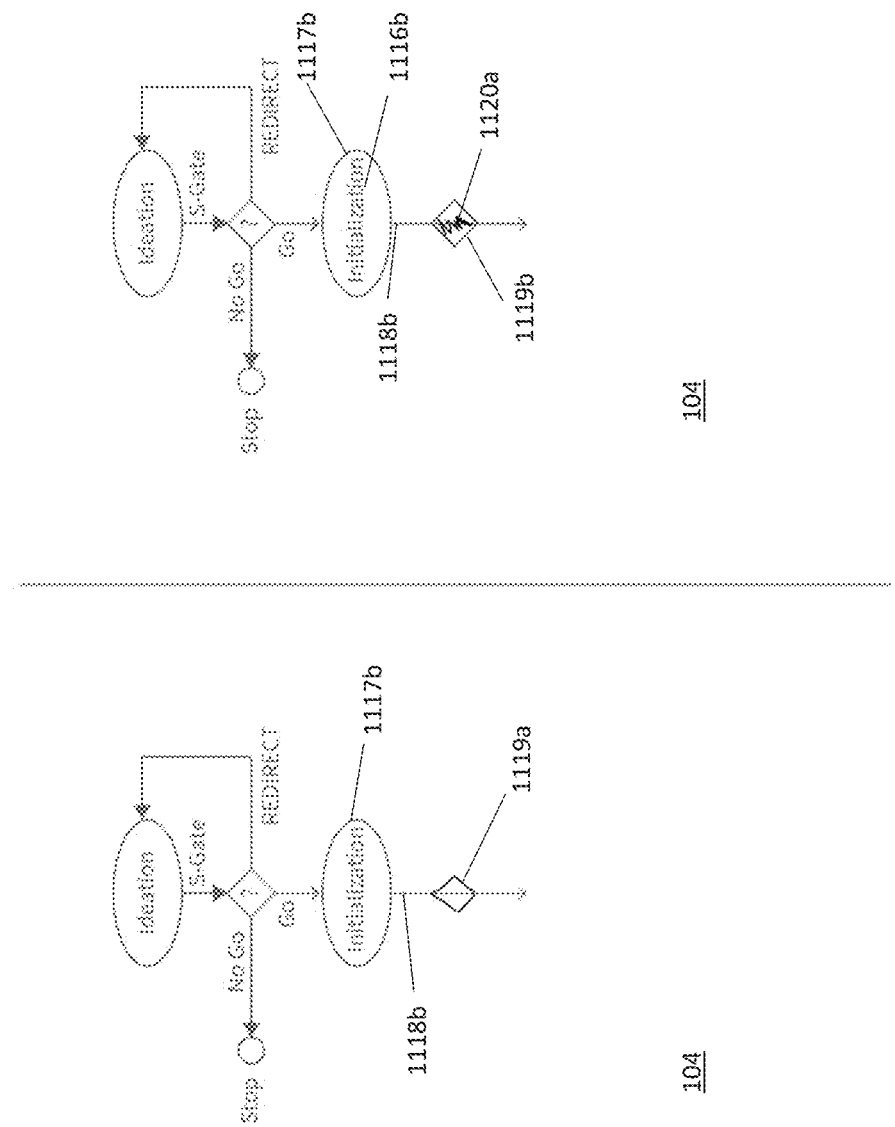

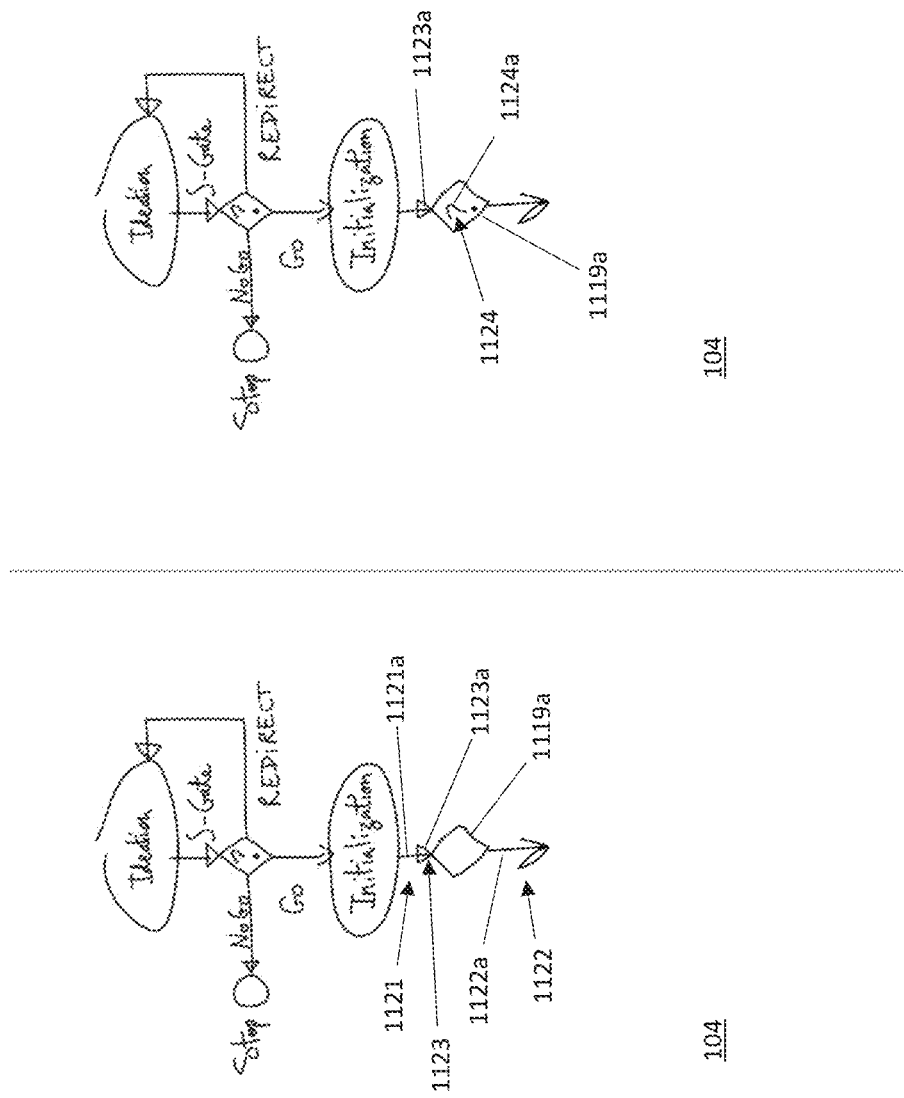

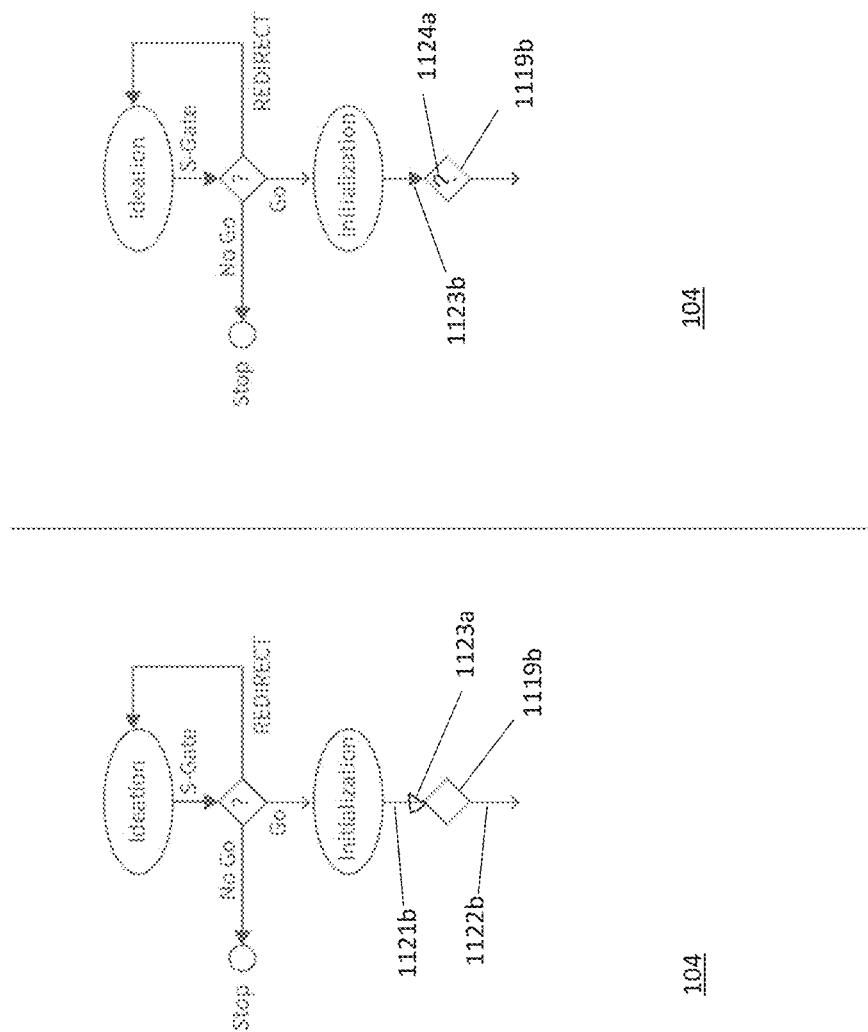

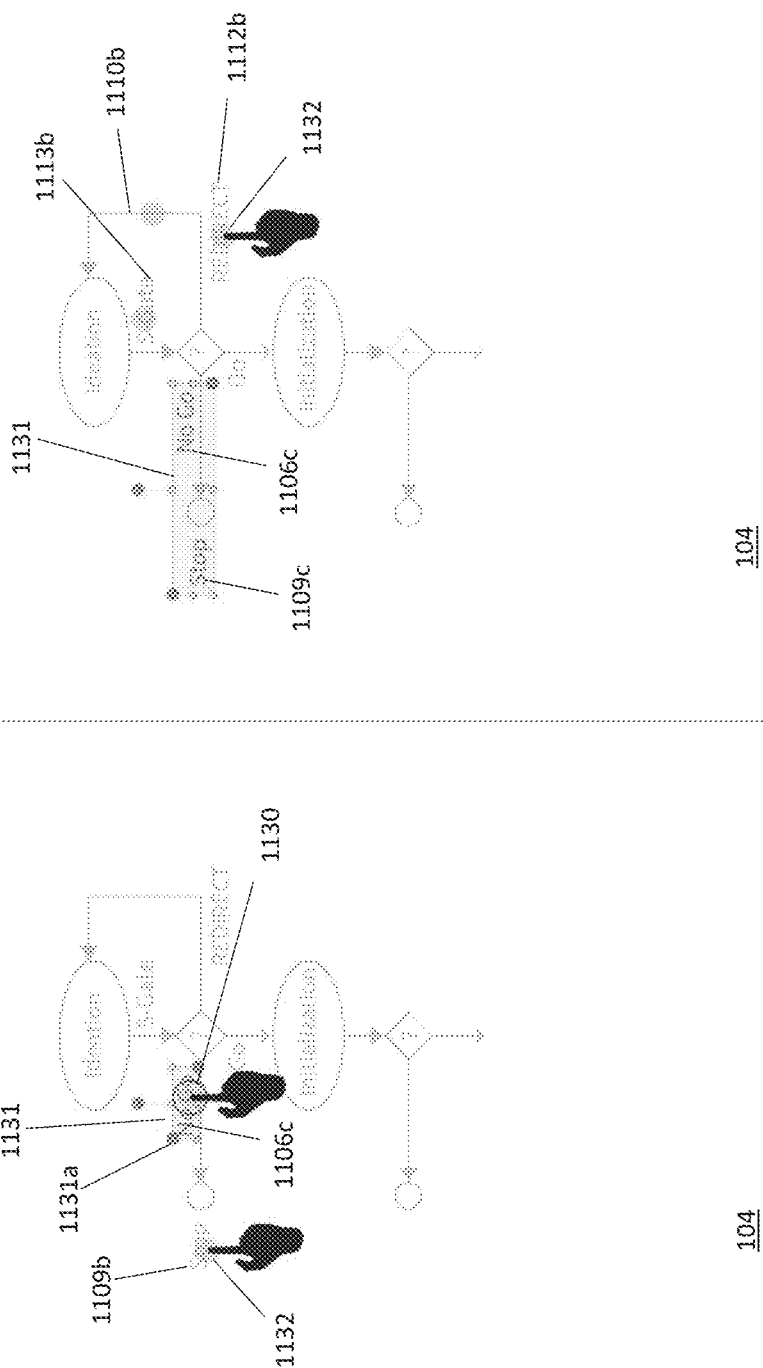

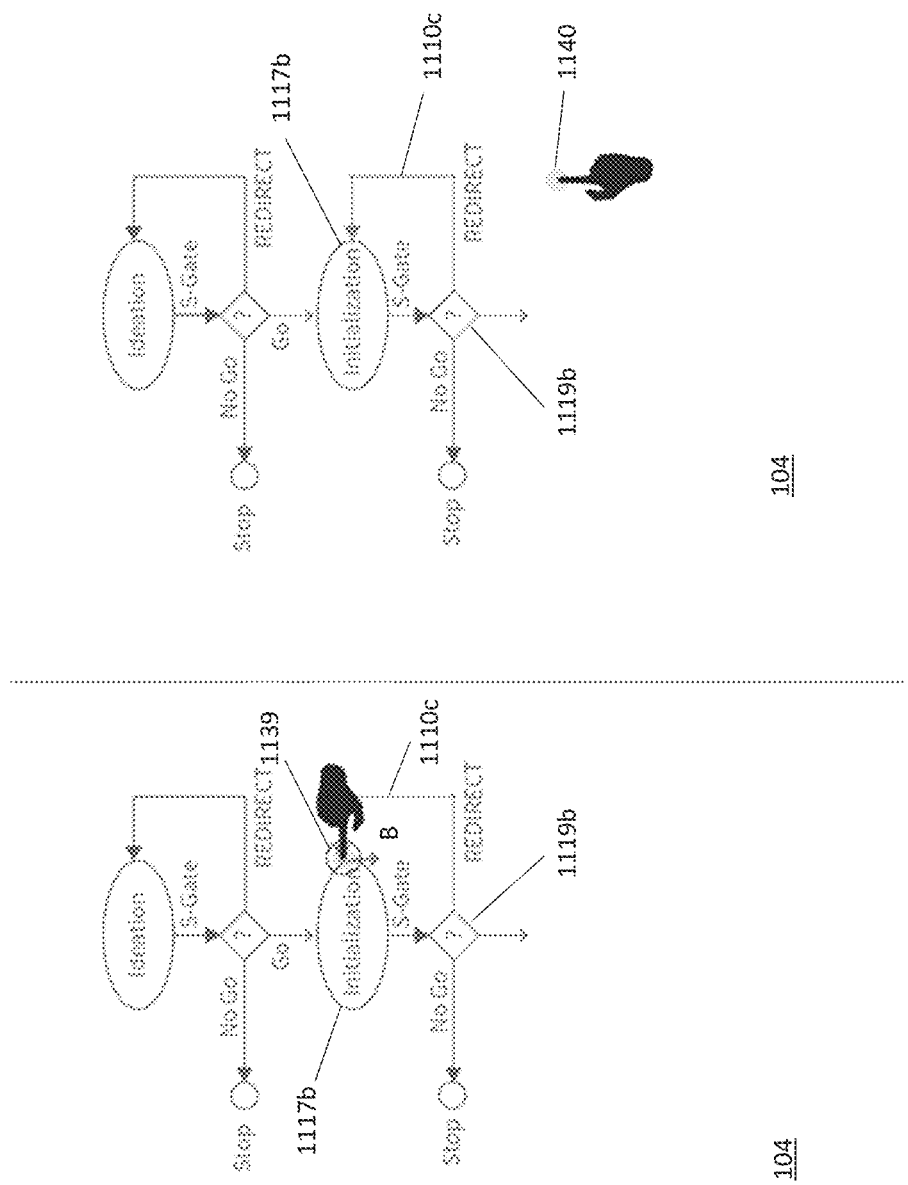

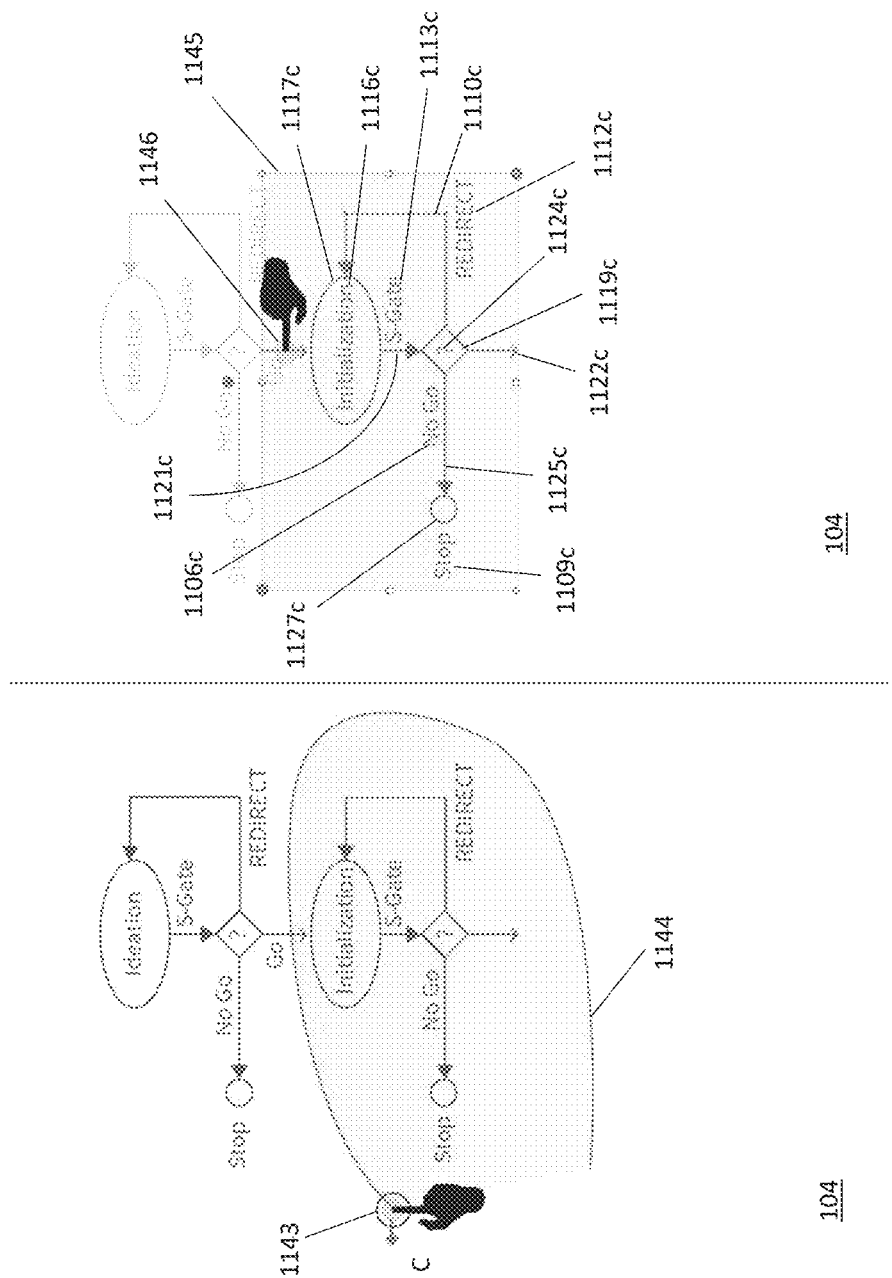

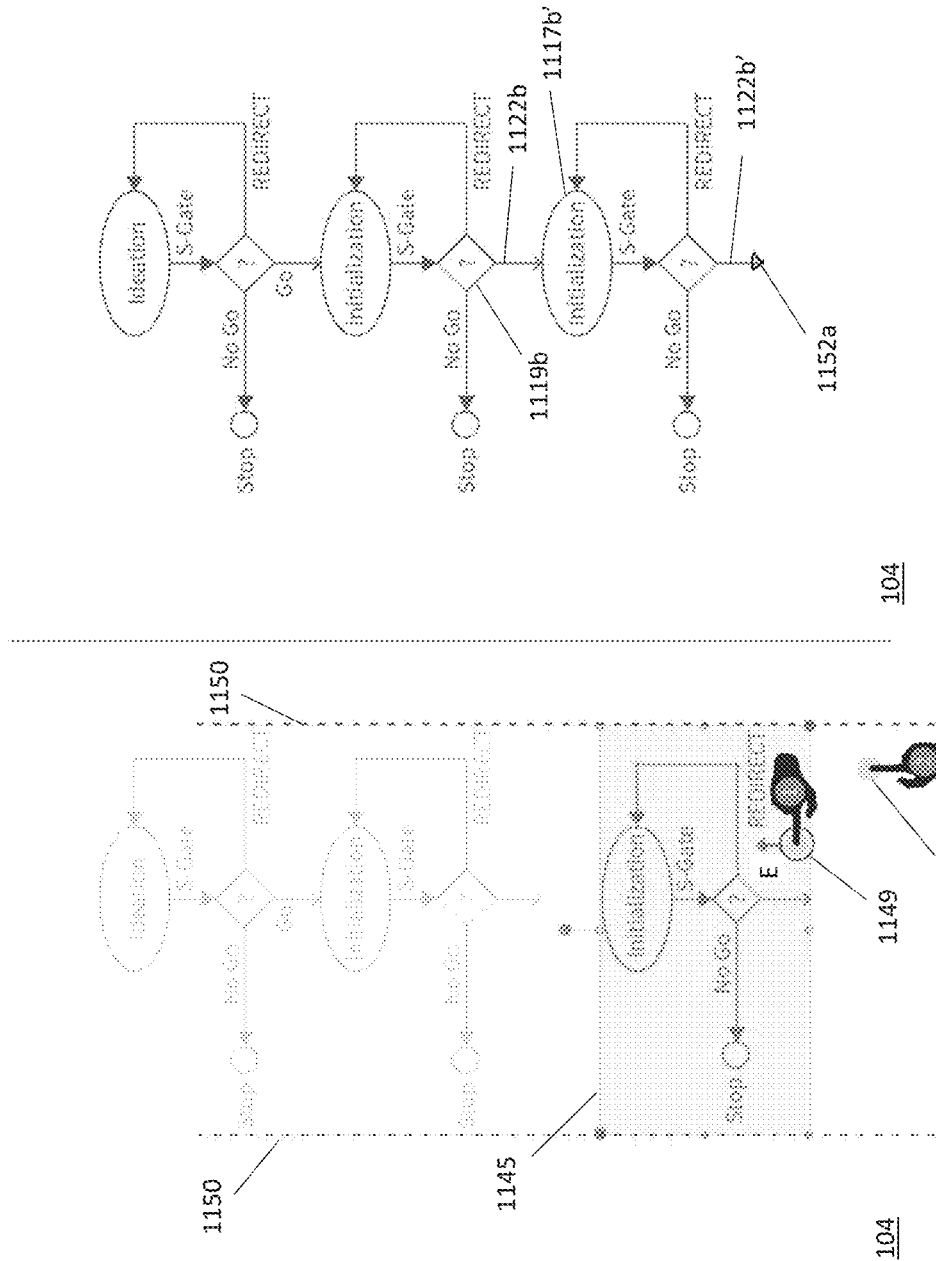

SYSTEM AND METHOD OF HANDWRITING RECOGNITION IN DIAGRAMS

CROSS-REFERENCE TO RELATED APPLICATIONS

This application claims priority to European Application No. 15290271.4 filed on Oct. 19, 2015, the entire contents of which is incorporated by reference herein.

TECHNICAL FIELD

The present invention relates generally to the field of computing device interfaces capable of recognizing user input handwriting of various graphics and text. In particular, the present invention provides systems and methods for the detection and recognition of input handwritten diagram elements to produce digital diagram documents.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for the handwritten or hand-drawn input of drawings and text which input is interpreted using a handwriting recognition system or method.

One application of handwriting recognition in computing devices is in the creation of diagrams which are hand-drawn on a computing device to be converted into typeset versions. Diagrams are drawings that explain or show arrangement and relations (as of parts). Diagrams generally include shapes having arbitrary or specific meanings and text with relationships to these shapes. There are many type of diagrams, such as flowcharts, organizational charts, concept maps, spider maps, block/architecture diagrams, mind-maps, block diagrams, Venn diagrams and pyramids. Depictions of some typeset and handwritten examples of possible diagrams are illustrated in FIGS. 1 to 6.

FIGS. 1A and 1B respectively show typeset and handwritten example concept maps 10 variously having shapes, defining diagram blocks or containers 12 and connectors 14, of different type (e.g., straight arrows, curved arrows), which connect or designate relationships between the diagram blocks 12. Further, in FIG. 1B the containers 12 contain text 16. Generally in concept maps the connections between the blocks define conceptually related or dependent elements or themes defined by the text in those blocks. The relationship between blocks may be made precise using labels on connectors. The blocks themselves may not be present in the concept map and instead the text (e.g., defined in text blocks having no associated shape or container) may be connected by the connectors.

FIGS. 2A and 2B respectively show typeset and handwritten example mind-maps 20 variously having shapes defining diagram blocks or containers 12, connectors 14, of different type (e.g., straight lines, curved lines), which connect or designate relationships between the diagram blocks 12 and paths 18 to certain features or states of the mind maps. Further, in FIG. 2B the containers 12 and paths 18 have associated text 16. Generally in mind-maps the connections between the blocks define possible alternative states or linked ideas from central elements or themes defined by the text in those blocks, and the paths define key features of each alternative state defined by the text on those paths. The blocks themselves may not be present in the mind map and instead the text (e.g., defined in text blocks having no associated shape or container) may be connected by the connectors and paths.

FIGS. 3A and 3B respectively show typeset and handwritten example flow charts or diagrams 30 variously having shapes, defining diagram blocks or containers 12, of different type (e.g., ovals, rectangles, diamonds), and connectors 14, of different type (e.g., straight arrows, bent arrows, branched lines), which connect or designate relationships between the diagram blocks 12. Further, in FIG. 3B the containers 12 contain text 16; text may also be associated with the connectors. Generally in flow charts the connections between the blocks define procedurally related or dependent elements or steps defined by the text in those blocks. The blocks themselves may not be present in the flow chart and instead the text (e.g., defined in text blocks having no associated shape or container) may be connected by the connectors.

FIGS. 4A and 4B respectively show typeset and handwritten example organizational charts or tree diagrams 40 variously having shapes, defining diagram blocks or containers 12, and connectors 14, of different type (e.g., straight lines, bent lines, branched lines), which connect or designate relationships between the diagram blocks 12. Further, in FIG. 4B the containers 12 contain text 16. Generally in organizational charts the connections between the blocks define hierarchical relationships of members or functions of an organization or group defined by the text in those blocks. The blocks themselves may not be present in the organizational chart and instead the text (e.g., defined in text blocks having no associated shape or container) may be connected by the connectors.

FIGS. 5A and 5B respectively show typeset and handwritten example block/architecture drawings 50 variously having shapes, defining diagram blocks or containers 12, having nested relationships (e.g., containers 12 within other containers 12), and connectors 14 which connect or designate relationships between the diagram blocks 12, including between nested blocks. Further, in FIG. 5B the containers 12 and connectors have associated text 16. Generally in architecture drawings the nested blocks define arrangement or possession of device or process components, and the connections between the blocks define functional relationships between the blocks defined by the text in those blocks.

FIGS. 6A and 6B respectively show typeset and handwritten example spider maps 60 variously having shapes, defining diagram blocks or containers 12 and connectors 14 which connect or designate relationships between the diagram blocks 12. Further, in FIG. 6B the containers 12 and connectors have associated text 16. Generally in spider maps the connections between the blocks and/or text define dependent relationships or states from a central element or theme defined by the text.

The diagrams illustrated in FIGS. 1 to 6 are merely examples and other or different elements than those depicted for each diagram type, or different types or forms of the depicted elements themselves, may be present in the diagrams in addition or in the alternative. Further, other definitions of these diagram types are possible as well as combinations thereof. These myriad possible variations of combining the base components of shapes (connections with or without containers) and text in diagrams can cause issues for the accurate recognition of these elements input as hand-drawn or written content to a computing device. Diagrams are particularly used in education and business settings where the user of the computing device creates a diagram, for example, during a lecture or meeting to capture concepts, issues or solutions being discussed. Another frequent use of diagrams is the creation of presentations or reference documentation. Input can be achieved by the user launching a handwritten diagram or sketch application on the computing device which accepts and interprets, either locally in the device or remotely via a communications link of the device, hand-drawn input on a touch sensitive surface or a surface monitored by a relative position detection system.

Conventionally such handwritten diagramming applications are limited in their capabilities to handle the above-described complexity of diagramming and typically constrain users to adopt behaviors or accept compromises which do not reflect the user's original intent. As a result some conventional handwritten diagramming applications force users to navigate menus to select and draw shapes and insert text in relation to shapes. As such, users are unable to draw shapes and connectors naturally or freely. Some other conventional handwritten diagramming applications rely on the order in which users draw different strokes to thereby guide the interpretation for recognition as expected behavior is followed. For example, the user may need to first draw two blocks/boxes before being able to define a connector between those boxes, or may have to draw a box before adding text thereto. This however is difficult for users, as they need to learn and implement the drawing/writing orders required which may need to be re-learnt if the application is not often used, and is non-intuitive, such that the ability to quickly capture diagrams is not supported. For example, a user may wish to prepare presentations on the go with a portable computing device, such as a tablet, or a user may wish to jot down a flow chart that their teacher has drawn in class on a computing device, such as a laptop with a touchscreen, and as such users need to be able to draw clear diagrams with mixed content without being an expert of the dedicated, cumbersome software.

Making the handwritten diagramming application smarter helps support users. That is, the application may be able to distinguish between different shapes, such as between blocks and connectors, and between shapes and text, thereby providing users with more freedom when creating diagrams. For example, U.S. Pat. No. 7,352,902 describes differentiating writing from drawing in input ink by using an ink parser which executes word grouping, writing/drawing classification and drawing grouping. The word grouping is described as being performed by grouping stokes into hierarchies of words, lines and blocks. However, as described in the patent, this grouping of strokes into words during such classification leads to the word groups including non-text strokes, which results in erroneous text recognition when the word groups are sent to a text recognizer, for example. After word grouping, the patent describes that writing/drawing classification is performed. This process is described as including consideration of word, spatial and temporal context features; however these features are mapped to a fuzzy function for classification which means that absolute decisions on whether strokes belong to text or drawings are made at this point, which can lead to misclassification. After classification, the patent describes that drawing grouping is performed by a chart detector to group the drawing stokes into independent objects based on spatial relationships. However, the accuracy of this grouping is influenced by the classification result, such that incorrect objects may be formed.

Even in conventional applications in which hand-drawn shapes and handwritten text are recognized well with reasonable creative freedom offered to users, typically the ability to change the drawn diagrams, such as to edit elements of the diagram to add, omit or replace elements, adapt the diagram to an evolving concept, convert the type of diagram, etc., is limited where only certain operations are available and only available on the typeset version of the diagram, especially with respect to manipulations of the relative positions of diagram elements while retaining recognized relationships, such as connected containers, for example, and not on the handwritten input, so-called digital ink, and/or requires gestures to be learnt or selection to be made via menus, as described above. For example, U.S. Pat. No. 8,014,607 describes an inferred mode protocol which allows certain editing operations to be directly performed on the digital ink. However, the described operations are very limited. Further, no solution is provided for the ability to manipulate the relative position of the diagram elements in digital ink while retaining recognized relationships.

U.S. Pat. No. 7,394,935 describes relative manipulations on the digital ink with respect to resizing and repositioning operations. However, in these operations the digital ink is either merely scaled in accordance with the manipulation, and as such the user would be required to perform further interaction to return the digital ink to its originally drawn dimensions, e.g., moving a container away from its connected container(s) would cause the connector to stretch in both x and y dimensions, or the connectors are 'reflowed' by re-computing a backbone (horizontal and vertical lines) that approximates the digital ink of the connector when the connector is resized or changed to a different form (e.g., straight to bent). This requires regeneration of the digital ink, which may be done through normalization of the connector ink through segmentation at high curvature points (cusps) as described in the related U.S. Pat. No. 7,324,691. Accordingly, the resultant manipulated digital ink may be quite different to the originally drawn ink, requiring intervention by users.

SUMMARY

The examples of the present invention that are described herein below provide systems, methods and a computer program product for use in diagram creation with handwriting input to a computing device. The computer program product has a non-transitory computer readable medium with a computer readable program code embodied therein adapted to be executed to implement the method.

The computing device is connected to an input device in the form of an input surface. A user is able to provide input by applying pressure to or gesturing above the input surface using either his or her finger or an instrument such as a stylus or pen. The present system and method monitors the input strokes.

The computing device has a processor and at least one application for detecting and recognizing the handwriting input under control of the processor. The at least one system application is configured to cause display of a plurality of input diagram elements in interactive digital ink on a display device associated with the computing device, associate one or more of the diagram elements with one or more other of the diagram elements in accordance with a class and type of each diagram element, and cause re-display of the diagram elements based on one or more interactions with the digital ink received and in accordance with the one or more associations.

Another aspect of the disclosed system and method provides identification of the class of each diagram element by classifying strokes of the hand-drawn input. The strokes may be grouped based on spatial and temporal information of the input, and the strokes may be classified by building and testing element type probability hypotheses for the groups of strokes. The identified types include text and non-text.

Another aspect of the disclosed system and method provides parsing the classified strokes to a handwriting recognition system for recognition of the diagram elements of the classified strokes.

Another aspect of the disclosed system and method provides identifying the type of each diagram element based on the recognized diagram elements and positional relationships between the diagram elements.

BRIEF DESCRIPTION OF THE DRAWINGS

The present system and method will be more fully understood from the following detailed description of the examples thereof, taken together with the drawings. In the drawings like reference numerals depict like elements. In the drawings:

FIGS. 13A to 22A show digital ink rendering of sequential inputs of the example handwritten flow diagram subsequent to the input of FIG. 12;

FIGS. 13B to 22B show digital ink rendering of sequential inputs and typeset ink rendering of previous inputs of the example handwritten flow diagram subsequent to the input of FIG. 12;

FIGS. 24A to 66A show digital ink rendering of sequential inputs of the example handwritten flow diagram subsequent to the input of FIG. 22A;

FIGS. 24B to 66B show digital ink rendering of sequential inputs and typeset ink rendering of previous inputs of the example handwritten flow diagram subsequent to the input of FIG. 23;

DETAILED DESCRIPTION

Figure 1A:
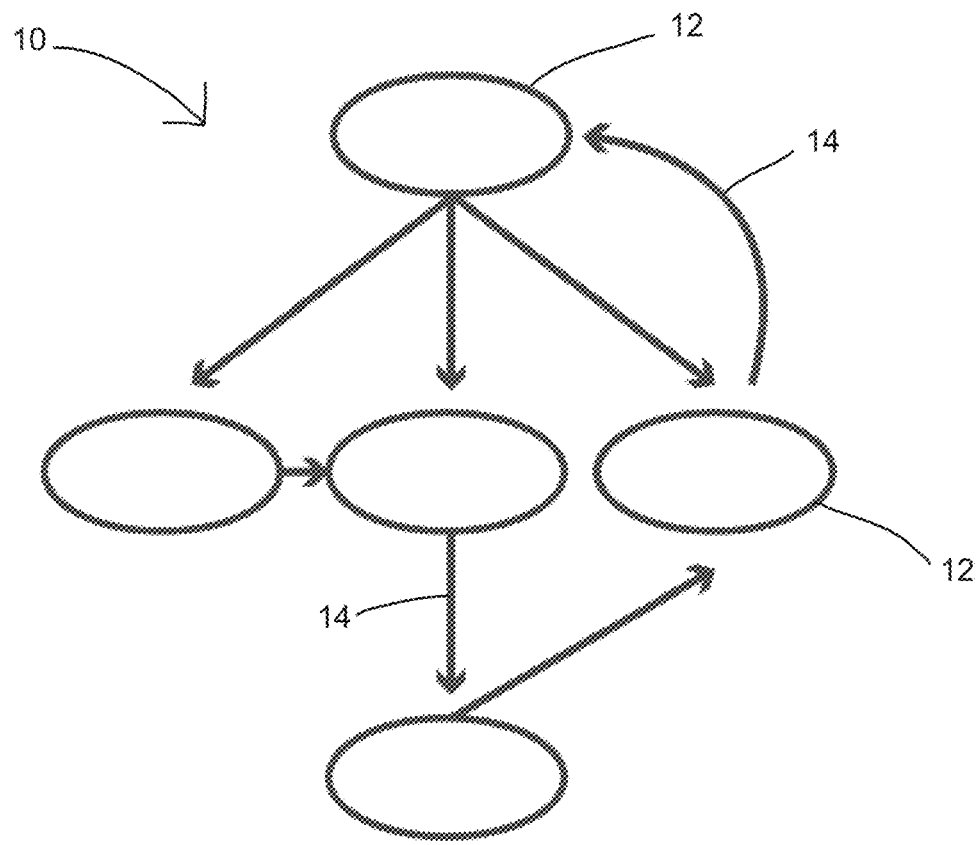
FIGS. 1A and 1B respectively show typeset and handwritten example concept maps.
Figure 1B:
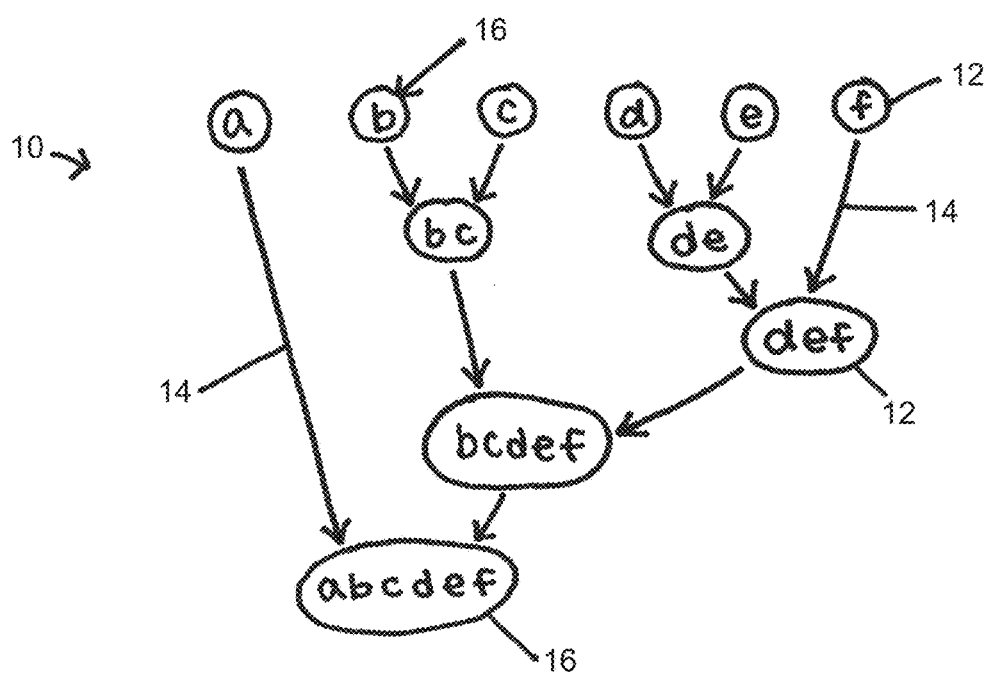
Figure 2A:
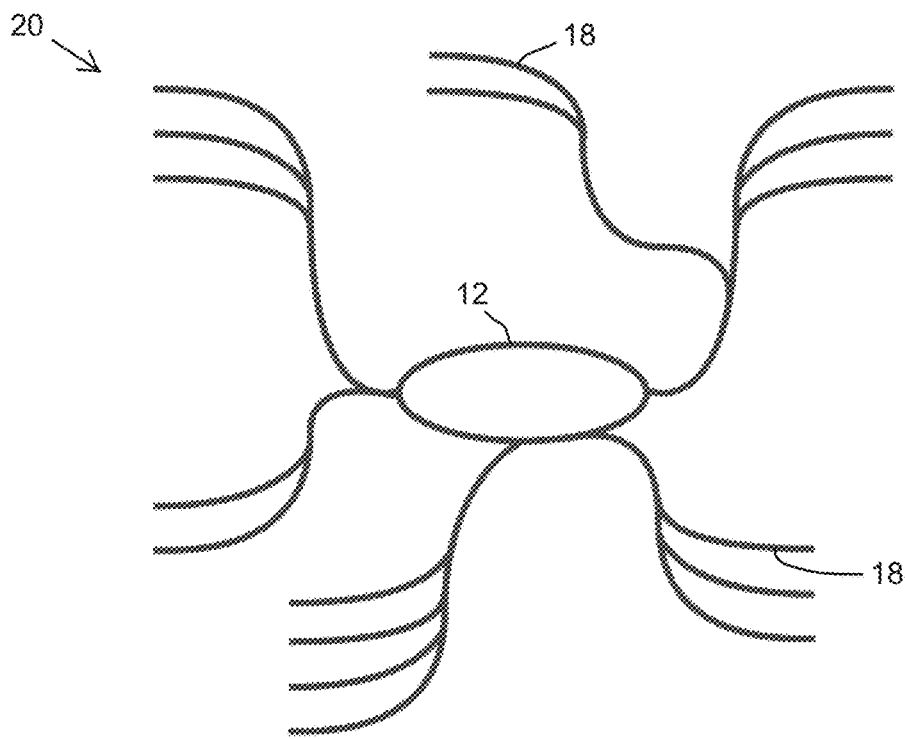
FIGS. 2A and 2B respectively show typeset and handwritten example mind-maps.
Figure 2B:
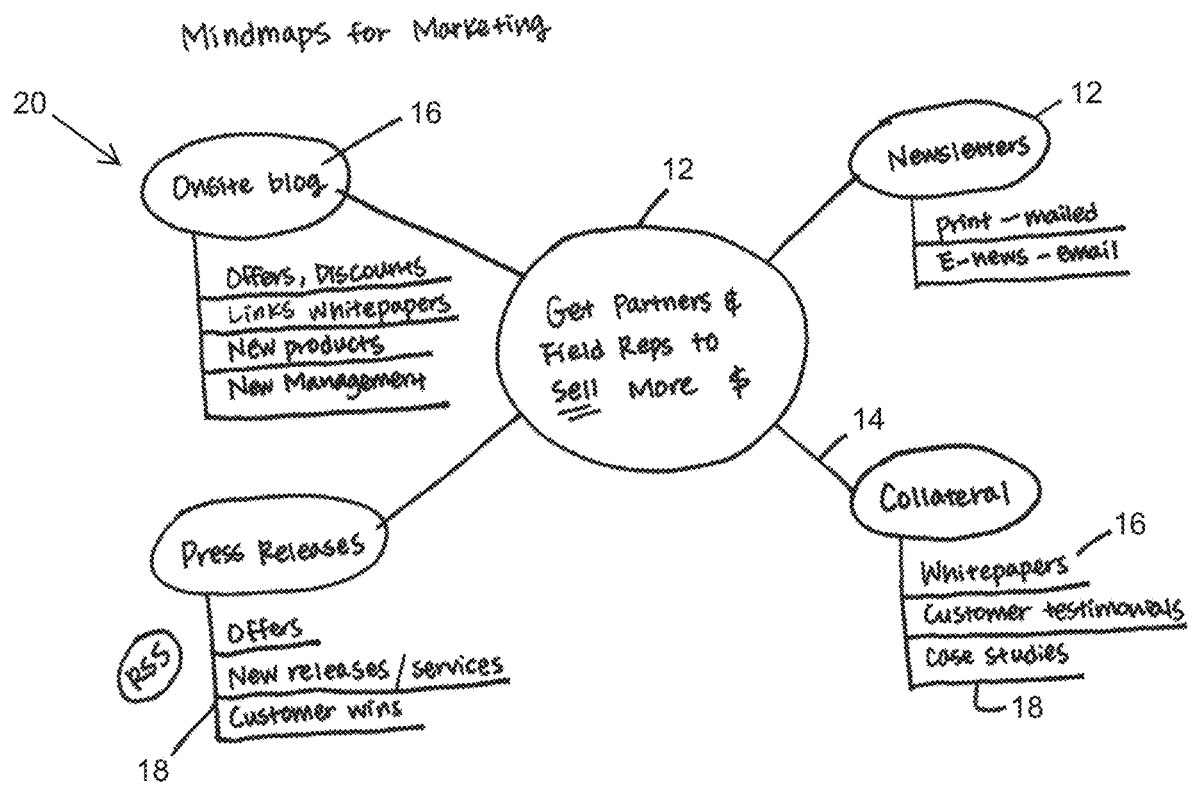
Figure 3A:
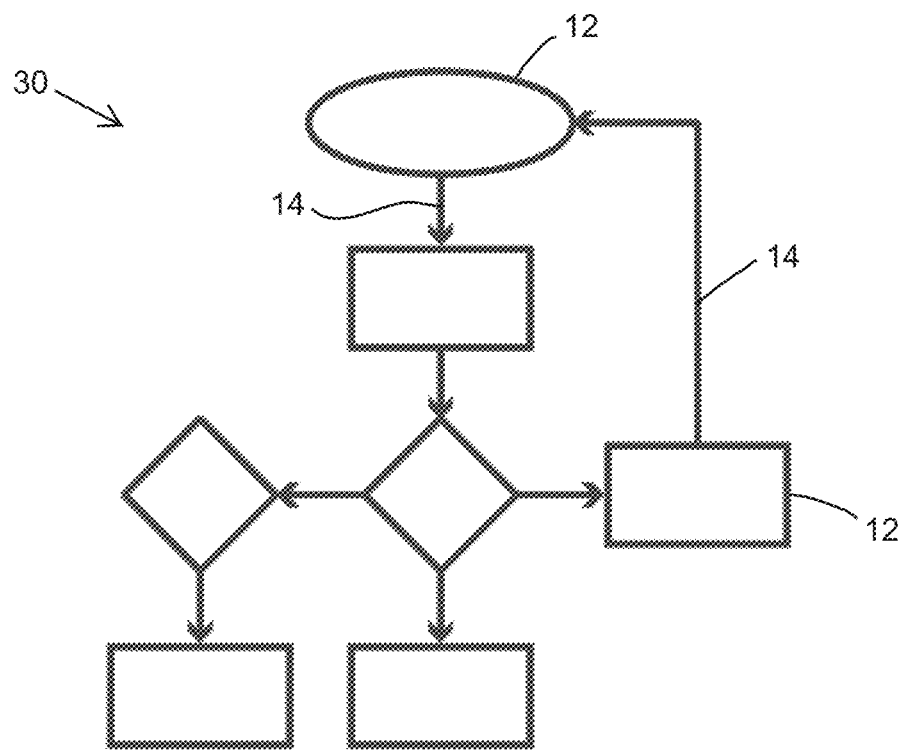
FIGS. 3A and 3B respectively show typeset and handwritten example flow charts or flow diagrams.
Figure 3B:
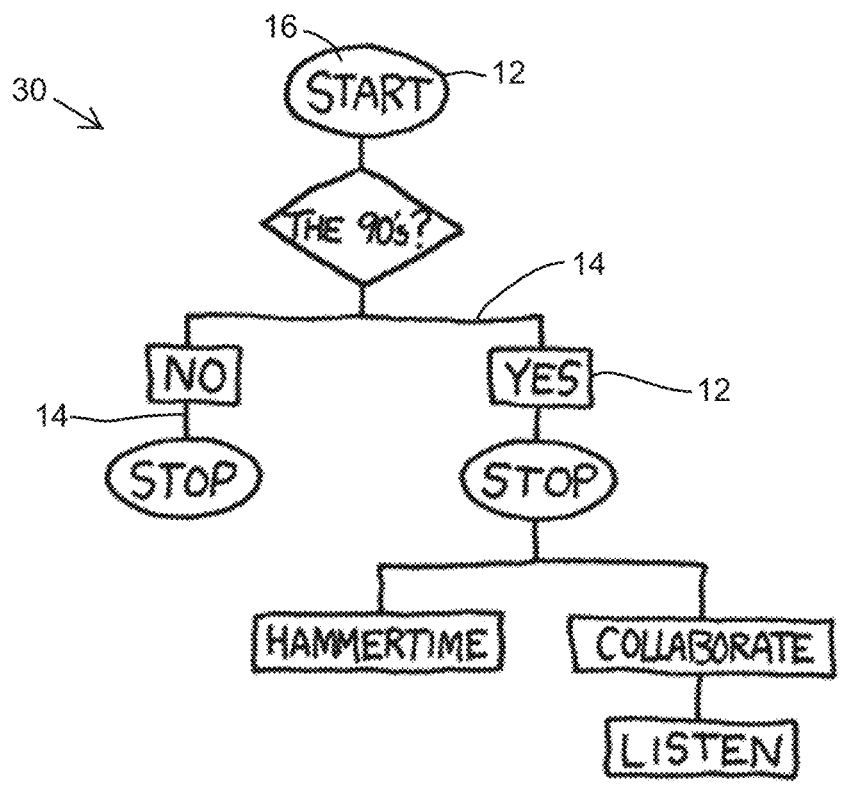

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a physical or virtual surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 7:
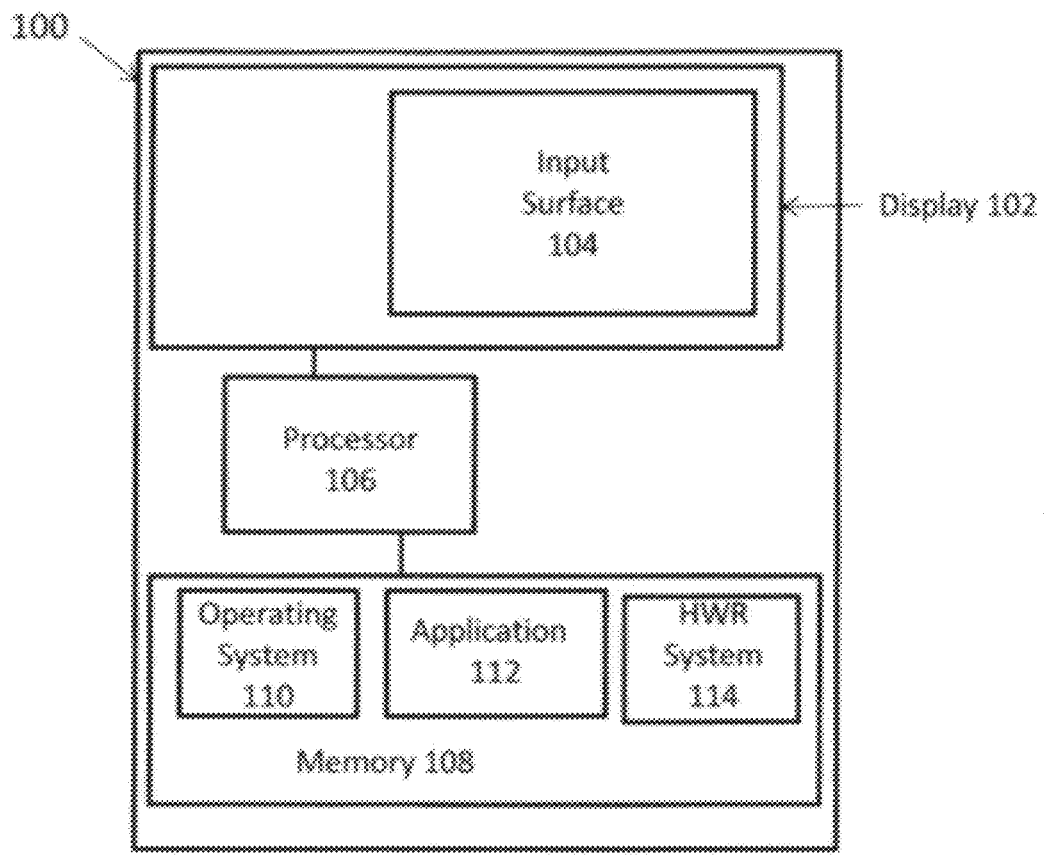
FIG. 7 shows a block diagram of a computing device in accordance with an example of the present system and method.

FIG. 7 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. The display 102 may be co-located with at least one input surface 104 or remotely connected thereto. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input in the form of a touch- or proximity-sensitive surface. The input surface 104 may be bounded by a permanent or video-generated border that clearly identifies its boundaries. The input surface 104 may a non-touch sensitive surface which is monitored by a position detection system.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 may include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially available operating system, such as WEBOS, WINDOWS®, MAC and IPHONE OS®, LINUX, and ANDROID. It is understood that other operating systems may also be utilized.

The application 112 includes one or more processing elements related to detection, management and treatment of hand-drawn shapes and handwritten text input by users (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The present system and method make use of the HWR system 114 in order to recognize handwritten input to the device 100, including handwritten text and hand-drawn shapes, e.g., non-text. The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programing languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together accessing information processed and stored in the memory 108, for example, by each system, or be combined as a single application.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, a symbol, with slight variations, the HWR system accommodates a variety of ways in which each object may be entered whilst being recognized as the correct or intended object.

Figure 8:
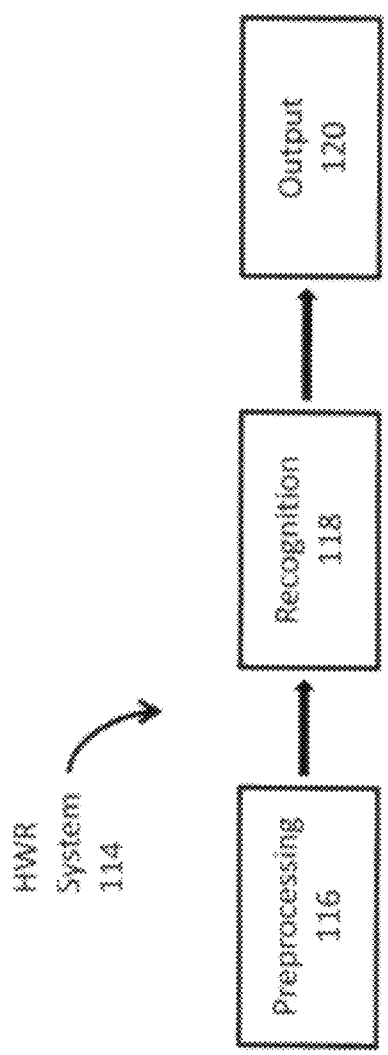
FIG. 8 shows a block diagram of a system for handwriting recognition in accordance with an example of the present system and method.

FIG. 8 is a schematic pictorial of an example of the HWR system 114, in either its local (i.e., loaded on the device 100) or remote (i.e., remotely accessible by the device 100)

forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the memory 108 and the display 102 as a digital ink or typeset ink versions of the handwritten elements/characters and hand-drawn shapes.

Figure 9:
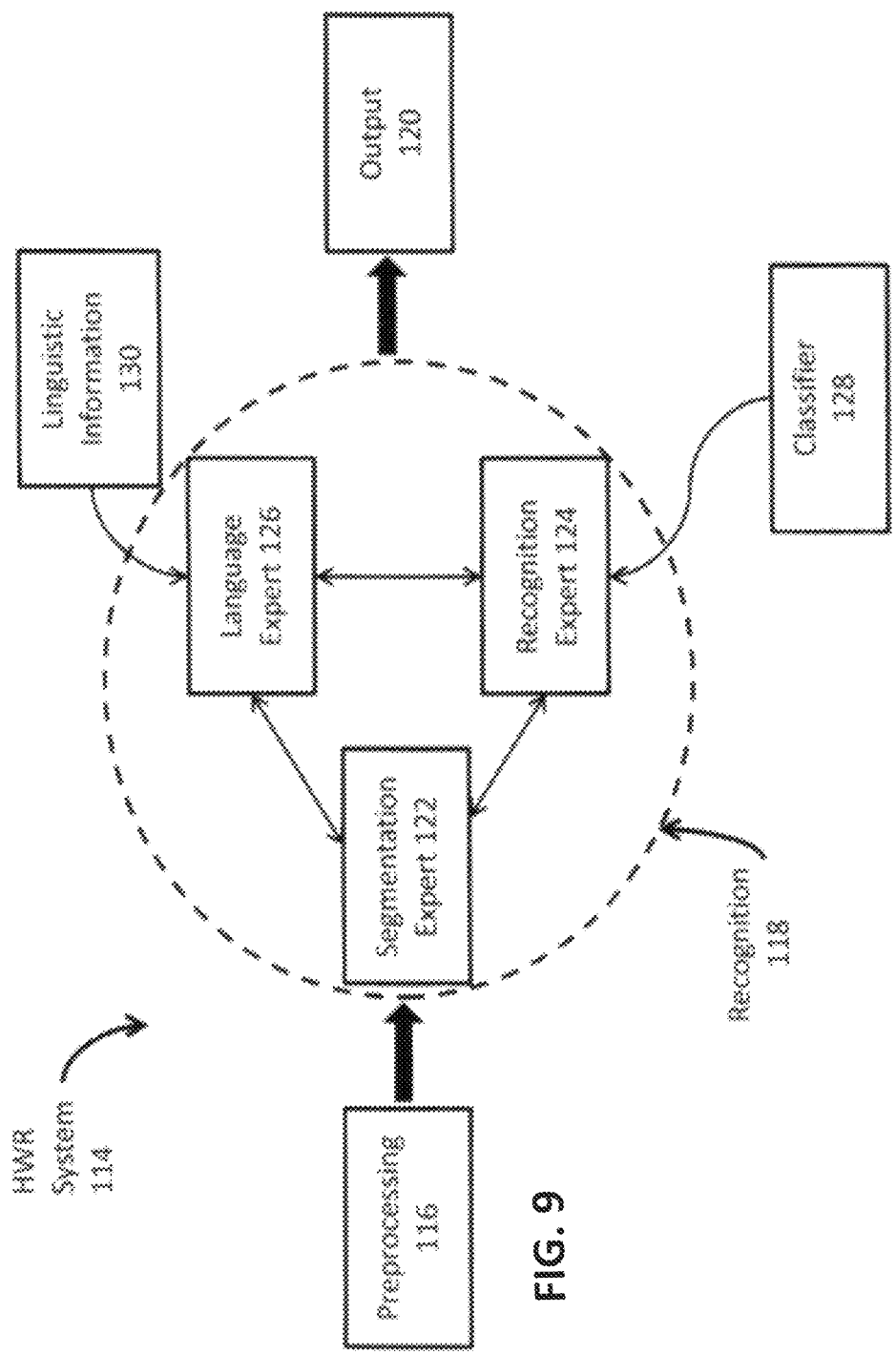
FIG. 9 shows a block diagram illustrating detail of the handwriting recognition system of FIG. 8 in accordance with an example of the present system and method.

The recognition stage 118 may include different processing elements or experts. FIG. 9 is a schematic pictorial of the example of FIG. 8 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, tables, charts, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon(s), regular expressions, etc. The language expert 126 aims at finding the best recognition path. In one example, the language expert 126 does this by exploring a language model such as final state automaton (determinist FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The application 112 provided by the present system and method allows users, such as students, academic and working professionals, to create handwritten diagrams and have those diagrams faithfully recognized using the HWR system 114 independent of the type of diagram created, e.g., flowcharts, organizational charts, concept maps, spider maps, block/architecture diagrams, mind-maps, block diagrams, Venn diagrams and pyramids. This list is not exhaustive and other types, or non-types, of diagrams are possible. For example, the different elements of the hand-drawn diagrams illustrated in FIGS. 1B, 2B 3B 4B, 5B and 6B are individually recognized together with any spatial and context relationships there between without regard to the diagram type. As discussed earlier, these diagram elements include shape and text elements. Shape or drawing elements are those that define graphic or geometric formations in linear or non-linear configurations, and include containers, connectors and free-form drawings. Text elements are those that contain text characters and include text blocks and labels for the text blocks and shape elements. Both text blocks and labels may contain text of one or more characters, words, sentences or paragraphs provided in one or more vertical lines and/or as numbered/bulleted lists. Text blocks may be contained by containers (internal text blocks) or may be provided outside of containers (external text blocks). External text blocks may be unrelated to containers or other elements of a diagram or may be directly related to certain other diagram elements.

Further, the application 112 provided by the present system and method allows users to hand-draw such shapes and text without any pre-determined or required order of drawing in order for proper recognition to be made. The handwriting recognition of the present system and method allows users to draw what they have in mind (freely without being slowed by the technology) as they would on paper, while benefiting from the power of digital tools. Example uses include:

- creation: high-level identification of, and differentiation between, shapes and text allows shapes to be sketched and text to be written by users without need to select or use pre-assigned tools nor switch between modes nor zoom to a specific area,
- editing: identification of shape features and points enables the shapes to be moved and manipulated for the creation of space for new ideas, the change of connections or shape type, and the handling of editing gestures, and the identification of text features and points enables the handling of editing gestures and the definition of text layout,
- searching: users can leverage the information contained in their diagrams to search through documents,
- typesetting: when creating diagrams users are provided with options for immediate recognition feedback,
- importing and exporting: identification of shape features and points and of text enables the use of data models suitable for the import of objects from, and the export of created documents to, processing and presentation tools.

These and other features of the present system and method and described in detail later.

Accurate content recognition of hand-drawn diagram elements is enabled by the application 112 through accurate and efficient differentiation of hand-drawn shapes and handwritten text. Further, fast and accurate recognition and provision of features, such as color-fill in shapes, is provided by the application 112 maintaining information on identified shape types (e.g., rectangle, circle, etc.) as recognized by the HWR system 114 rather than just information of the segmentation of the strokes making up the shapes used during the handwriting recognition process (for example, a rectangle is not stored by the application 112 as exploded into four lines).

Further, faithful rendering of hand-drawn diagrams is provided by the application 112. This is because, the digital ink is retained (for example, in the memory 108), the recognized shapes are not normalized, thereby maintaining the user defined size, aspect and form of the hand-drawn shapes, and shapes and text are able to be identified regardless of, or re-identified or classified based on, other elements of the diagram. That is, the application 112 identifies shapes that are hand-drawn alone (e.g., without associated connectors or text), as closed shapes or polygons (e.g., circles, ellipses, squares, rectangles and rhombi), and as open shapes (e.g., lines, which can be combined in the drawing of polygons). The application 112 further identifies shapes that are hand-drawn surrounding one or more existing non-text and/or text elements (e.g., creating an outline or container), creating containers, and creating connectors between other non-text and text elements. Containers that contain other shapes (including other containers) or text (e.g., by employing automatic grouping of elements) are also identified. The application 112 further identifies text that is handwritten alone (e.g., without an outline or container), within existing shapes (e.g., within a container), and near other elements. Text elements that contain a single line of text (one or several words) or multiple lines of text (with or without carriage return, numbered lists, bullets points, etc.) are also identified. The application 112 also allows text to be written directly in shapes without requiring an explicit action from the user or use a specific tool to trigger a dedicated input method. Text can also be input using non-handwriting techniques, such as with a keyboard connected to the computing device.

In editing, handwritten operations such as overwrite, erasure and layout control, can be performed on both digital and typeset ink. For example, overwriting includes changing a shape from one type or form to another (e.g., switching a rectangle to an ellipse by hand-drawing an ellipse over a rectangle), adding decoration to a connector, and creating a shape around text. Erasure can be performed using known handwriting gestures, such as scratch-out or strike-out gestures on the shapes and text. Layout control can be performed to move and resize shapes, align and distribute shapes and text to each other or one another. The detection of at least some of these operations, as well as others, is enhanced by the disambiguation process used by the present system and method. The disambiguation process is now described.

The present system and method automatically detect and differentiate the input of the different handwritten objects of shapes and text, so that they are processed by the HWR system 114 with suitable recognition techniques, e.g., the strokes of the detected shapes are processed using a shape language model and the strokes of the detected text are processed using a text language model. It is noted however that since many handwritten shapes and text characters can share common features (e.g., a circle and the letter "o", an arrowhead and the letter "v") users are provided with the ability to correct wrong differentiation decisions using the user interface (UI) of the application 112.

The disambiguation process allows handwritten input containing mixed content of text and non-text (i.e., shapes) to be recognized and converted to beautified digital ink and typeset ink, either automatically (e.g., on-the-fly) or on demand. Digital ink is formed by rendering the handwritten input in digital image format. Beautified (digital) ink is formed by rendering the digital ink to appear more regular and normalized than the original handwriting while retaining similar styling or look-and-feel. Typeset ink is formed by converting the digital ink into typeset or fontified image format. Beautified typeset ink is formed by rendering the typeset ink with positional and styling changes from the input. The preprocessing stage 116 of the HWR system 114 is configured to perform the disambiguation process. The preprocessor 116 does this by classifying the elements of the digital ink into different classes or categories, being non-text (i.e., shape), text and a mixture of shape and text. The classified digital ink is then parsed to the recognizer 118 for suitable recognition processing depending on the classification.

For example, when processing digital ink classified as text, the recognizer 118 employs the segmentation expert 122 to segment individual strokes of the text to determine the segmentation graphs, the recognition expert 124 to assign probabilities to the graph nodes using the classifier 128, and the language expert 126 to find the best path through the graphs using, for example, a text-based lexicon of the linguistic information 130. On the other hand, when processing digital ink classified as non-text, the recognizer 118 employs the segmentation expert 122 to segment the strokes of the shape, the recognition expert 124 to determine segmentation graphs using the classifier 128, and the language expert 126 to find the best path through the graphs using a shape-based lexicon of the linguistic information 130. The mixed content classification is treated as 'junk' and will result in low probability of recognition when parsed to the recognizer 118. Shapes that are parsed to the recognizer and not recognized because, for example, they are out-of-lexicon shapes are treated as doodles, being unrecognized content (described later).

Figure 10A:
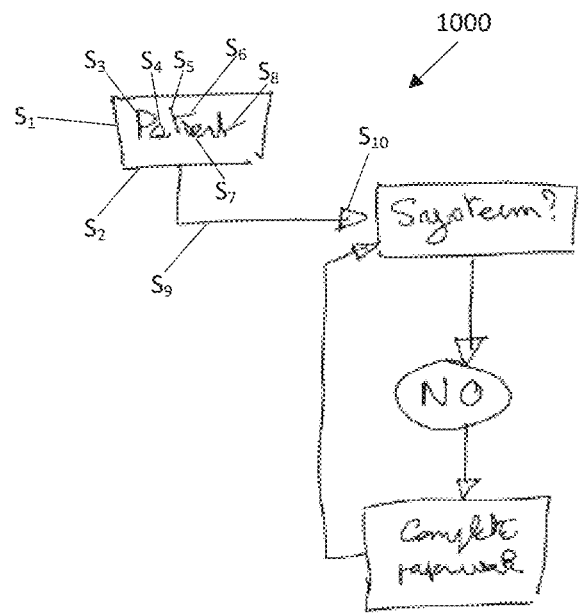
FIG. 10A shows an example hand-drawn diagram.

FIG. 10A shows an example hand-drawn diagram 1000. Like the example diagrams described in the Background, the diagram 1000 has shape and text elements including diagram blocks or containers of different types (rectangles and a circle) and connectors of different types (straight arrows and a bent arrow) which connect or designate relationships between the diagram blocks, and text of different components (including single words, symbols and multiple words) within the containers.

Figure 10B:
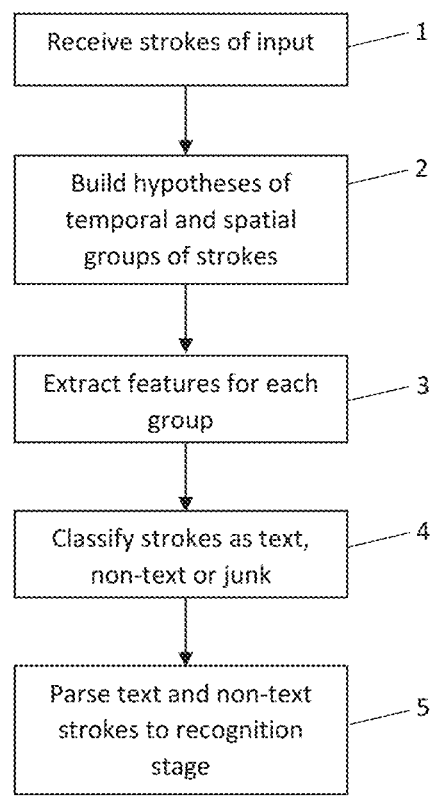
FIG. 10B is a flow diagram of an example non-text and text disambiguation system and method.

FIG. 10B is a flow diagram of an example disambiguation system and method, which is now described with respect to the example hand-drawn diagram 1000. At step 1, the disambiguator 116 receives the strokes of the hand-drawn input of the diagram 1000, for example, strokes S1 to S10.

At step 2, the strokes are grouped using spatial and temporal considerations to build hypotheses of which strokes may belong to non-text or text elements of the diagram 1000. The spatial considerations include distance between the strokes, geometry of the strokes, overlapping of the strokes, and relative positions of the strokes. For example, the strokes S1 and S2 are closer to one another, the strokes S1 and S2 surround the strokes S3 to S8 and the stroke S10 overlays one end of the stroke S9. The temporal considerations include the time order of stroke input. For example, the strokes have the time order of S1, S2, S9, S10, S3, S4, S5, S7, S6 and S8. The combined spatial and temporal considerations are used to provide a probability score to each grouping of strokes. The probability score may be a vector of three probability scores, one for each class, text, non-text and junk. A high probability score indicates that the group of strokes likely belongs to one object of the class associated with the score, a low probability score indicates that the group of strokes likely belong to separate objects or at least not to that the class associated with the score, with scores there between indicating relative likelihoods of classification. In this way, groups that achieve low or very low probability scores at this step are discarded such that hypotheses are not unnecessarily built for testing at the next step, thereby optimizing processing. This scoring defines a 'coarse' classification of the hypotheses to filter out those that should not be tested. Alternatively, hypotheses may be built for each classification for each systematic group of strokes, with classification of the strokes made on the class achieving the highest score.

The spatial and temporal information is also used in the building of the hypotheses themselves. For example, for a first group containing the strokes S1 and S2 and a second group containing the strokes S3 to S8, as the spatial information is that the first group surrounds the second group and the temporal information is that the strokes of the first group were input in time order and the strokes of the second group were also input in time order, a first hypothesis is built that the first group belongs to one object, as it contains other elements, and a second hypothesis is built that the second group belongs to one object, as it is contained in another element, and a third hypotheses is built that the first and second groups belong to different objects. The third hypothesis is not merely a combination of the first and second hypotheses because it does not preclude the first or second group being of more than one object themselves.

For the examples of the strokes S1 to S10, the following further groups have high probability scores and are therefore built as hypotheses:
  S3 and S4; as they are time ordered and S4 is closer to S3 than S5,
  S5 to S8; as they are time ordered,
  S2 and S9; as they are time ordered and close spatially,
  S9 and S10; as they are time ordered and S10 overlays one end of S9.

On the other hand, a group with a medium probability score (e.g., neither likely nor unlikely) which is therefore likely used for building hypotheses contains the strokes S1 and S9, as their spatial extents are near, but not particularly close, but they are close temporally, a group with a low probability score which is therefore likely not used for building hypotheses contains the strokes S1 and S10, as they are far removed spatially with many other strokes there between, and a group with a very low probability score which is therefore not used for building hypotheses contains the strokes S5 and S10, as they are far removed both spatially and temporally.

At step 3, features for each group of strokes of the built hypotheses are extracted. These features are extracted in consideration of shape and text language models, which may be those implemented by the recognizer 118 or separately provided as part of the pre-processor 116 stored in the memory 108, for example. The features include separation distances, changes in direction within strokes, overlap, direction of stroke pattern, relative geometrical extents, combined relative positions and time orders, curvature, linearity and looping. This list is not exhaustive, and about 100 different features are extracted by the present system and method, since the greater the number of features that are extracted, the greater the accuracy of the overall classification.

For example, for the first group described above, the extracted features of the stroke S1 include two large changes in direction, three generally linear segments and partially closed formation, the extracted features of the stroke S2 include single direction, generally linear, and the extracted relative features of the strokes S1 and S2 include horizontal extent of S2 being within horizontal extent of S1 and S2 generally aligned with ends of two vertical segments of S1. For the second group described above, the extracted relative features of all the strokes include a generally unidirectional stroke pattern with some positionally delayed strokes (which may indicate the crossing of a "t" or dotting of an "i" character, for example), the extracted relative features of the strokes S5 and S6 include overlap, the extracted relative features of the strokes S5 to S8 include S6 and S8 positionally out of time order with S5 and S7, and the extracted features of the stroke S7 include many variations in direction (which may indicate cursive text, for example).

In Step 4, the strokes are classified into text, non-text and junk by testing hypotheses based on all of the collected information, including extracted features of the groups of strokes within those hypotheses and the spatial and temporal information of the strokes within those groups, which is used to provide probability scores to each hypothesized group as a vector of three probability scores, one for each class, text, non-text and junk. For example, for the first and second hypotheses described above, the afore-mentioned extracted features and spatial and temporal information lead to the first group having a higher probability score for being non-text than for the other classifications of text and junk, and the second group having a higher probability score for being text than the other classifications of non-text and junk. Analysis of the probability scores may be done for each stroke, such that the probability score vectors for all of the hypotheses/groups containing a certain stroke are combined to provide an overall probability for that stroke as being text or non-text. This scoring defines a 'fine' classification of each of the strokes for recognition.

At step 5, the classification results are parsed to the recognizer for handwriting recognition of the strokes by the appropriate recognition module.

Additionally, other disambiguation techniques employing simple heuristics can be used to supplement and augment the above-described technique. These include, for example, thresholds, writing speed, and time between strokes. The disambiguation system and method can be performed on already input handwriting or incrementally as handwriting is input. For incremental performance the probability scores required for confidence in classification can be set higher than for the non-incremental case, so that time is provided for input of all strokes of the objects before recognition is made. Alternatively, previously recognized objects may be re-recognized based on new input causing new groupings and hypotheses, however care is taken to not undesirably increase processing complexity and time (e.g., re-testing of all previously recognized elements) or cause upsetting re-recognition across the diagram being created or edited. For example, testing all recognized strokes which were entered before newly entered strokes, i.e., by time order, can quickly lead to over-processing which can affect recognition speed, thereby adversely affecting user experience of the application 112. These non-beneficial effects may be minimized whilst providing good recognition of likely changed elements (due to new input) by restricting re-classification to certain strokes, such as, for example, testing only a restricted number of previously entered strokes, e.g., from one to about five strokes, on the basis of time order, or only testing previously recognized strokes which are spatially close to newly entered strokes for potential new groupings, or only testing recognized strokes of the same type, i.e., text or non-text, as the currently entered strokes upon classification of those strokes.

Accordingly, the non-text/text differentiation of the present system and method differs from previous techniques mentioned in the Background because any groups containing non-text and text strokes are given a low classification score and therefore not parsed to the recognizer, absolute classification is not performed prior to recognition rather hypotheses are built and tested, and segmented strokes themselves are not classified as belonging to non-text so as to be reformed into detectable shapes rather groups of strokes are classified and tested for shape recognition. As a result, the present system and method does not suffer from the potential for erroneous text and shape recognition and misclassification of the previous techniques.

Thus, the text/non-text disambiguator 116 of the present system is able to identify shapes and text, and within text, text lines, paragraphs defined as a coherent set of text lines, bulleted and numbered lists defined as a vertical set of text lines having initial bullet symbols or numbers, tables defined as a group of cells containing text, underlined text, and more. Further, the disambiguator 116 is able to identify the layout of a diagram, including shapes and text located inside shapes, text located inside a table cell and alignment of individual text blocks. Furthermore, the disambiguator 116 is able to identify corrected text, including scratch-outs defined as a scribbled line made over a piece of text or shape, strikethroughs defined as a single line made over a piece of text, and cross-outs defined as a pair of crossed lines, made over a piece of text. Further still, the disambiguator 116 is able to provide beautification information as the identified positions and sizes of the different elements can be adjusted to allow the recognized digital ink to be output in more regular and normalized form.

Figure 11A:
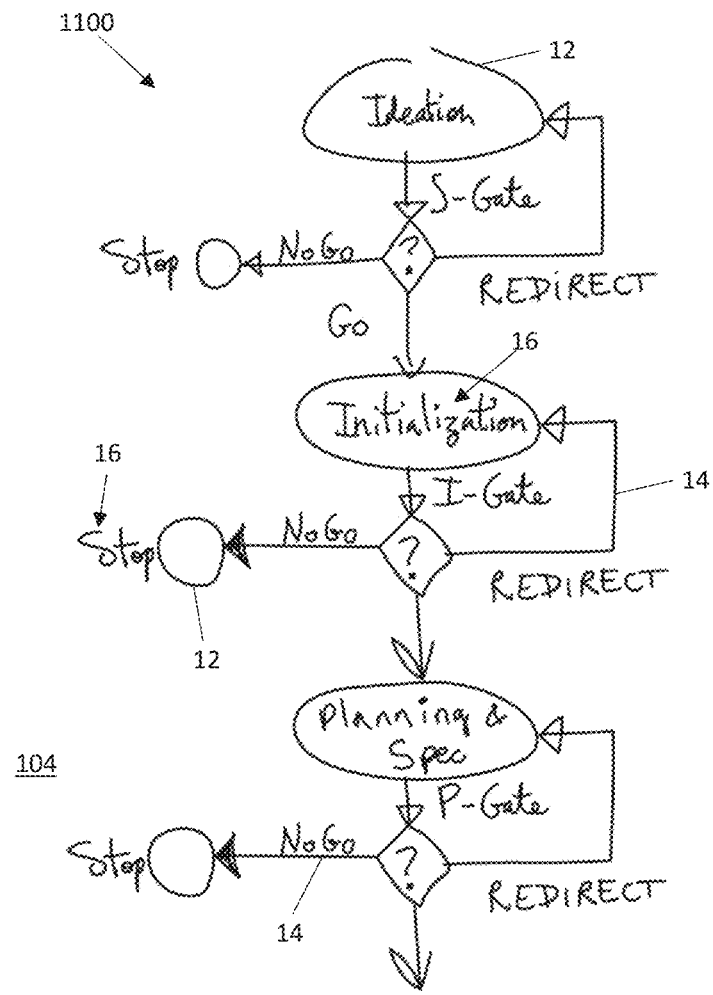
FIGS. 11A and 11B respectively show digital and typeset ink rendering of an example handwritten flow diagram.
Figure 11B:
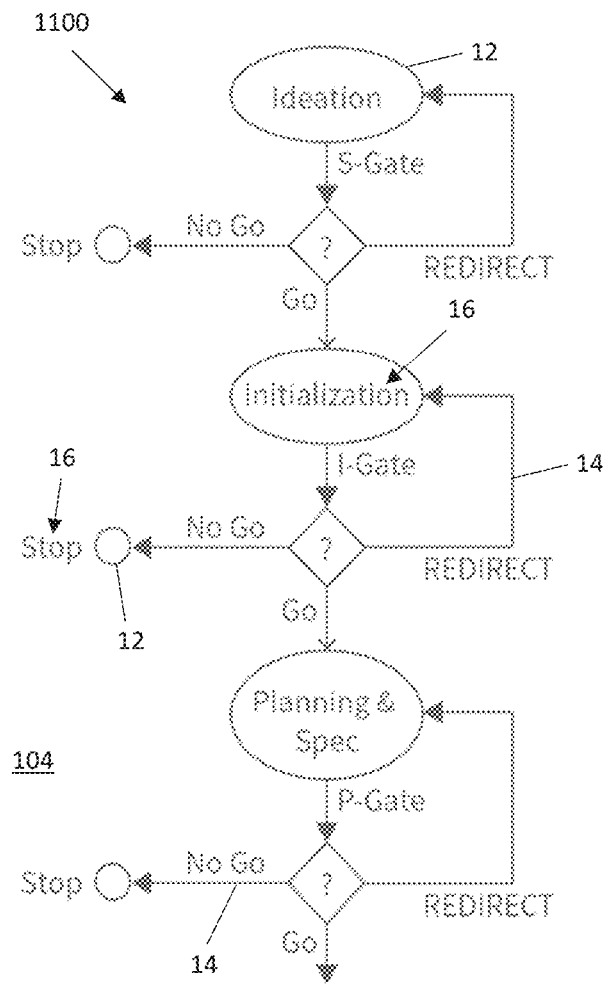

Operations and features of the application 112 in accordance with the present system and method are now described in relation to an example handwritten input of a diagram. FIG. 11A depicts the digital ink rendering of a handwritten flow diagram 1100 input on the input surface 104 of the computing device 100 using the application 112, and FIG. 11B depicts the flow diagram 1100 in typeset ink after recognition processing by the HWR system 114. Like the example diagrams described in the Background, the diagram 1100 has shape and text elements including diagram blocks or containers 12 of different types (ovals, circles and diamonds) and connectors 14 of different types (straight arrows, bent arrows, open-headed arrows and closed-headed arrows) which connect or designate relationships between the diagram blocks 12, and text 16 within some of the containers 12, outside and associated with some of the containers 12, and associated with some of the connectors 14.

Figure 12:
FIG. 12 shows digital ink rendering of an initial input of the example handwritten flow diagram of FIG. 11A.
Figure 67:
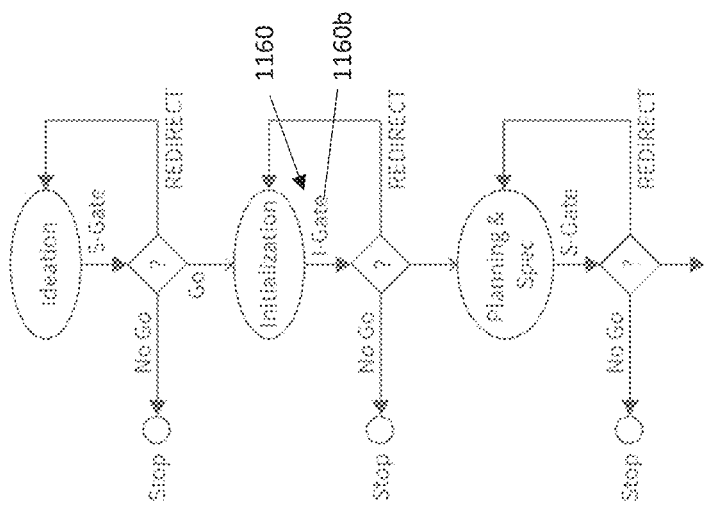
FIG. 67 shows typeset ink rendering of the further input of FIG. 66B.

The manner in which the application 112 of the present system and method detects and identifies the handwritten elements of the diagram 1100 and displays the identified and recognized elements in digital and typeset ink is now described in relation to FIGS. 12 to 67. FIGS. 12 to 67 show, in step-by-step fashion, the interface 104 of the computer device 100 having digital and typeset ink (after disambiguation and recognition by the HWR system 114) rendered from hand-drawn input to the application 112 by a user with, for example, their finger or a stylus.

Each of FIGS. 13 to 22 and 24 to 66 are presented in an "A" version example in which typesetting is not automatically performed on the hand-drawn input such that the input is displayed as (non-beautified or beautified) digital ink and a "B" version example in which incremental typesetting is performed on the hand-drawn input such that the input is first displayed as digital ink and then as typeset ink. That is, the recognition processing of the present system and method may be performed in an incremental manner as handwritten input is received or may be performed as a batch process on already input content. In the latter case, the application 112 is configurable through selection by users, for example, through UI menus, buttons or performance of gestures, to render the typeset (or beautified) ink as the incremental recognition progresses, as depicted in the "B" version examples of FIGS. 13 to 22 and 24 to 66. In the former case, display of the digital (or beautified) ink is maintained until selection by users to perform (beautification or) typesetting, as depicted in the "A" version examples of FIGS. 13 to 22 and 24 to 66.

In FIG. 12, a hand-drawn shape 1100 is displayed as a digital ink shape 1101a. The shape 1101 is hand-drawn in a single continuous stroke, detected as non-text and recognized as an oval or ellipse. Upon recognition as a closed shape, visual feedback may be provided to users (which is otherwise only ascertainable upon typesetting if incremental typesetting is not used) through specific rendering, such as color-fill within a digital ink shape.

Figure 13A:
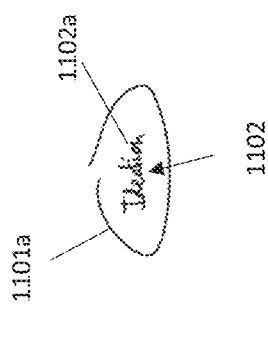
Figure 13B:
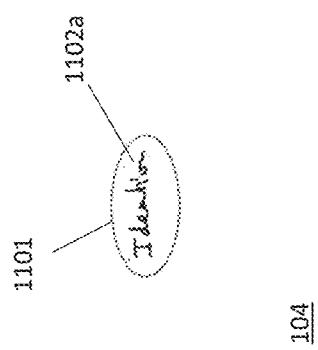

In FIG. 13A, handwritten text 1102 input within the digital ink oval 1101a is displayed as digital ink text 1102a. In FIG. 13B, the recognition result of FIG. 12 is displayed as a typeset oval 1101b, with the dimensions of the hand-drawn oval 1101 maintained, and the handwritten text 1102 input within the oval 1101 is displayed as the digital ink text 1102a within the typeset oval 1101b. The text 1102 is detected as text and recognized as the word "Ideation", and the oval 1101 is identified as a container which contains the recognized word 1102 due to the relative positions and characteristics of the inputs 1101 and 1102. A container and text contained thereby are associated with one another so that some actions performed on one of these elements causes reactions on the other element. For example, when the container is selected and moved by the user the contained text is moved with the container, and when the text is selected and enlarged or added to by the user, the container is resized to accommodate the larger text size or block. Such operations are described in more detail later.

Figure 14A:
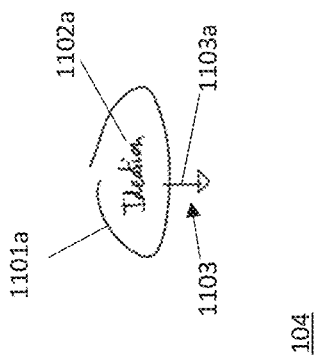
Figure 14B:
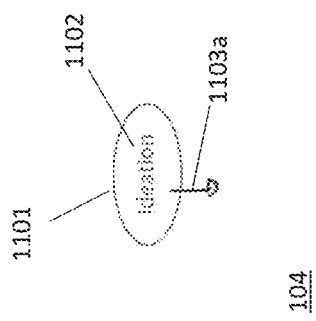

In FIG. 14A, a hand-drawn shape 1103 input beneath the oval container 1101a is displayed as a digital ink shape 1103a. In FIG. 14B, the recognition result of FIG. 13B is displayed as a typeset word 1102b within the typeset oval container 1102b, with the dimensions, and separation from the oval 1101, of the handwritten word 1102 maintained, and the hand-drawn shape 1103 input beneath the typeset oval container 1101b is displayed as the digital ink shape 1103a. The shape 1103 is hand-drawn in two strokes, the grouped strokes are detected as non-text and recognized as a close-headed arrow due to the characteristics of the shape 1103 (i.e., a line dissecting one side and the opposite point of a triangle at one of its ends). An arrow is defined as being formed by a straight or bent 'stem' terminating in one or two open- (e.g., v-shaped) or closed- (e.g., triangular) 'arrow-heads'. At this point, the arrow 1103 may be identified as a connector of the oval 1101 due to their relative positions (e.g., a pre-set spatial separation threshold is used by the application 112, where separation of an end of a linear shape to the non-linear shape below that threshold indicates a high likelihood of a connection relationship; the spatial threshold may be defined as a distance in pixels between mean points or barycenters of the strokes, for example, set to be about five pixels to about 100 pixels) and/or characteristics of the inputs 1101 and 1103 (e.g., an arrow having one end proximate or adjoining a container indicates a high likelihood of a connection relationship; with proximity defined in a distance range similar to the spatial threshold).

Alternatively, this identification may be deferred until another connected shape is input (i.e., a shape adjoining the other end of the arrow). Alternatively still or in addition, the arrow 1103 may be assigned with a certain probability of being a connector, such that the identification decision is quickly made upon the connected shape being input or upon the container 1101, for example, being selected and moved by the user such that the identified connector 1103 is moved with the container 1101. Such operations are described in more detail later. Upon identification as a connector, visual feedback may be provided to the user, such as a brief animation on the connected ends of the connector or rendering of the digital and typeset ink so that the connector ends 'contact' the boundaries of the shapes to which the connector connects.

Figure 15A:
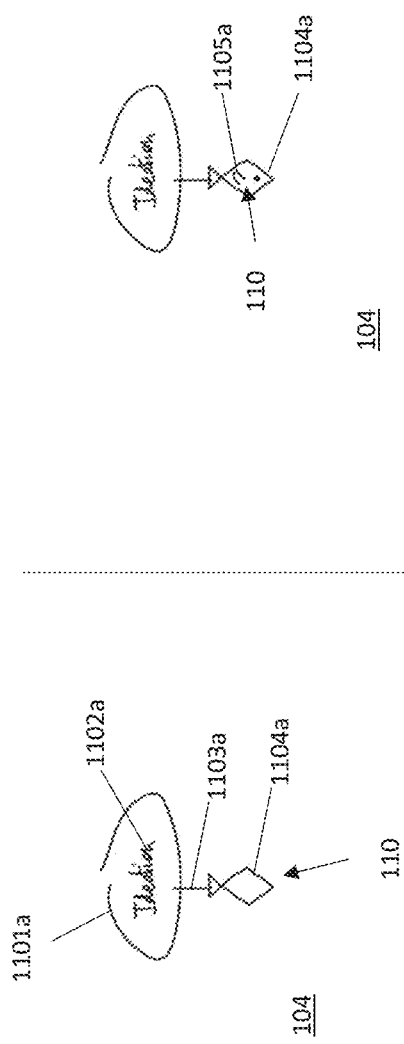

In FIG. 15A, a hand-drawn shape 1104 input beneath the connector 1104a is displayed as a digital ink shape 1104a. In FIG. 15B, the recognition result of FIG. 14B is displayed as a typeset connector arrow 1103b, with the proximate end of the hand-drawn arrow 1103 repositioned on the boundary of the typeset oval 1103b, to provide visual feedback of the identified connector status, and the extent of distal end of the hand-drawn arrow 1103 from the typeset oval 1101 maintained, and the hand-drawn shape 1104 input beneath the connector 1103 is displayed as the digital ink shape 1104a. The shape 1104 is hand-drawn in a single continuous stroke, detected as being non-text, recognized as being a diamond and identified as having one of its points connected to the connector 1103 due to the relative positions and/or characteristics of the inputs 1103 and 1104. As discussed above, this identification may be used to decide on the identification of the connector 1103. The typeset arrowhead of the connector 1103 may be rendered with a similar size to the hand-drawn arrowhead or a standardized arrowhead scaled (e.g., commensurate) with the dimensions (e.g., length, and width or ink weight, defined in pixels) of the connector may be used.

Figure 16A:
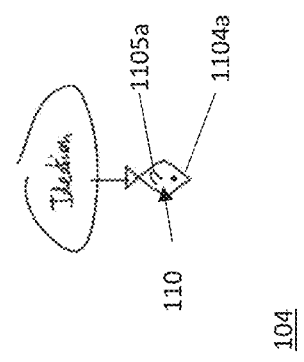

In FIG. 16A, handwritten text 1105 input within the diamond 1104a is displayed as digital ink text 1105a. In FIG. 16B, the recognition result of FIG. 15B is displayed as a typeset diamond 1104b, with the dimensions of the hand-drawn diamond 1104 maintained and the upper point repositioned at the (relative) proximate end of the typeset connector 1103b, and the handwritten text 1105 input within the diamond 1104 is displayed as the digital ink text 1105a within the typeset diamond 1104b. The text 1105 is detected as being text and recognized as being the symbol "?", and the diamond 1105 is identified as a container which contains the recognized symbol 1105 due to the relative positions and characteristics of the inputs 1104 and 1105.

Figures 17B, 18B:
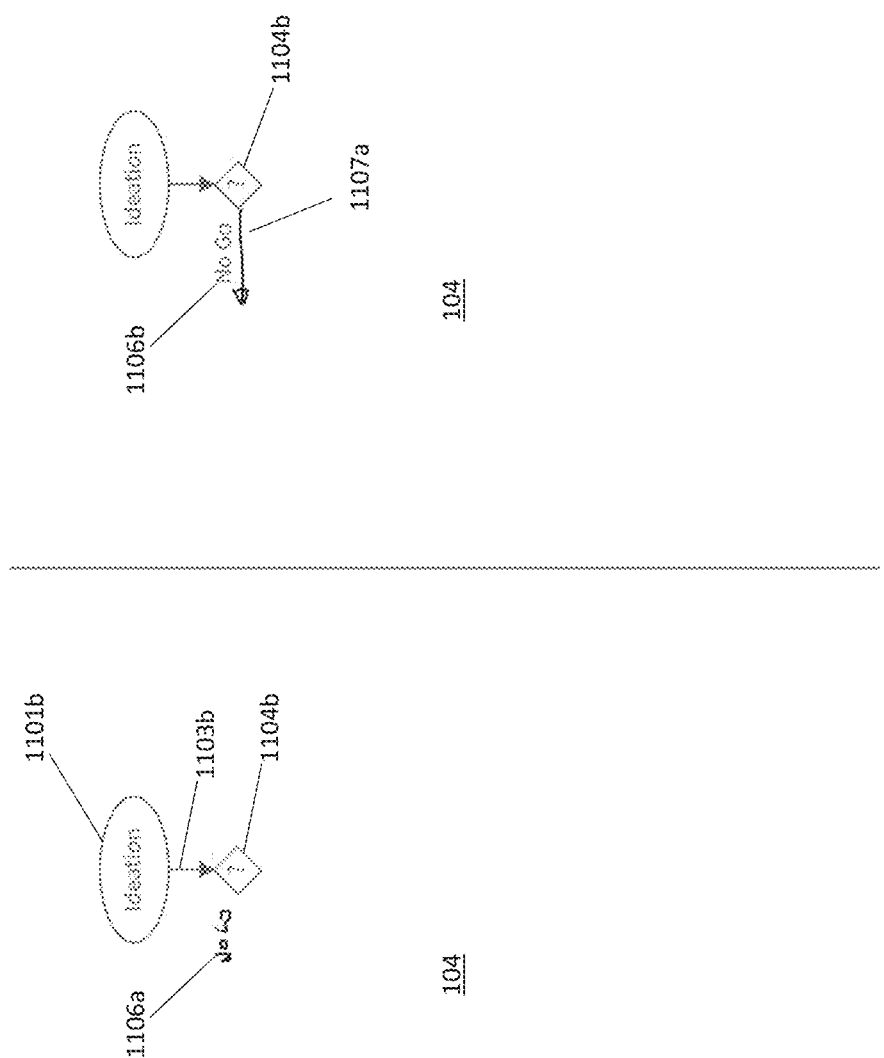

In FIG. 17A, handwritten text 1106 input to the left of the diamond 1104a is displayed as digital ink text 1106a. In FIG. 17B, the recognition result of FIG. 16B is displayed as a typeset symbol 1105b, with the dimensions, and separation from the diamond 1104, of the hand-drawn symbol 1105 maintained, and the handwritten text 1106 input to the left of the typeset diamond 1104b is displayed as the digital ink text 1106a. The text 1106 is detected as being text and recognized as being the words "No Go". At this point, the text 1106 is identified as being associated with the container 1104 due to their relative positions (e.g., a pre-set, and re-settable, spatial separation threshold is used by the application 112, where separation of geometric features of the detected text and non-text, such as mean centers or barycenters of the text and non-text blocks (defined by the x- and y-spatial extent of the text and non-text), adjacent or same positional (e.g., top) boundaries of the blocks, below that threshold indicates a high likelihood of associated objects, such as multiple associated shapes, multiple associated text blocks, and associated shapes and text blocks). This identified association means that if one of the elements 1104 or 1106 is selected and moved or edited, e.g., resized, by the user, the other element is influenced through relative movement or editing. Such operations are described in more detail later.

In FIG. 18A, a hand-drawn shape 1107 input beneath the words 1106a and from another point of the diamond 1104a is displayed as a digital ink shape 1107a. In FIG. 18B, the recognition result of FIG. 17B is displayed as typeset words 1106b, with the dimensions, and relative position to the diamond 1104, of the hand-drawn words 1106 maintained, and the hand-drawn shape 1107 input beneath the typeset words 1106b and from the another point of the typeset diamond 1104b is displayed as the digital ink shape 1107a. The shape 1107 is hand-drawn in two strokes; the grouped strokes are detected as non-text and recognized as a close-headed arrow due to the characteristics of the shape 1107. At this point, like the arrow 1103, the arrow 1107 may be identified as a connector of the diamond 1104. Further, at this point the arrow 1107 may be further identified as associated with the words 1106 due to their relative positions (determined by a pre-set separation threshold as described above) and/or characteristics of the inputs 1106 and 1107 (e.g., words positioned above an arrow), such that the text 1106 is defined as a label of the connector 1107.

This identified association may be used to dissociate the container 1104 and words 1106, for example, because the relative separation of the text 1106 from the connector 1108 is less than that from the container 1104 and/or because non-contained text (that is text not surrounded by a shape) is considered more likely to be associated with a proximate connector than other proximate shape types. Alternatively or in addition, the arrow 1107 and words 1106 may be assigned with a certain probability of being associated with one another, such that the identification decision is quickly made upon, for example, the arrow being selected and resized by the user such that the words 1106 are moved to retain their relative position to the arrow 1107. Such operations are described in more detail later.

Figure 19A:
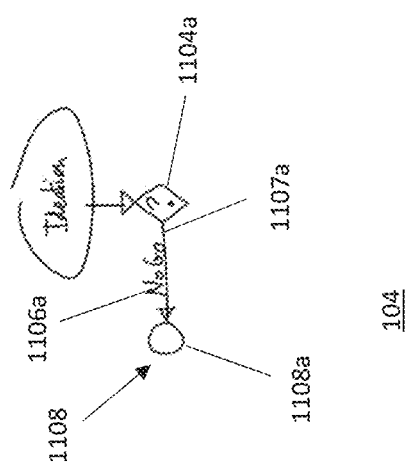
Figure 19B:
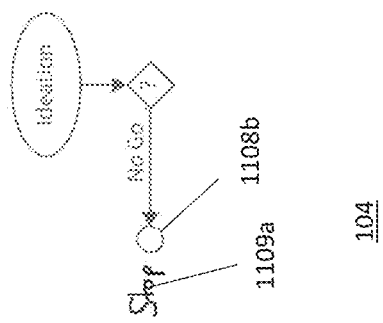

In FIG. 19A, a hand-drawn shape 1108 input to the left of the connector 1107a is displayed as a digital ink shape 1108a. In FIG. 19B, the recognition result of FIG. 18B is displayed as a typeset connector arrow 1107b, with the proximate end of the hand-drawn arrow 1107 repositioned on the point of the typeset diamond 1104b, and the extent of distal end of the hand-drawn arrow 1107 from the diamond 1104 and separation from the associated word 1106 maintained, and the hand-drawn shape 1108 input to the left of the typeset connector 1107b is displayed as the digital ink shape 1108a. The shape 1108 is hand-drawn in a single continuous stroke, detected as non-text, recognized as a circle and identified as having its boundary connected to the connector 1107 due to the relative positions and characteristics of the inputs 1107 and 1108. As discussed above, this identification result may be used to decide on or affirm the connector status of the arrow 1107. It is noted that the circle 1108 could easily have been detected as text rather than non-text, due to its similarity with the letter "o". As discussed earlier, this is avoided by the grouping and probability scoring of the shapes 1107 and 1108 due to their relative positions (and perhaps temporal input) employed by the disambiguator 116, or through correction mechanisms provided to users.

Figure 20A:
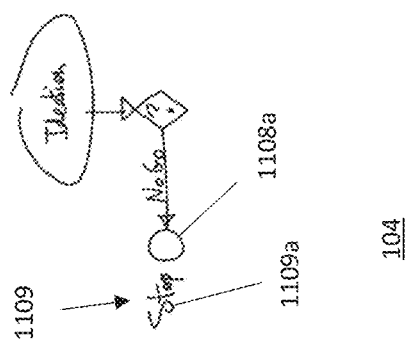
Figure 20B:
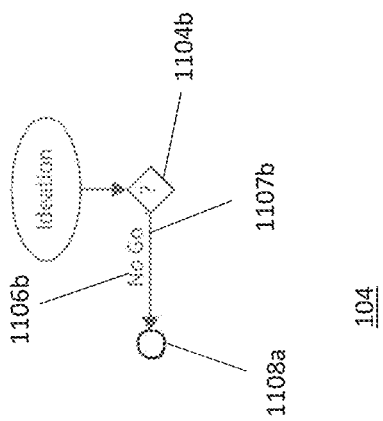

In FIG. 20A, handwritten text 1109 input to the left of the circle 1108a is displayed as digital ink text 1109a. In FIG. 20B, the recognition result of FIG. 19B is displayed as a typeset circle 1108b, with the dimensions of the hand-drawn circle 1108 maintained and the proximate boundary point repositioned at the (relative) proximate end of the typeset connector 1107b, and the handwritten text 1109 input to the left of the typeset circle 1108b is displayed as the digital ink text 1109a. The text 1109 is detected as text and recognized as the word "Stop". At this point, the text 1106 is likely identified as being associated with the shape 1108 due to their relative positions, like the container 1104 and the words 1106 at the point of FIG. 17, and as such the text 1109 is defined as a label of the container 1108.

Figure 21A:
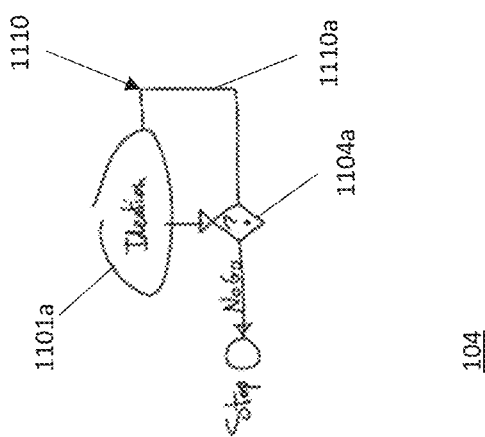
Figure 21B:
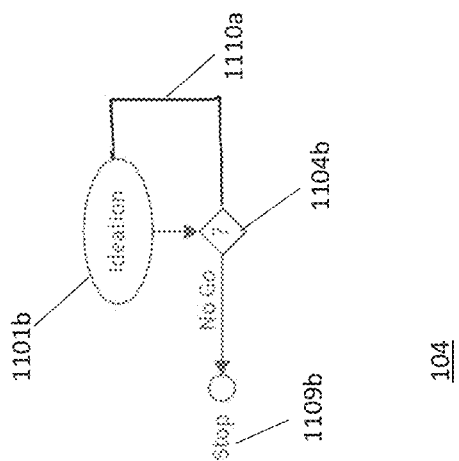

In FIG. 21A, a hand-drawn shape 1110 input to the right of the shapes 1101a and 1104a from another point of the diamond 1104a to another point on the boundary of the oval 1101a is displayed as a digital ink shape 1110a. In FIG. 21B, the recognition result of FIG. 20B is displayed as a typeset word 1109b, with the dimensions, and relative position to the typeset circle 1108b, of the hand-drawn word 1109 maintained, and the hand-drawn shape 1110 input to the right of the typeset shapes 1101b and 1104b from another point of the typeset diamond 1104b to another point on the boundary of the typeset oval 1101b is displayed as the digital ink shape 1110a. The shape 1110 is hand-drawn in a single continuous stroke, detected as non-text and recognized as a bent line due to the characteristics of the shape 1110. At this point, because the ends of the line respectively adjoin the containers 1101 and 1104, the bent line 1110 is identified as a connector connecting these containers. This identification result is made without the presence of a connector element, such as an arrowhead. This is because the above-described spatial threshold for the high likelihood of connector detection is satisfied regardless of the presence of such connector elements.

Figure 22A:
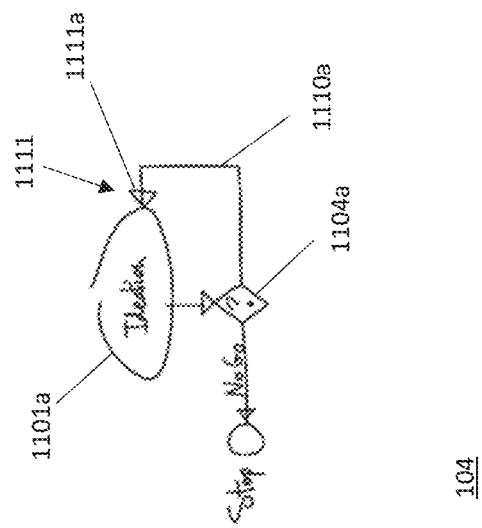
Figure 22B:
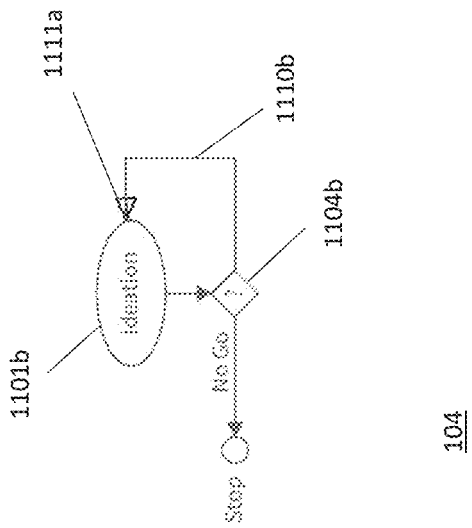

In FIG. 22A, a hand-drawn shape 1111 input over the end of the connector 1110a proximate the oval 1101a is displayed as a digital ink shape 1111a. In FIG. 22B, the recognition result of FIG. 21B is displayed as a typeset bent connector 1110b, with one end of the hand-drawn connector 1110 repositioned on the point of the typeset diamond 1104b and the other end of the hand-drawn connector 1110 repositioned on the boundary of the typeset oval 1101b, and the dimensions of the bends within the hand-drawn line 1110 maintained, and the hand-drawn shape 1111 input over the end of the typeset connector 1110b proximate the typeset oval 1101b is displayed as the digital ink shape 1111a. The shape 1111 is hand-drawn in a single continuous stroke, detected as non-text and recognized as a closed arrowhead due to the characteristics of the shape 1111 (i.e., a triangle having one side and the opposite point intersected by the line 1110 at one of its ends). This determination of an arrowhead added to the line 1110 can be used to affirm the connector status of the line 1110, for example, by an increase in an overall probability score, as follows.

Each of the arrows 1103, 1107 and 1110 are hand-drawn using two strokes. However, the input timing of the individual strokes of each arrow differs such that the returned recognition of the HWR system 114 with respect to typesetting of the input differs. That is, the strokes of the arrows 1103 and 1107 are drawn within a relatively short space of time, say, within one second, such that they are classed together as non-text by the disambiguator 116 for parsing to the recognizer 118 (e.g., a pre-set, and re-settable, temporal separation threshold is used by the application 112, where the time separation between drawing strokes below that threshold indicates a high likelihood of the strokes being parts of a single shape), and as such the typeset arrows 1103b and 1107b are output by the HWR system 114. On the other hand, the strokes 1110 and 1111 of the arrow 1110 are drawn within a relatively long space of time, say, more than one second (e.g., greater than the temporal separation threshold), such that the stroke 1110 is parsed to the recognizer 118 alone and output as the typeset line 1110b. The proper identification of the complete connector arrow 1110 is provided however through the overall probability score calculated from spatial and temporal scores and metrics or characteristics of the input strokes. That is, while the temporal score for the strokes 1110 and 1111 being part of the same object is low, the combination of the high spatial score for the strokes 1110 and 1111 being part of the same object, based on the characteristics (i.e., the line 1110 dissecting the shape 1111) result in the overall probability of the strokes 1110 and 1111 belonging to one shape being high.

Figure 23:
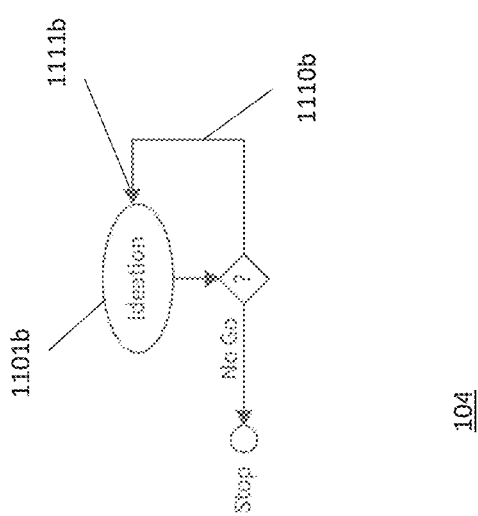
FIG. 23 shows typeset ink rendering of previous inputs of the example handwritten flow diagram subsequent to the input of FIG. 22B.

This is illustrated in FIG. 23 for the incremental typesetting example, where the recognition result of FIG. 22B is displayed as a typeset connector arrowhead 1111b, with the point of the hand-drawn arrowhead 1111 repositioned on the end of the typeset line 1110b and on the boundary of the typeset oval 1101b, thereby reforming the typeset connector 1110b as a connector arrow as a result of the above-described processing.

Figure 24A:
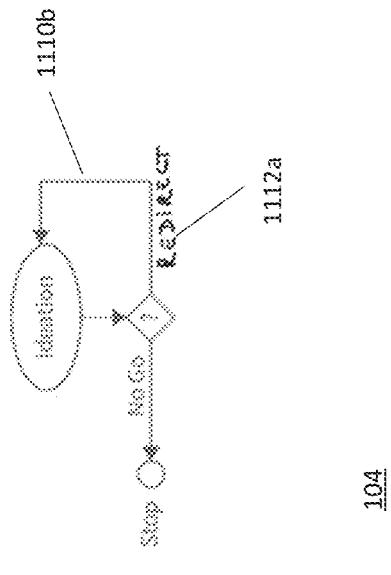
Figure 24B:
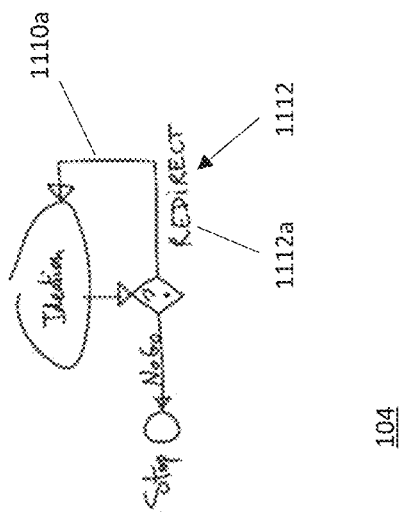

In FIG. 24A, handwritten text 1112 input below the connector arrow 1110a is displayed as digital ink text 1112a. In FIG. 24B, the handwritten text 1112 input below the typeset connector arrow 1110b of the recognition result of FIG. 23 is displayed as the digital ink text 1112a. The text 1112 is detected as text and recognized as the word "REDIRECT". The text 1112 is identified as being associated with the connector 1110 due to their relative positions.

Figure 25A:
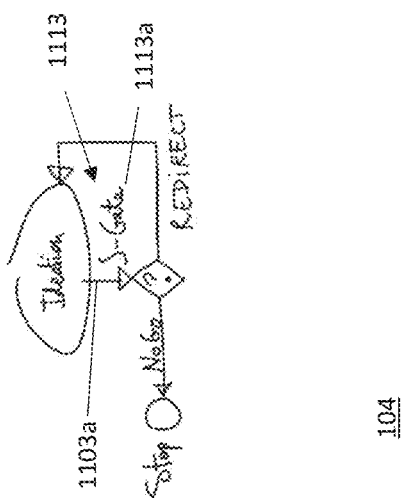

In FIG. 25A, handwritten text 1113 input to the right of the connector 1103a is displayed as digital ink text 1113a. In FIG. 25B, the recognition result of FIG. 24B is displayed as a typeset word 1112b, with the dimensions, and relative position to the typeset connector 1110b, of the hand-drawn word 1112 maintained. Accordingly, it can be seen from the detected inputs and associations of FIGS. 17 and 18, and FIGS. 24 and 25, that the identification of connectors and associated text (e.g., connector labels) is made by the present system and method regardless of the order in which these elements are input. Further in FIG. 25B, the handwritten text 1113 input to the right of the typeset connector 1103b is displayed as the digital ink text 1113a. The text 1113 is detected as being text and recognized as being the term "S-Gate". The text 1113 is identified as being associated with the connector 1103 due to their relative positions (e.g., the text 1113 is not contained in a shape and is closer to the connector 1103 than any of the other elements of the diagram 1100).

Figure 26A:
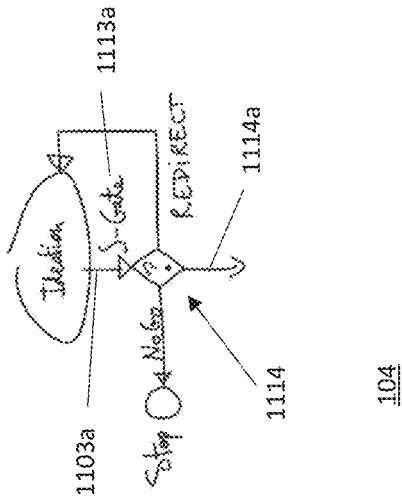
Figures 25B, 26B:
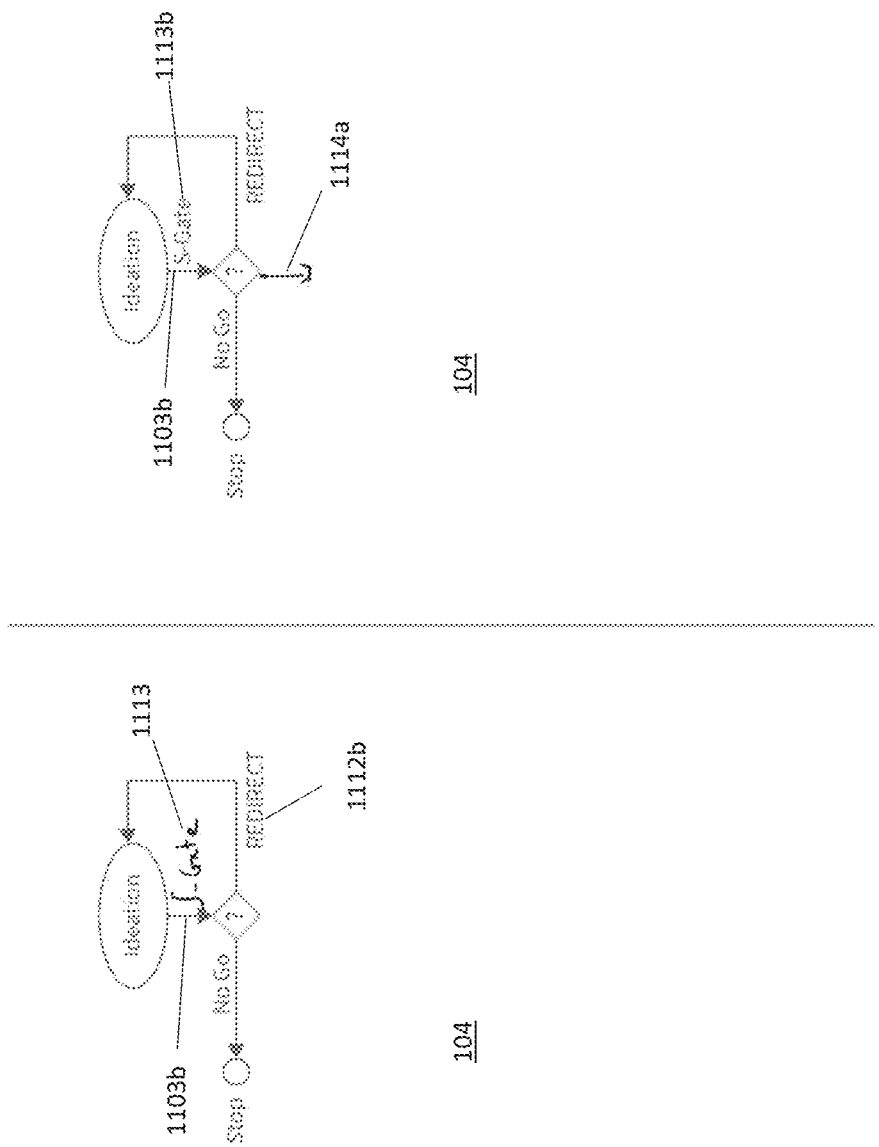

In FIG. 26A, a hand-drawn shape 1114 input beneath the diamond 1104a from another point of the diamond 1104a is displayed as a digital ink shape 1114a. In FIG. 26B, the recognition result of FIG. 25B is displayed as a typeset term 1113b, with the dimensions, and relative position to the typeset connector 1103b, of the hand-drawn term 1113 maintained, and the hand-drawn shape 1114 input beneath the typeset diamond 1104b from another point of the typeset diamond 1104b is displayed as the digital ink shape 1114a. The shape 1110 is hand-drawn in two strokes; the grouped strokes are detected as non-text and recognized as an open-headed arrow due to the characteristics of the shape 1114. As before, the arrow 1114 may be determined at this point to be a connector due to its relationship with the container 1104 and its arrow characteristic.

Figure 27A:
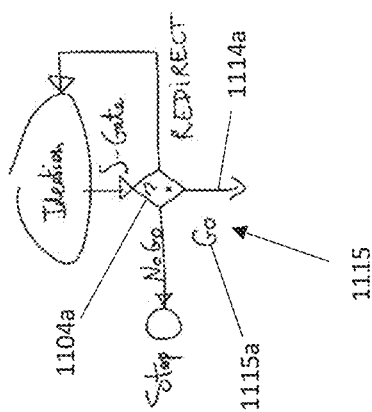
Figure 27B:
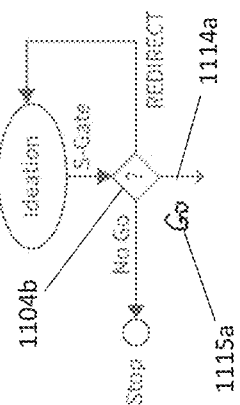

In FIG. 27A, handwritten text 1115 input to the left of the connector arrow 1114a is displayed as digital ink text 1115a. In FIG. 27B, the recognition result of FIG. 26B is displayed as a typeset connector arrow 1114b, with the proximate end of the hand-drawn arrow 1114 repositioned on the point of the typeset diamond 1104b, and the extent of distal end of the hand-drawn arrow 1114 from the typeset diamond 1104b maintained, and the handwritten text 1115 input to the left of the typeset connector arrow 1114b is displayed as the digital ink text 1115a. The text 1115 is detected as text and recognized as the word "Go". The text 1115 is identified as being associated with the connector 1114 due to their relative positions.

Figure 28A:
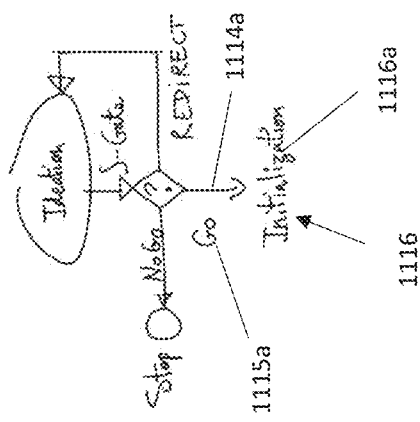
Figure 28B:
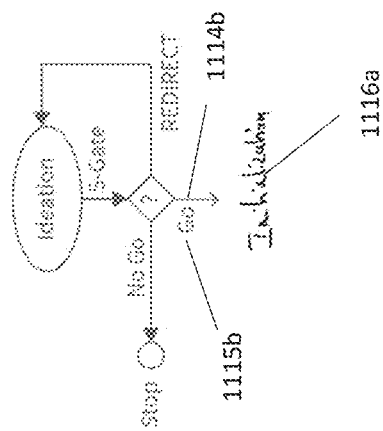

In FIG. 28A, handwritten text 1116 input below the connector 1114a is displayed as digital ink text 1116a. In FIG. 28B, the recognition result of FIG. 27B is displayed as a typeset word 1115b, with the dimensions, and relative position to the typeset connector 1114b, of the hand-drawn word 1115 maintained, and the handwritten text 1116 input below the typeset connector 1114b is displayed as the digital ink text 1116a. The text 1116 is detected as text and recognized as the word "Initialization". At this point, the text 1116 may be identified as being associated with the connector 1114 due to their relative positions (e.g., determined by the separation threshold) and/or characteristics of the inputs 1114 and 1116 (e.g., words positioned below the head of an arrow). This detected association is performed without the presence of a container for the text 1116.

Figure 29A:
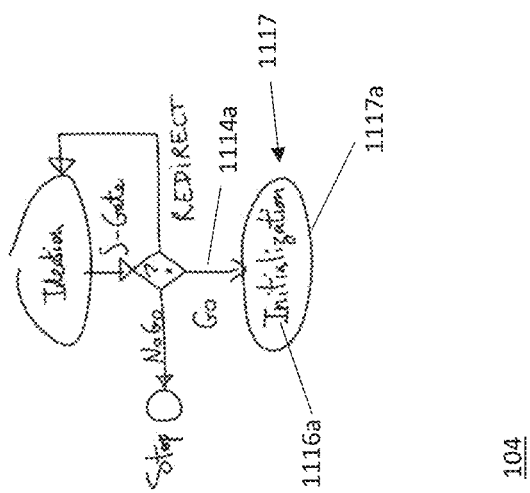
Figure 29B:
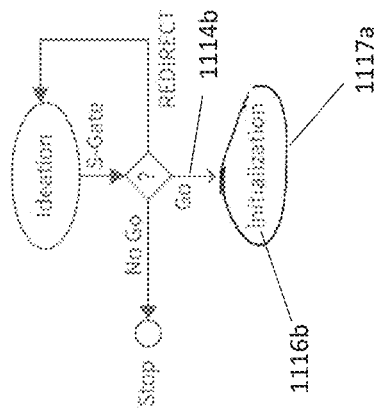

In FIG. 29A, a hand-drawn shape 1117 input to surround the word 1116a is displayed as a digital ink shape 1117a. In FIG. 29B, the recognition result of FIG. 28B is displayed as a typeset word 1116b, with the dimensions, and relative position to the typeset connector 1114b, of the hand-drawn word 1116 maintained. Accordingly, it can be seen from the detected inputs and associations of FIGS. 12 and 13, and FIGS. 28 and 29, that the identification of containers and contained text is made by the present system and method regardless of the order in which these elements are input. Further, the hand-drawn shape 1117 input to surround the typeset word 1116b is displayed as the digital ink shape 1117a. The shape 1117 is hand-drawn in a single, continuous stroke, detected as non-text, identified as a container which contains the word 1116 due to the relative positions and characteristics of the inputs 1116 and 1117, and recognized as an oval. The determination of the container 1117 can be used to affirm the connector status of the arrow 1114, for example, by an increase in the overall probability score due to the arrow 1114 being positioned between the containers 1104 and 1117.

Figure 30A:
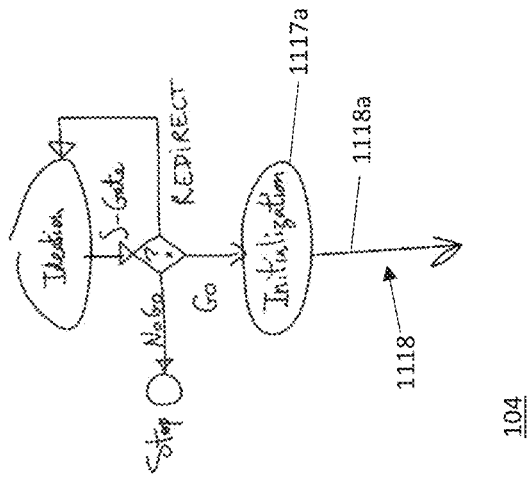
Figure 30B:
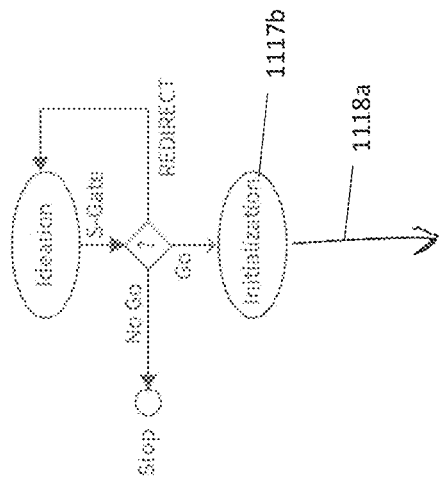

In FIG. 30A, a hand-drawn shape 1118 input beneath the container 1117a is displayed as a digital ink shape 1118a. In FIG. 30B, the recognition result of FIG. 29B is displayed as a typeset oval 1117b, with the dimensions of the hand-drawn oval 1117 maintained and the separation from the head of the typeset arrow 1116 maintained (this is done here to show that the rendering of all of different types of connectors, e.g., close-headed arrows versus open-headed arrows, need not be adjusted to actually 'connect' with the connected shapes in order to be considered a connector) and the hand-drawn shape 1118 input beneath the typeset container 1117 is displayed as the digital ink shape 1118a. The shape 1118 is hand-drawn in a single continuous stroke, detected as non-text and recognized as an open-headed arrow due to the characteristics of the shape 1118. As before, the arrow 1118 may be determined at this point to be a connector due to its arrow characteristic and its relationship with the container 1117.

Figure 31A:
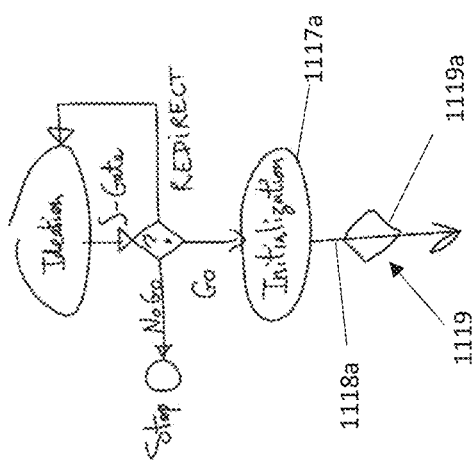

In FIG. 31A, a hand-drawn shape 1119 input beneath the connector 1104a overlaying part of the arrow 1118a is displayed as a digital ink shape 1119a. In FIG. 31B, the recognition result of FIG. 30B is displayed as a typeset connector arrow 1118b, with the proximate end of the hand-drawn arrow 1118 repositioned on the typeset oval 1117 and the extent of distal end of the hand-drawn arrow 1118 from the typeset oval 1117 maintained, and the hand-drawn shape 1119 input beneath the typeset connector 1104 overlaying part of the typeset arrow 1118 is displayed as the digital ink shape 1119a. The shape 1119 is hand-drawn in a single continuous stroke, detected as non-text, recognized as a diamond and identified as having its upper and lower points intersected by the connector 1118 due to the relative positions and/or characteristics of the inputs 1118 and 1119. At this point, the determination of the diamond 1119 as a (probable) container and a connection association between the diamond 1119 and the (probable) connector arrow 1118 may be assigned low probability scores since the diamond 1119 is not positioned proximate the 'free' end of the connector 1118 (e.g., at the arrowhead).

Figure 32A:
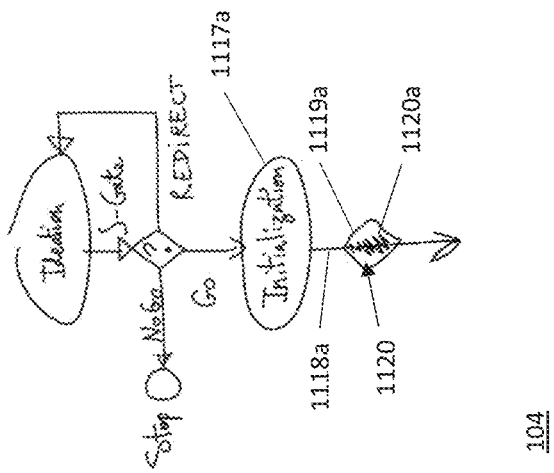

In FIG. 32A, a hand-drawn input 1120 within the diamond 1119a and overlaying the portion of the connector 1118a there within is displayed as digital ink 1120a. In FIG. 32B, the recognition result of FIG. 31B is displayed as a typeset diamond 1119b, with the dimensions of the hand-drawn diamond 1119 maintained and the upper and lower points repositioned on the typeset connector 1118, and the hand-drawn input 1120 within the typeset diamond 1119 and overlaying the portion of the typeset connector 1118 there within is displayed as the digital ink 1120a within the typeset diamond 1119b. The input 1120 is detected as a handwritten editing gesture and identified as a scratch-out on the stem portion of the arrow 1118 within the diamond 1119. This scratch-out editing operation is interpreted by the application 112 as an erasure of the portion of the arrow 1118 within the diamond 1119b. As a result, the arrow 1118 is split into two shapes, one a line between the container 1117 and the top point of the diamond 1119 and the other an arrow projecting from the bottom point of the diamond 1119. At this point, the line is identified as a connector between the container 1117 and the diamond 1119 and the arrow is identified as a likely connector due to its arrow characteristic and its relationship with the shape 1119, with consequential detection of the diamond 1119 as likely being a container.

In FIG. 33A, the erasure identification causes the digital ink arrow 1118a to be split into a line connector 1121 displayed as digital ink line 1121a between the containers 1117a and 1119a and an arrow 1122 displayed as digital ink arrow 1122a projecting from the bottom of the container 1119a. Further, a hand-drawn shape 1123 input over the end of the connector 1121a proximate the diamond 1119a is displayed as a digital ink shape 1123a. In FIG. 33B, the erasure identification causes the typeset arrow 1118b to be split into the line connector 1121 displayed as a typeset line connector 1121b between the typeset containers 1117b and 1119b and the arrow 1122 displayed as a typeset arrow 1122b projecting from the bottom of the typeset container 1119b. Further, the hand-drawn shape 1123 input over the end of the typeset connector 1121 proximate the typeset diamond 1119b is displayed as the digital ink shape 1123a. The shape 1123 is hand-drawn in a single continuous stroke, detected as non-text and recognized as a closed arrowhead due to the characteristics of the shape 1123. This determination of an arrowhead added to the line 1121 can be used to affirm the connector status of the line 1121 in the manner described earlier. Further, at this point the newly split arrow 1122 may be determined to be a connector due to its relationship with the container 1119 and its arrow characteristic.

In FIG. 34A, handwritten text 1124 input within the diamond 1119a is displayed as digital ink text 1124a. In FIG.

34B, the recognition result of FIG. 33B is displayed as a typeset connector arrowhead 1123b, with the point of the hand-drawn arrowhead 1123 repositioned on the end of the typeset line 1121b and on the top point of the typeset diamond 1119b, thereby reforming the typeset connector 1121b as a connector arrow as a result of the above-described processing. Further, the handwritten text 1124 input within the typeset diamond 1119b is displayed as the digital ink text 1124a within the typeset diamond 1119b. The text 1124 is detected as text and recognized as the symbol "?", and the identification of the diamond 1119 as being a container is affirmed as it contains the recognized symbol 1124.

Figure 35A:
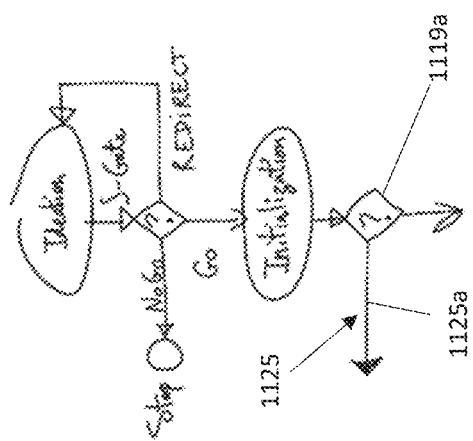
Figure 35B:
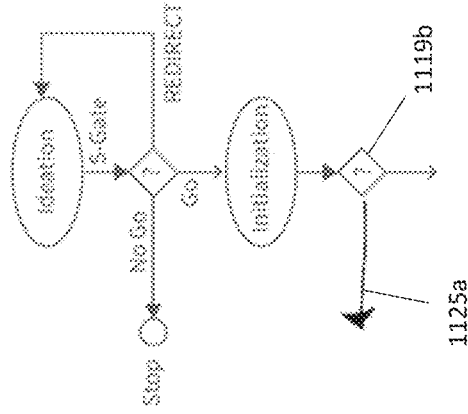

In FIG. 35A, a hand-drawn shape 1125 input from another point of the diamond 1119a is displayed as a digital ink shape 1125a. In FIG. 35B, the recognition result of FIG. 34B is displayed as a typeset symbol 1124b, with the dimensions, and separation from the typeset diamond 1119b, of the hand-drawn symbol 1124 maintained, and the hand-drawn shape 1125 input from the point of the typeset diamond 1119b is displayed as the digital ink shape 1125a. The shape 1125 is hand-drawn with multiple strokes, detected as non-text and recognized as a closed-headed arrow due to the characteristics of the shape 1125. As before, the arrow 1125 may be determined at this point to be a connector due to its arrow characteristic and its relationship with the container 1119.

Figure 36A:
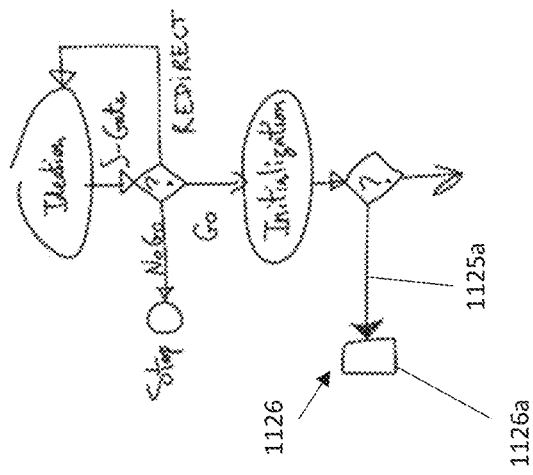
Figure 36B:
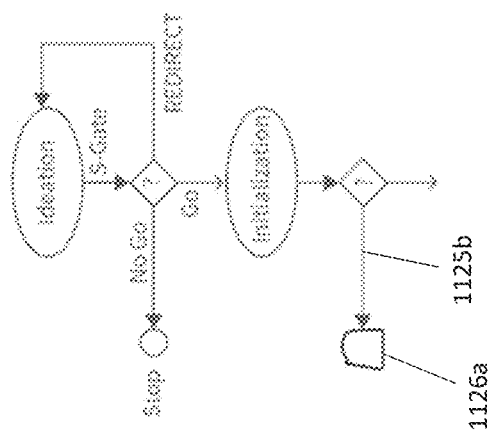

In FIG. 36A, a hand-drawn shape 1126 input to the left of the connector 1125a is displayed as a digital ink shape 1126a. In FIG. 36B, the recognition result of FIG. 35B is displayed as a typeset connector arrow 1125b, with the proximate end of the hand-drawn arrow 1125 repositioned on the proximate point of the typeset diamond 1119b and the extent of distal end of the hand-drawn arrow 1125 from the typeset container 1119b maintained, and the hand-drawn shape 1126 input to the left of the typeset connector 1125b is displayed as the digital ink shape 1126a. The shape 1126 is hand-drawn in a single continuous stroke, detected as non-text, recognized as a square and identified as having its boundary connected to the connector 1125 due to the relative positions and characteristics of the inputs 1125 and 1126. As discussed earlier, this identification result may be used to affirm the connector status of the arrow 1125.

The previously described recognized closed-headed arrows include hand-drawn non-filled or un-filled triangles as arrowheads which are rendered by the application 112 into non-filled closed arrowheads in the digital ink and into filled closed arrowheads in the typeset ink (see, for example, FIGS. 14 and 15). In contrast, the closed-headed arrow 1125 includes a hand-drawn, filled (using multiple strokes or a single continuous stroke with many changes in direction) triangle as an arrowhead which is rendered by the application 112 into a filled closed arrow-head in the digital ink (see FIG. 35A) and into a filled closed arrowhead in the typeset ink (see FIG. 36B). Accordingly, the typeset result is the same. Alternatively, non-filled arrowheads can be retained in the typeset ink, as selectable by users through the UI of the application 112.

Figure 37A:
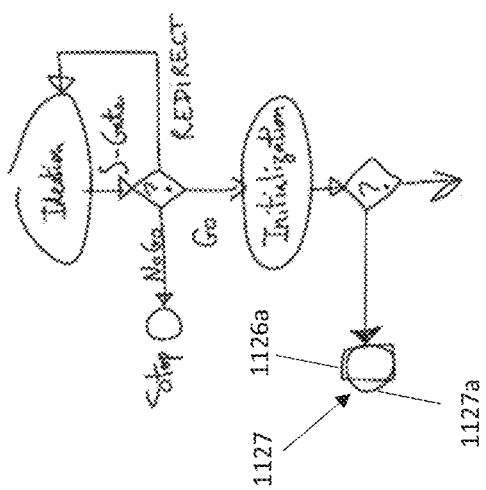
Figure 37B:
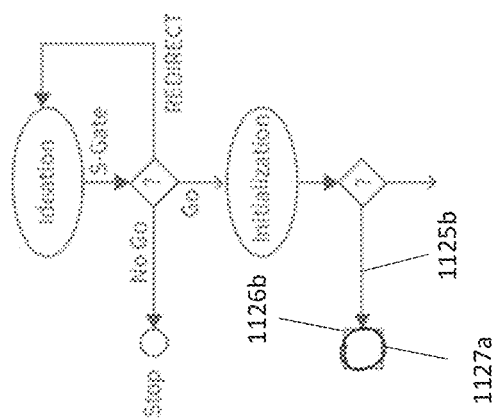

In FIG. 37A, a hand-drawn shape 1127 is displayed as a digital ink shape 1127a overlaying the square 1126a. In FIG. 37B, the recognition result of FIG. 36B is displayed as a typeset square 1126b, with the dimensions of the hand-drawn square 1126 maintained and the proximate boundary point repositioned at the (relative) proximate end of the typeset connector 1125b, and the hand-drawn shape 1127 is displayed as the digital ink shape 1127a overlaying the typeset square 1126b. The shape 1127 is hand-drawn in a single continuous stroke, detected as non-text and recognized as a circle. The detection of a shape substantially overlaying a previously identified shape is interpreted by the application 112 as an overwrite or replacement gesture. For example, a pre-set, and re-settable, geometric threshold is used by the application 112, where the average or mean distance between linear points, boundaries or peripheries of overlaid geometric shapes less than that threshold indicates a high likelihood of an overwrite gesture. Accordingly, the overwritten shape is deleted or omitted from display (together with or without text contained thereby, for example) and replaced with the new shape.

Figure 38A:
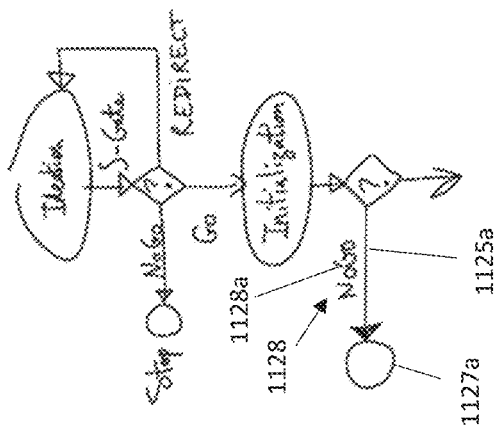
Figure 38B:
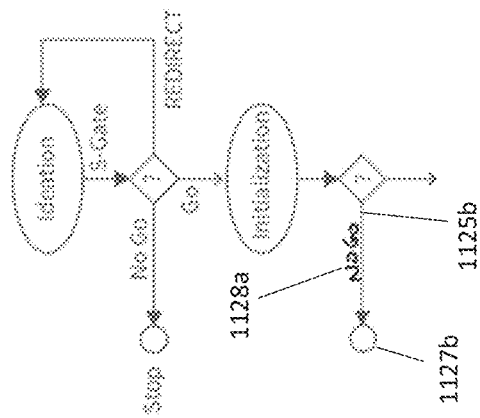

In FIG. 38A, the detected overwrite gesture causes replacement of the square 1126a with a circle 1127 displayed as a digital ink circle 1127a and handwritten text 1128 input above the connector arrow 1125a is displayed as digital ink text 1128a. In FIG. 38B, the detected overwrite gesture causes replacement of the typeset square 1126b with the circle 1127 displayed as a typeset circle 1127b, with the dimensions of the hand-drawn circle 1127 maintained and the proximate boundary point repositioned at the (relative) proximate end of the typeset connector 1125b, and the handwritten text 1128 input above the typeset connector arrow 1125b is displayed as the digital ink text 1128a. The text 1128 is detected as text and recognized as the words "No Go". The text 1128 is identified as associated with the connector 1125 due to their relative positions.

Figure 39A:
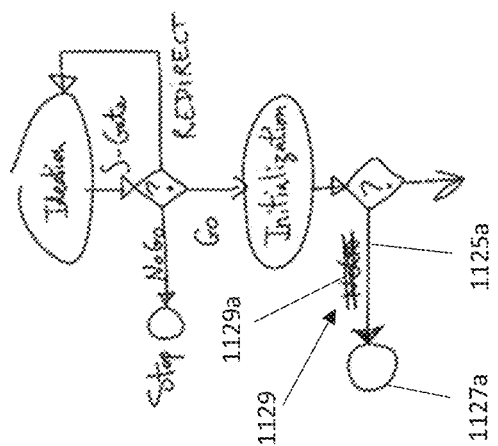
Figure 39B:
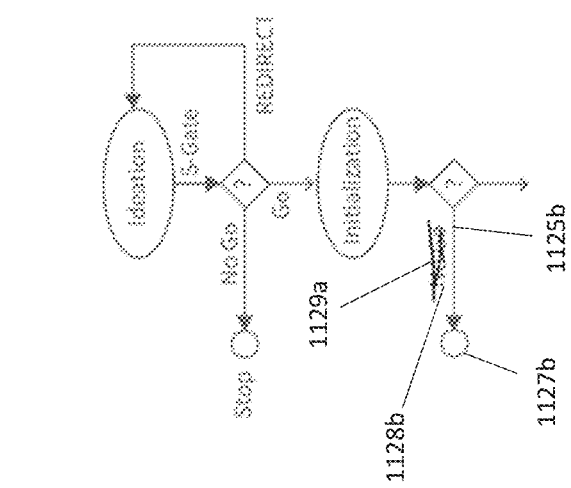

In FIG. 39A, a hand-drawn input 1129 is displayed as digital ink 1129a overlaying the words 1128a. In FIG. 39B, the recognition result of FIG. 38B is displayed as typeset words 1128b, with the dimensions, and relative position to the typeset connector 1125b, of the hand-drawn words 1128 maintained, and the hand-drawn input 1129 is displayed as the digital ink 1129a overlaying the typeset words 1128b. The input 1129 is detected as a handwritten editing gesture and identified as a scratch-out on the words 1128. This scratch-out editing operation is interpreted by the application 112 as an erasure of the words 1128.

Figure 40A:
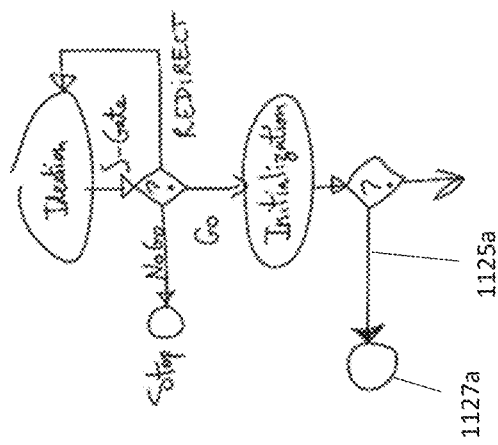
Figure 40B:
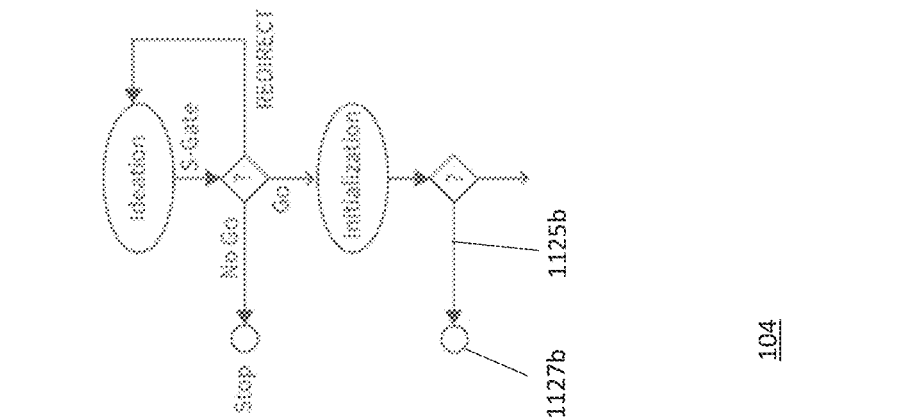

In FIG. 40A, the detected erasure causes removal of the digital ink words 1128a from display and in FIG. 40B, the detected erasure causes removal of the typeset words 1128b from display.

Figure 41A:
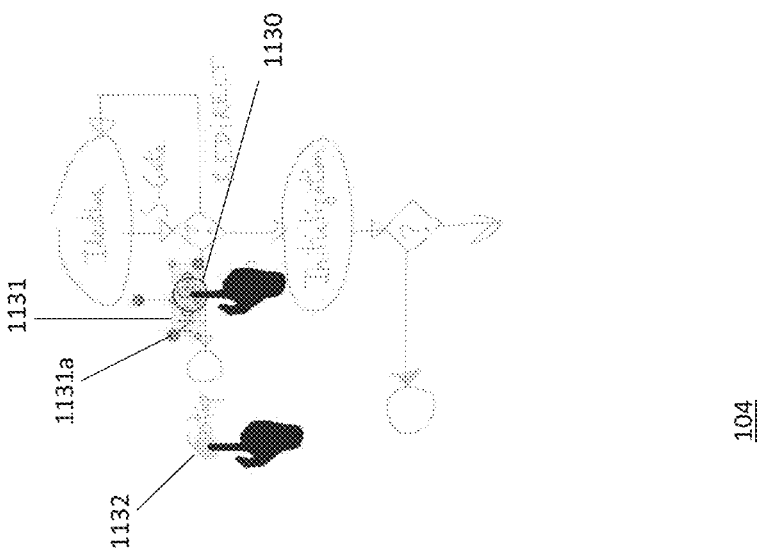

In FIG. 41A, a gesture input 1130 is detected and identified as selection of the label 1106a of the connector 1107a thereby causing display of a selection box 1131 surrounding the label 1106a replaced by display of a selected typeset label 1106c, having selection mode properties described below, thereby providing the user with visual feedback of the identified gesture. The gesture 1130 is, for example, a long tap on the interface surface 104 of the computing device 100 as depicted in FIG. 41. Such a gesture and its relative timing of "long" are well understand by one of ordinary skill in the art.

In FIG. 41B, the detection of the selection gesture causes display of the selection box 1131 surrounding the typeset label 1106b also replaced by display of the selected typeset label 1106c. The selection box 1131 is displayed with handles 1131a for providing interaction operations on the content. Depending of the selection gesture employed, different selection modes can be initiated. For example, the long press selection gesture illustrated in FIG. 40 is detected by the application 112 as initiating a multi-selection mode, i.e., the selection of multiple elements, such that the application 112 expects subsequent selection of other diagram elements.

Accordingly in FIG. 41A, a subsequent gesture input 1132 is detected and identified as selection of the label 1109a of the container 1108*a* and in FIG. 41B detected and identified as selection of the typeset label 1109*b* of the typeset container 1108*b*. The gesture 1132 is, for example, a short tap on the interface surface 104 of the computing device 100 as depicted in FIG. 41. Such a gesture and its relative timing of "short" are well understand by one of ordinary skill in the art. While a selection mode is active, the selected elements of the diagram 1110 are displayed as typeset versions which have different properties to the un-selected typeset versions (e.g., a different color and/or greater ink weight). Further, the non-selected elements of the diagram 1100 may be displayed differently to the normal rendering (e.g., with reduced opacity or ink weight, say at about 20% to about 50%, as shown in FIG. 41).

As discussed above, during selection of shapes, including containers and connectors, and text temporary selection mode display is made to provide visual feedback to users of the detected selection. The selection mode display can be rendered in a number of ways. For example, both digital ink and typeset ink may be displayed as selected typeset ink having the selection mode properties described above. Alternatively, typeset ink may be displayed as selected typeset ink and for the digital ink, both the digital ink and the corresponding typeset ink may be displayed together, with the typeset ink displayed as selected typeset ink and the digital ink displayed with reduced emphasis, like the non-selection properties described above. Several examples of this selection mode rendering are shown in FIGS. 68 to 72.

Figure 68A:
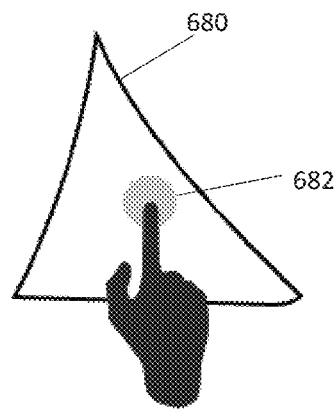
FIGS. 68A and 68B respectively show selection and selection mode display of a digital ink shape.

In FIG. 68A, a hand-drawn shape is displayed as a digital ink shape 680 with no other shape or text content. The shape 680 is detected as non-text and recognized as a triangle. Further, a gesture input 682 made within the triangle 680 is detected and identified as selection of the triangle 680. The gesture 682 is, for example, a long tap on the interface surface 104 of the computing device 100 as depicted in FIG. 68A.

Figure 68B:
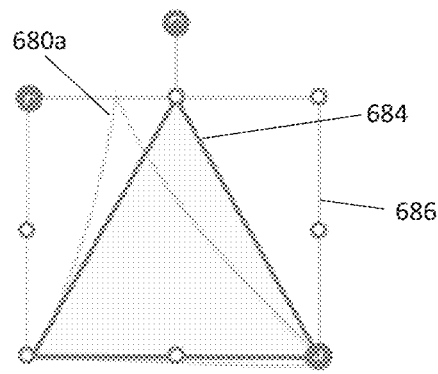

In FIG. 68B, the detection of the selection gesture causes display of a digital ink triangle 680*a* with reduced emphasis (e.g., greyed-out) and overlaid with a selected typeset ink triangle 684 rendered with heightened emphasis (e.g., with a different color and color-filling within the triangle) and bounded by a bounding (selection) box 686 (the color-filling may be within the entire bounding box rather than just the bounded shape). In this way, users are provided with feedback of the selection detection and a sense of the typesetted extent of the hand-drawn shape, to guide movement and re-sizing operations for example, while maintaining display of the original input content.

Figure 69A:
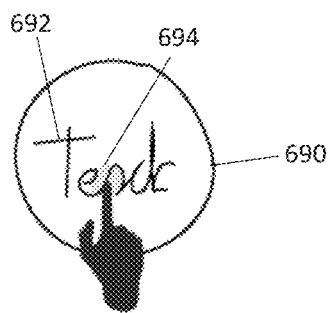
FIGS. 69A and 69B respectively show selection and selection mode display of digital ink text within a digital ink shape.

In FIG. 69A, a hand-drawn shape and text are displayed as a digital ink shape 690 and digital ink text 692, respectively. The shape 690 is detected as non-text and recognized as a circle, the text 692 is detected as text and recognized as the word "Text", and the shape 690 is identified as a container containing the word 692. Further, a gesture input 694 made on the word 692 is detected and identified as selection of the word 692. The gesture 694 is, for example, a long tap on the interface surface 104 of the computing device 100 as depicted in FIG. 69A.

Figure 69B:
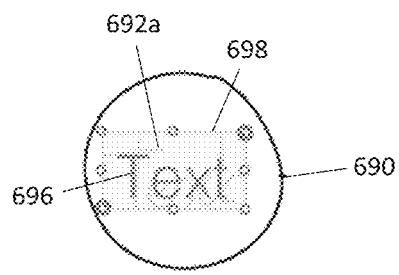

In FIG. 69B, the detection of the selection gesture causes display of a digital ink word 692*a* with reduced emphasis (e.g., greyed-out) and overlaid with a selected typeset ink word 696 rendered with heightened emphasis (e.g., with a different color) and bounded by a bounding (selection) box 698 (with color-filling), while display of the digital ink circle 690 is maintained. In this way, users are provided with feedback of the selection detection and a sense of the typesetted extent of the handwritten text, to guide movement and re-sizing operations for example, while maintaining display of the original input content.

Figure 70A:
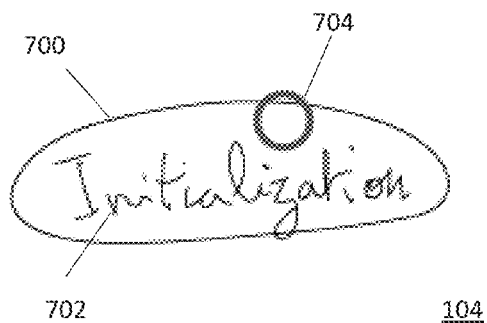
FIGS. 70A and 70B respectively show selection and selection mode display of a digital ink shape containing digital ink text.

In FIG. 70A, a hand-drawn shape and text are displayed as a digital ink shape 700 and digital ink text 702, respectively. The shape 700 is detected as non-text and recognized as an ellipse, the text 702 is detected as text and recognized as the word "Initialization", and the shape 700 is identified as a container containing the word 702. Further, a gesture input 704 made on the boundary or periphery of the ellipse 700 is detected and identified as selection of the ellipse 700. The gesture 704 is, for example, a long tap on the interface surface 104 of the computing device 100 as depicted in FIG. 70A.

Figure 70B:
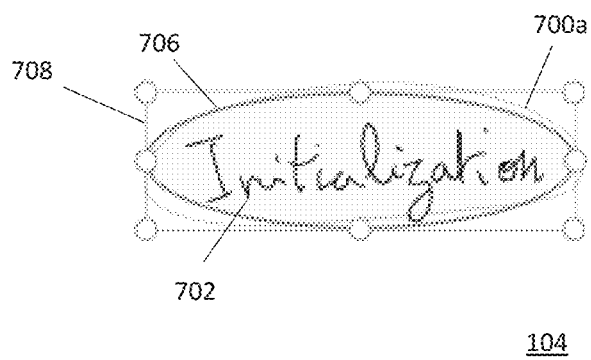

In FIG. 70B, the detection of the selection gesture causes display of a digital ink ellipse 700*a* with reduced emphasis (e.g., greyed-out) and overlaid with a selected typeset ink ellipse 706 rendered with heightened emphasis (e.g., with a different color and color-filling within the ellipse) and bounded by a bounding (selection) box 708, while display of the digital ink word 702 is maintained. In this way, users are provided with feedback of the selection detection and a sense of the typesetted extent of the handwritten shape, to guide movement and re-sizing operations for example, while maintaining display of the original input content.

Figure 71A:
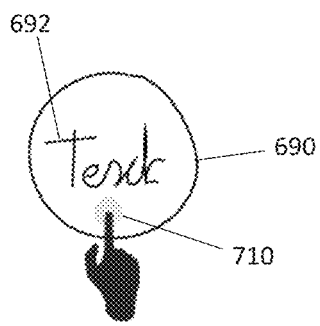
FIGS. 71A and 71B respectively show selection and selection mode display of a digital ink shape and digital ink text.

In FIG. 71A, the digital ink circle 690 and digital ink word 692 of FIG. 69A are displayed. A gesture input 710 made within the container 690 but not on the word 692 is detected and identified as selection of the entire container, that is, both the circle 690 and the text 692. The gesture 710 is, for example, a long tap on the interface surface 104 of the computing device 100 as depicted in FIG. 71A.

Figure 71B:
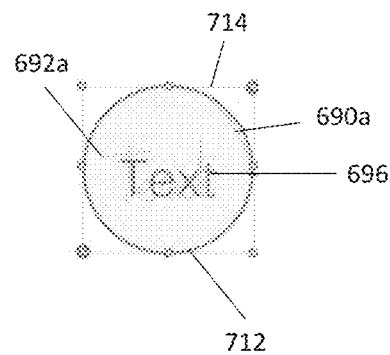

In FIG. 71B, the detection of the selection gesture causes display of a digital ink circle 690*a* and the digital ink word 692*a* with the reduced emphasis and overlaid with a selected typeset ink circle 712 and the selected typeset ink word 696 rendered with the heightened emphasis and bounded by a bounding (selection) box 714. In this way, users are provided with feedback of the selection detection and a sense of the typesetted extent of the entire handwritten container, to guide movement and re-sizing operations for example, while maintaining display of the original input content.

Figure 72A:
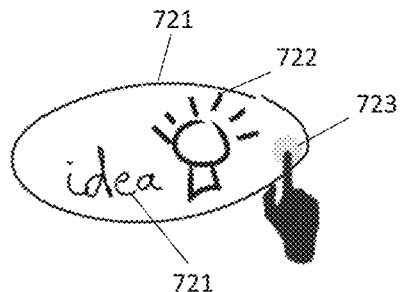
FIGS. 72A and 72B respectively show selection and selection mode display of a digital ink shape, digital ink text and digital ink doodle.

In FIG. 72A, a hand-drawn shape is displayed as a digital ink shape 720, handwritten text is displayed as digital ink text 721, and hand-drawn input is displayed as a digital ink input 722. The shape 720 is detected as non-text and recognized as an ellipse, the text 721 is detected as text and recognized as the word "Idea", the input 722 is detected as either non-text or as junk, and the shape 720 is identified as a container containing the word 721 and the input 722. A gesture input 723 made within the container 720 but not on the word 721 or input 722 is detected and identified as selection of the entire container, that is, the ellipse 700, the text 721 and the input 722. The gesture 723 is, for example, a long tap on the interface surface 104 of the computing device 100 as depicted in FIG. 72A.

Figure 72B:
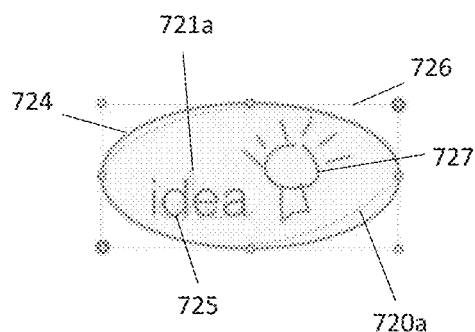

In FIG. 72B, the detection of the selection gesture causes display of the digital ink ellipse 720*a* and the digital ink word 721 *a* with the reduced emphasis and overlaid with a selected typeset ink ellipse 724 and a selected typeset ink word 725 rendered with the heightened emphasis and bounded by a bounding (selection) box 726. However, the input 722 is either not recognizable by the recognizer 118 if classified as non-text or not parsed to the recognizer if classified as junk. Accordingly, the unrecognized input 721 is displayed as selected digital ink 727, which is the digital ink input 722 rendered with the heightened emphasis, as a doodle. In this way, users are provided with feedback of the selection detection and a sense of the typesetted extent of the entire handwritten container, to guide movement and re-sizing operations for example, while maintaining display of the original input content.

In FIGS. 69 to 72, the type of selection of the diagram elements detected depends on the detected position of the selection gesture in relation to the diagram elements. That is, for the containers containing text of these examples, depending on the gesture position either the container only, the text only, or the container and its contained elements (either or both of non-text and text) is selected. Other selection behavior is possible however. For example, a selection gesture at any position within or on a container and its contained elements may cause selection of the entire container. Further, differentiation between containers, which may contain other shapes, and cells, which are containers that only contain text, may be made. Such that a selection gesture at any position within or on a cell and its contained text may cause selection of the entire cell, whereas like selections made with a container cause the selections shown in FIGS. 69 to 72.

The above-described overlay of selected typeset ink over the digital ink display is also applicable to other selected diagram elements, in particular, connectors. Alternatively or in addition to these selection mode examples, similar overlaid display of digital and typeset ink may be provided, albeit without the selection mode rendering, to allow users to preview the typesetted version of the digital ink without typesetting the diagram elements per se. The preview mode is initiated, for example, upon detection of a preview gesture, such as short tap or 'hover' of a user's finger or stylus over a diagram element.

Figure 42A:
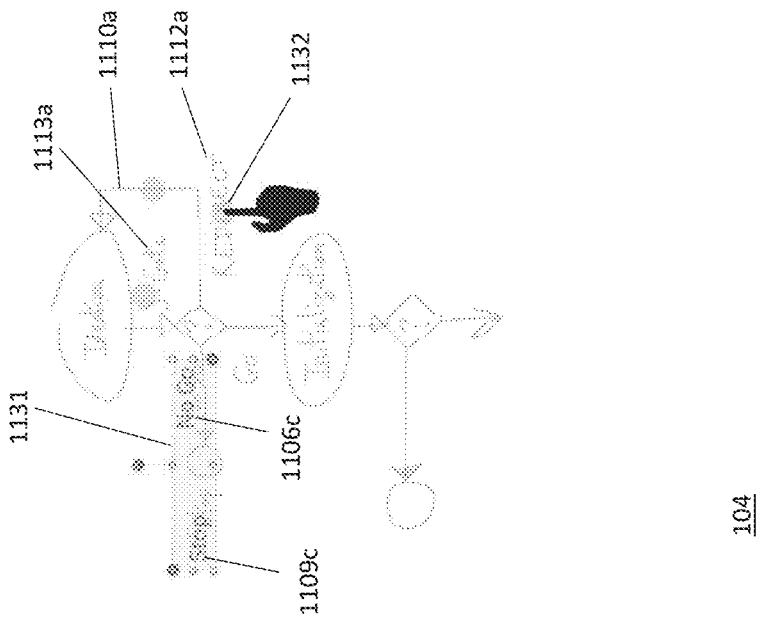

Returning to the example input, in FIG. 42A, the detection of the subsequent selection gesture causes extended display of the selection box 1131 about the selected typeset label 1106c and the label 1109a replaced by display of a selected typeset label 1109c, having the selection mode properties, thereby providing the user with visual feedback of the identified gesture. In FIG. 42B, the detection of the subsequent selection gesture causes the extended display of the selection box 1131 surrounding the selected typeset label 1106c and the typeset label 1109b also replaced by display of the selected typeset label 1109c. Further gesture inputs 1132 are detected and identified as selections of the label 1113a of the connector 1103a, the label 1112a of the connector arrow 1110a and the connector arrow 1110a itself in FIG. 42A and the typeset label 1113b of the typeset connector 1103b, the typeset label 1112b of the typeset connector arrow 1110b and the typeset connector arrow 1110b itself in FIG. 42B.

Figure 43A:
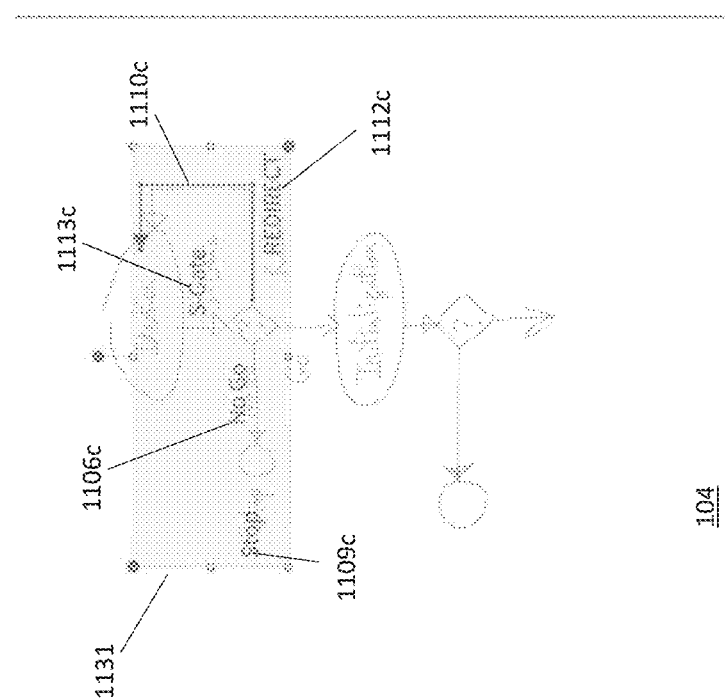
Figure 43B:
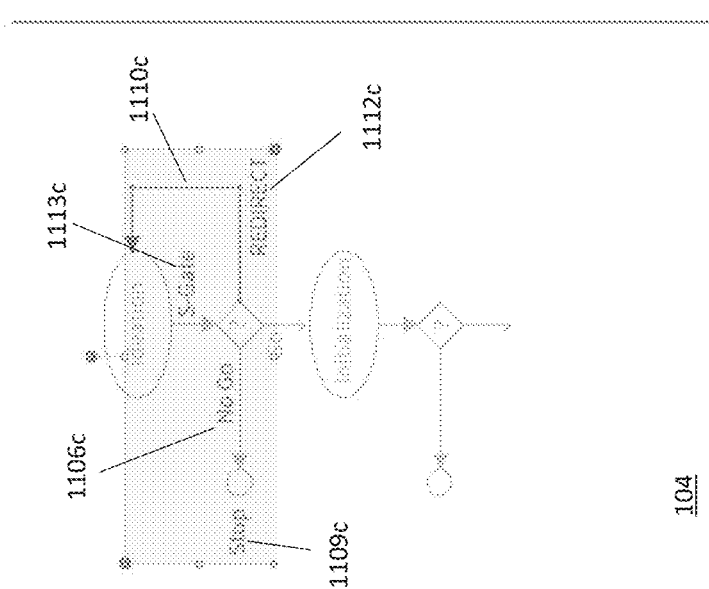

In FIG. 43A, the detection of the further selection gestures causes further extension of the selection box 1131 about the multi-selected elements 1103a, 1106a, 1109a, 1110a, 1112a and 1113a and a selected typeset label 1112c, a selected typeset label 1113c and a selected typeset connector 1110c respectively for the labels 1112a and 1113a and the connector 1110a, having the selection mode properties, thereby providing the user with visual feedback of the recognition. In FIG. 43B, the detection of the further selection gestures causes the further extension of the selection box 1131 about the multi-selected typeset elements 1103b, 1106b, 1109b, 1110b, 1112b and 1113b and the selected typeset labels 1112c and 1113c and connector 1110c respectively for the typeset labels 1112b and 1113b and the typeset connector 1110b.

Figure 44A:
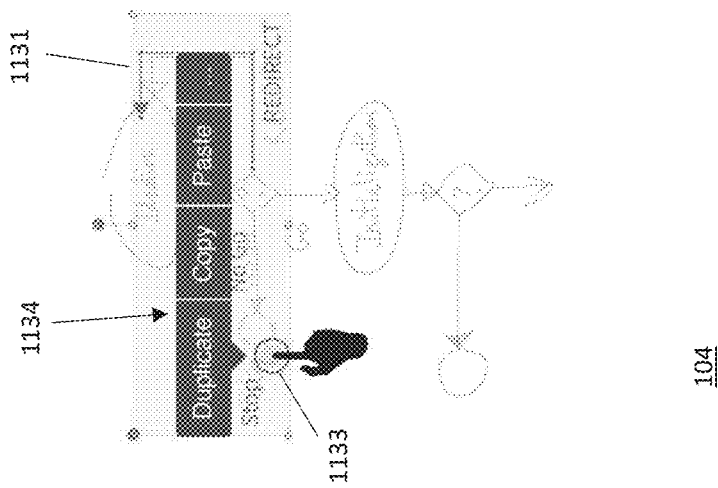
Figure 44B:
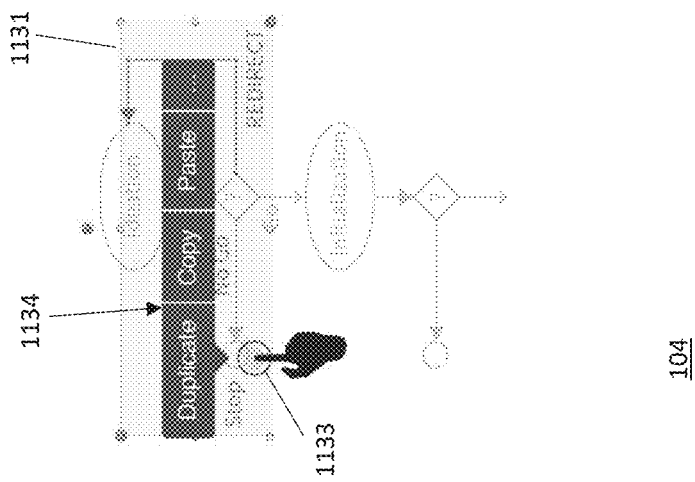

In FIGS. 44A and 44B, a gesture input 1133 is detected as selection of the selection box 1131. The gesture 1133 is, for example, a long tap on the interface surface 104 of the computing device 100 within the selection box 1131 but not on any of the diagram elements therein, as depicted in FIG. 44. In response to this recognized gesture, the application 112 displays a selection menu 1134 displaying certain editing options that can be performed on the selected elements within the selection box 1131. For example, the options of Duplicate, Copy and Paste is provided by the menu. This provision of the 'pop-up' or on-demand menu is merely an example, and other mechanisms for providing editing operations can be used, such as different gestures for different operations or only a default operation being selected through the use of a gesture.

Figure 45A:
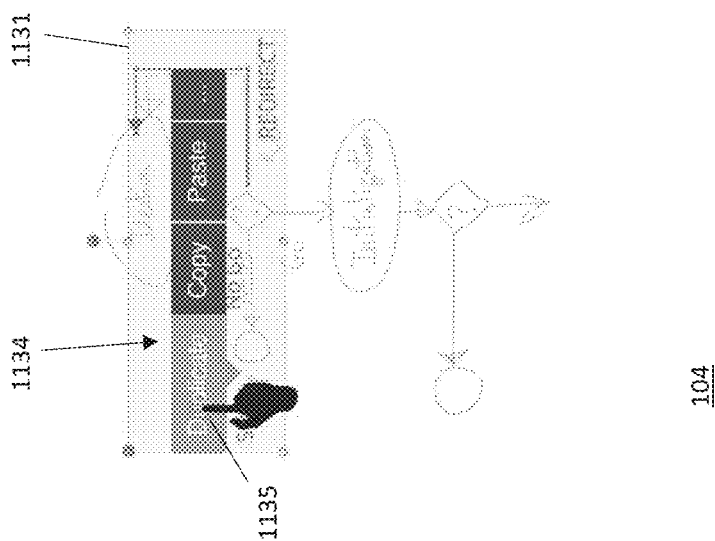
Figure 45B:
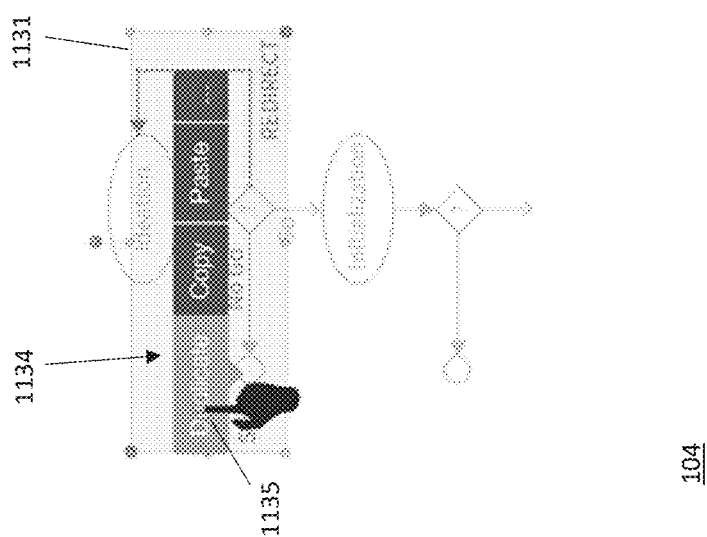

In FIGS. 45A and 45B, a gesture input 1135 is detected as selection of the Duplicate operation from the menu 1134 causing the selected elements of the labels 1106a, 1109a, 1112a and 1113a and the connector arrow 1110a in FIG. 45A and typeset labels 1106b, 1109b, 1112b and 1113b and the typeset connector arrow 1110b in FIG. 45B to be duplicated. The duplicate elements are retained in the selection box 1131 in the selected mode rendering with the same positional relationships as the original elements that have been duplicated, however the display of the elements that have been duplicated returns to the normal rendering or reverts to the non-selected rendering, with reduced emphasis, like in FIG. 47. The gesture 1130 is, for example, a press on the interface surface 104 of the computing device 100 as depicted in FIG. 45. Further, the duplication operation can be configured to omit any selected text so that the structure of a diagram can be copied without having to erase/replace the labels, for example.

Figure 46A:
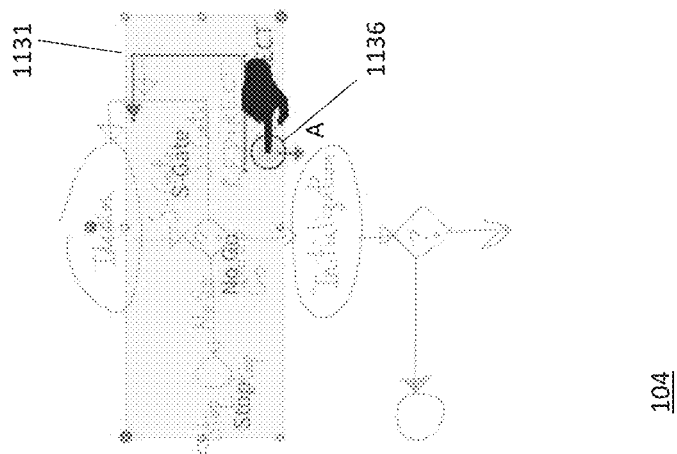
Figure 46B:
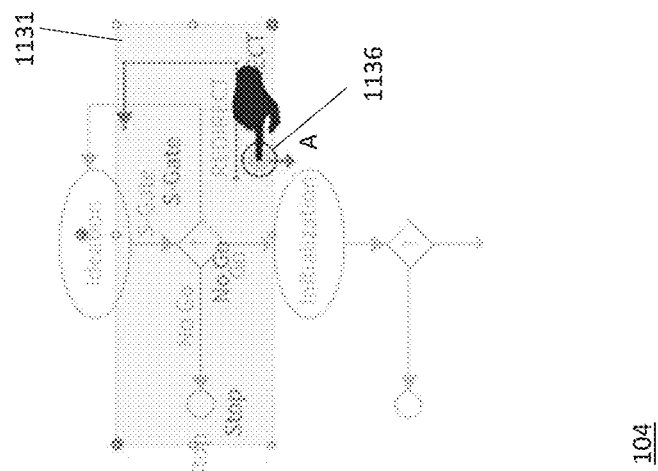

In FIGS. 46A and 46B, a gesture input 1136 is detected as a move operation on the selection box 1131 in the direction of arrow A. The gesture 1136 is, for example, a long tap-and-slide (such as a drag or push) on the interface surface 104 of the computing device 100 within the selection box 1131 but not on any of the diagram elements therein, as depicted in FIG. 46.

Figure 47A:
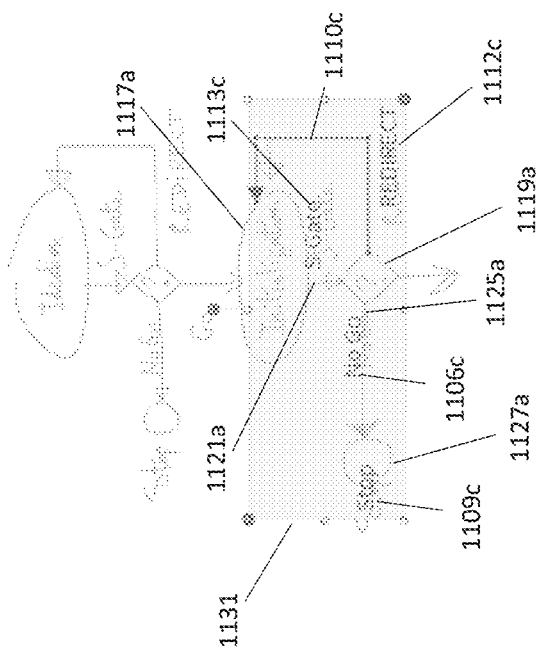
Figure 47B:
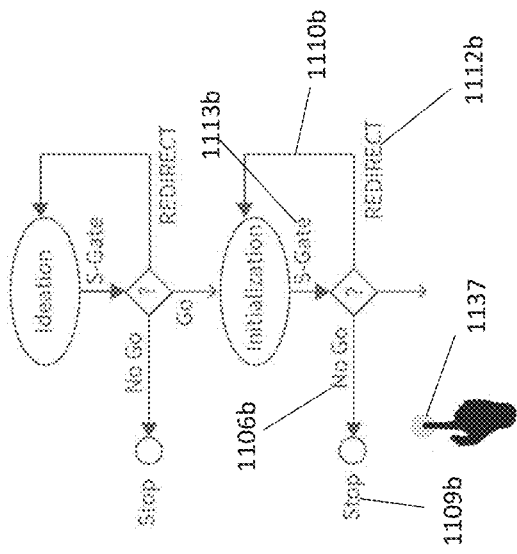

In FIGS. 47A and 47B, completion of the move operation is detected and display of the selected typeset label 1106c positioned adjacent the container 1127a or 1127b, the selected typeset label 1109c positioned adjacent the connector 1125a or 1125b, the selected typeset label 1112c positioned adjacent the connector 1121a or 1121b, the selected typeset label 1113c positioned adjacent the connector arrow 1110a or 1110b and the selected typeset connector arrow 1110c positioned to connect the containers 1117a and 1119a or 1117b and 1119b is made, respectively. Accordingly, already drawn and recognized diagram elements can be re-used in or moved to other parts of the diagram, or on other diagrams as the diagrams are being created. In this process, the duplicate arrow 1110 is identified as a connector connecting the containers 1117 and 1119 due to the connector status of the original connector arrow 1110, the container status of the containers 1117 and 1119, and otherwise due to the relative positions and characteristics of these elements, in the manner described earlier.

Figure 48A:
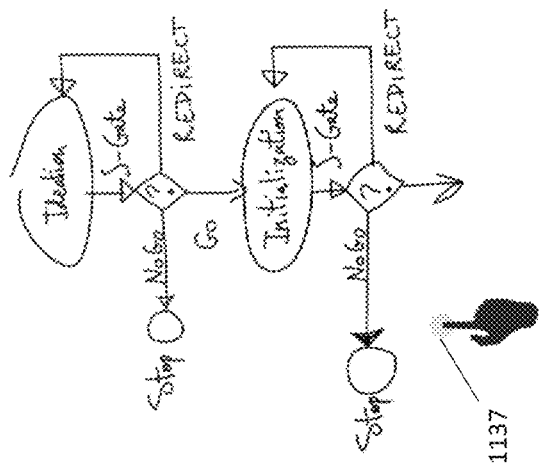
Figure 48B:
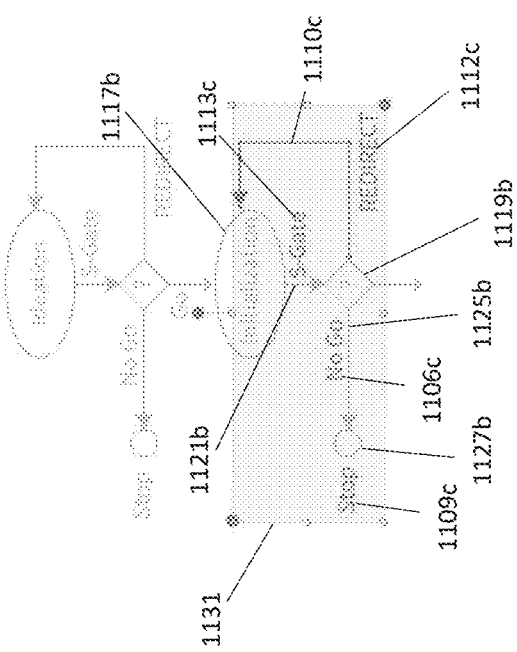

In FIGS. 48A and 48B, a gesture input 1137 is detected as a de-selection gesture and in response display of the selection box 1131 is omitted and the selection mode typeset display of the de-selected diagram elements is omitted with display reverting to the normal digital ink or typeset display versions, and the display of the other non-selected diagram elements is returned to the normal rendering, if applicable for the multi-selection mode. The gesture 1137 is, for example, a short tap on the interface surface 104 of the computing device 100 outside of the selection box 1131, as shown in FIG. 48.

Figure 49A:
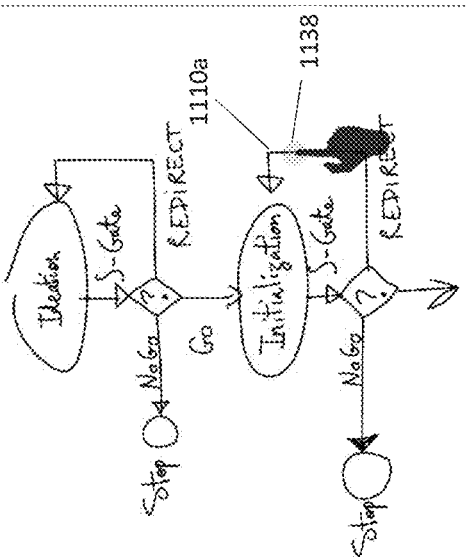

In FIG. 49A, a gesture input 1138 is detected as selection of the duplicate connector arrow 1110a. In FIG. 49B, the gesture input 1138 is detected as selection of the duplicate typeset connector arrow 1110b. The gesture 1133 is, for example, a short tap on the interface surface 104 of the computing device 100 as depicted in FIG. 49. Accordingly, the short tap selection gesture is identified by the application 112 as initiating a uni-selection mode, i.e., the selection of a single diagram element such as shown in the example of FIG. 68, such that the application 112 expects subsequent operation performed on the selected element.

Figure 50A:
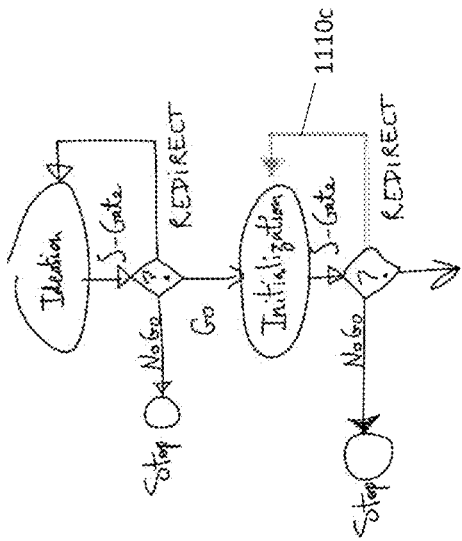
Figures 49B, 50B:
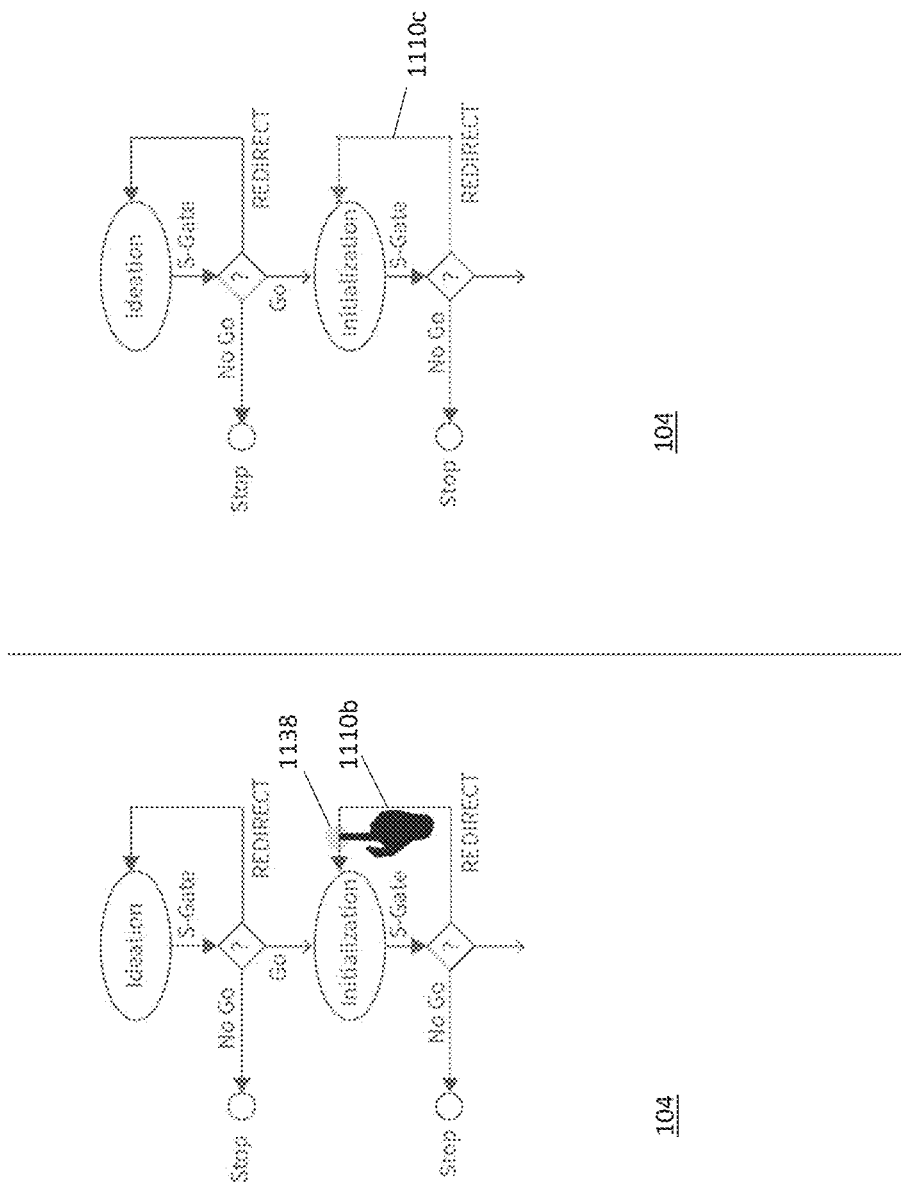

In FIG. 50A, in accordance with the selection detection, the connector arrow 1110a is replaced by display of a selected typeset arrow 1110c having the selection mode properties, thereby providing the user with visual feedback of the detection. In FIG. 50B, in accordance with the selection detection, the typeset connector arrow 1110b is replaced by display of the selected typeset arrow 1110c. Unlike for the multi-select mode described above, a selection box is not also used in the connector selection mode in order to provide clear display of the connector during the users' operations thereon.

Figure 51A:
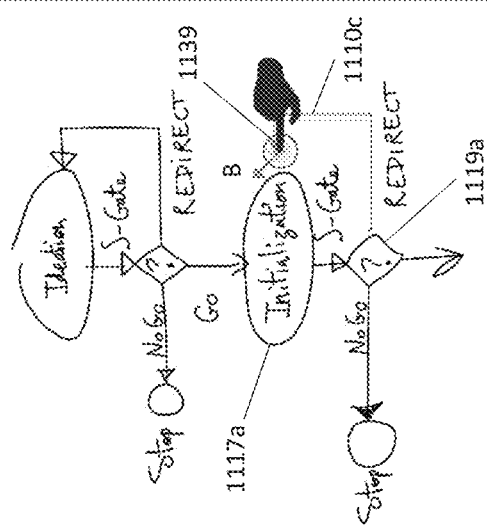

In FIGS. 51A and 51B, a gesture input 1139 is detected as a move operation on the bent connector arrow 1110c at the arrowhead and/or portion of the connector arrow stem having the arrowhead in the direction of arrow B. The gesture 1139 is, for example, a long tap-and-slide on the interface surface 104 of the computing device 100 as depicted in FIG. 51. As the connector arrow 1110c is a connector connected to the containers 1117 and 1119, the move gesture is identified as only pertaining to the arrowhead stem portion connected to the container 1117, such that the end of the connector arrow 1110c connected or anchored to the container 1119 is not affected during the move operation. During the move operation therefore the connector arrow 1110 is decoupled from the container 1117 and resizing and re-display of certain portions of the bent connector arrow 1110c are made, chiefly the horizontal stem portion connecting the vertical stem portions connected to the respective containers is resized to accommodate the movement of the arrowhead stem. During such move operations, a specific visual feedback may be displayed, such as a 'lens', to guide interaction with the objects, particularly, if the user's finger is used.

Figure 52A:
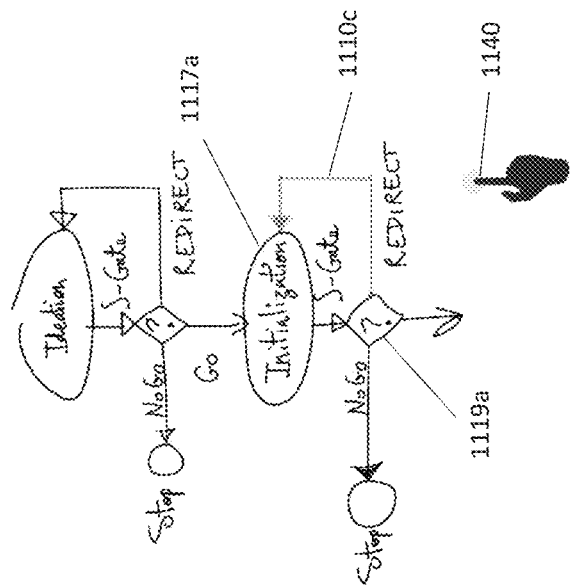

In FIGS. 52A and 52B, completion of the move operation is detected and display of the connection or anchor point of the arrowhead of the bent connector arrow 1110c at the boundary of the container 1110 repositioned to be more central is made, and a gesture input 1140 is detected and identified as a de-selection gesture. The gesture 1140 is, for example, a short tap on the interface surface 104 of the computing device 100 remote from the connector 1110. This move operation illustrates how users are able to easily adjust the rendering and repositioning of connection points made by the application 112. The application 112 seeks to strike a balance by performing as little change to the original hand-drawn input of the user as possible while beautifying the recognized diagram so that it can be ultimately made part of a document in a typeset form that could have been created using many of the available techniques for producing digital diagrams.

Figure 53A:
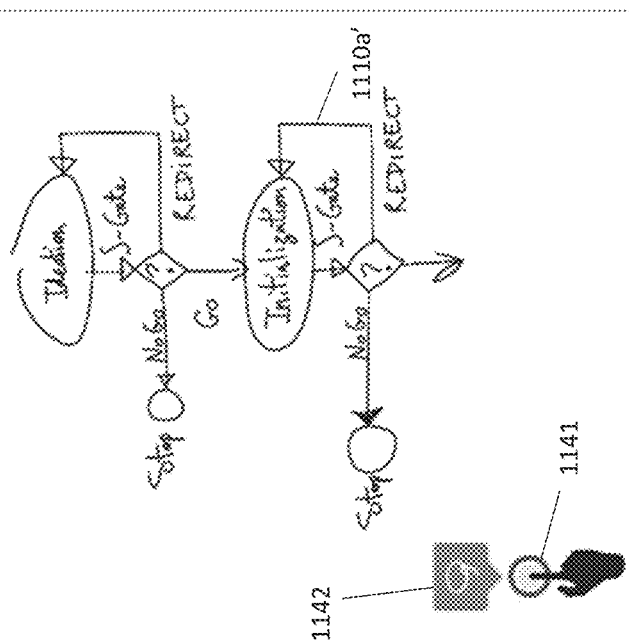

In FIG. 53A, the detection of the de-selection causes the selected typeset connector 1110c to be omitted and display of the connector as a digital ink connector 1110a'. In FIG. 53B, the detection of the de-selection causes the selected typeset connector 1110c to be omitted and display of the connector as a typeset ink connector 1110b'. The newly displayed connectors 1110a' and 1110b' are the resized versions of the previously displayed digital ink connector 1110a and the typeset ink connector 1110b, respectively. The resizing operation of the typeset ink connector is straightforward and achieved using well-known techniques to one of ordinary skill in the art. However, the resizing operation of the digital ink is not straightforward if mere scaling or normalization of the digital ink, as is conventional, is not performed so as to avoid the resultant manipulated digital ink as being quite different to the originally drawn ink, thereby avoiding unnecessary user interaction to further manipulate the digital ink. The manner in which digital ink of a connector, and other elements, is manipulated in a resizing operation in the present system and method is now described with reference to FIGS. 73 to 77.

Figure 73A:
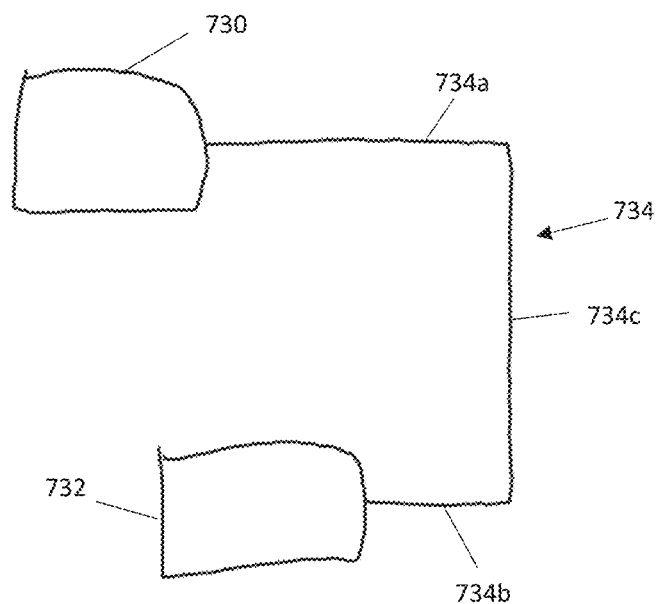
FIG. 73A shows hand-drawn input of boxes connected by a connector.
Figure 73B:
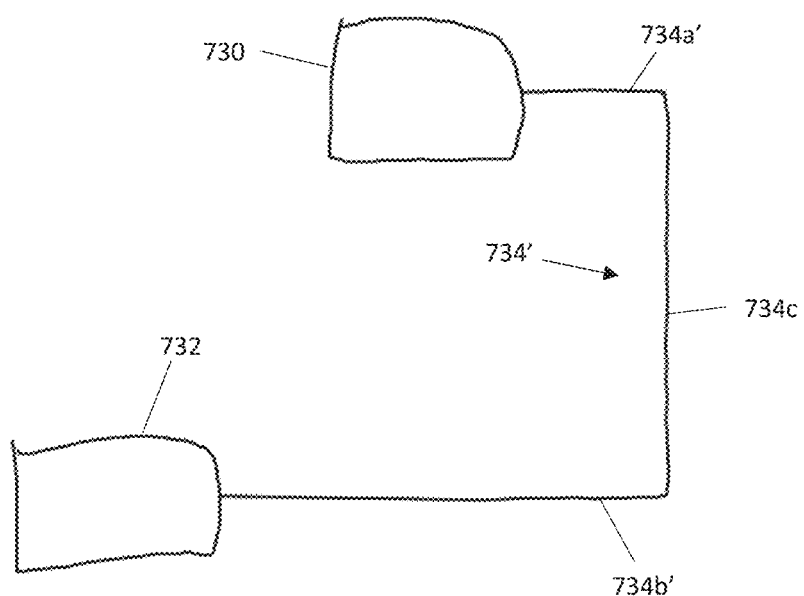
FIG. 73B shows the hand-drawn input of FIG. 73A after performance of movement operations on each of the boxes.

FIG. 73A shows hand-drawn input of a box 730 and a box 732 connected by a bent or u-shaped connector 734. FIG. 73B shows the hand-drawn input of FIG. 73A after performance of movement operations on each of the boxes 730 and 732 which cause re-sizing of the connector 734, displayed as connector 734'. In particular, the box 730 is moved to the right causing a shortening of an arm 734a of the connector 734 connected at the box 730, displayed as arm 734a' of the connector 734', and the box 732 is moved to the left causing a lengthening of an arm 734b of the connector 734 connected at the box 732, displayed as arm 734b' of the connector 734'. The movement operations do not effect an arm 734c of the connector 734 which is identified as connecting the arms 734a and 734b (and therefore the arms 743a' and 743b' of the connector 734'). That is, the present system and method treats bent connectors, or other multi-arm connectors, as being formed of multiple connection portions or sub-connectors, where each sub-connector either connects to a shape, such as a container, and another sub-connector, or to two (or more) other sub-connectors. In this way, the sub-connectors can be manipulated independent of the other sub-connectors while the connections of the connector as a whole (e.g., the combined sub-connectors) are maintained. As can be seen the digital ink rendered characteristics (including ink weight and general shape) of the connector 734 is substantially maintained in the digital ink rendering of the re-sized connector 734'. The manner of achieving this is now described with relation to FIGS. 73C to 73E, in which the arm 734b of the connector 734 is used to illustrate the operation of the present system and method.

Figure 73C:
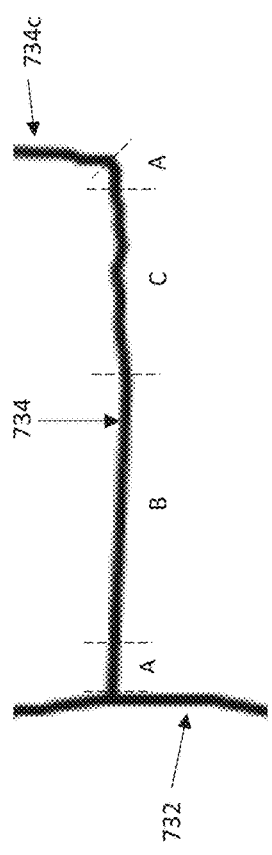
FIG. 73C is a zoomed-in view of an arm of the connector of FIG. 73A.
Figure 73D:
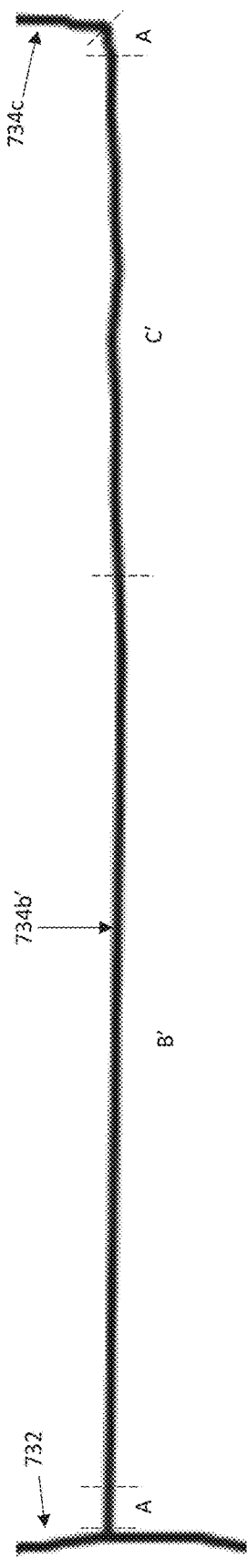
FIG. 73D is a zoomed-in view of an arm of the connector of FIG. 73B.
Figure 73E:
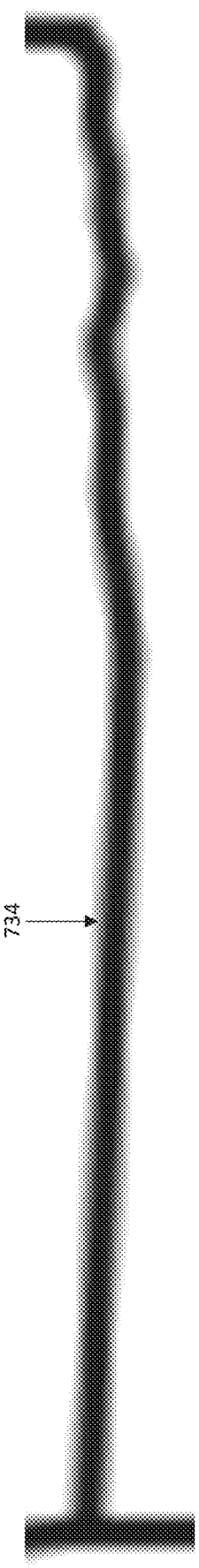
FIG. 73E shows scaling of the arm of FIG. 73C to be of similar length to the arm of FIG. 73D.

FIG. 73C is a zoomed-in view of the arm 734b of the connector 734 of FIG. 73A (also with some portions of the box 732 and arm 734c). FIG. 73D is a zoomed-in view of the arm 734b' of the connector 734' of FIG. 73B (also with the same portions of the box 732 and arm 734c). The zoomed-in views of FIGS. 73C and 73D are of the same magnitude such that the zoomed-in dimensions of the arms 734b and 734b' are the same. FIG. 73E is a further zoomed-in view of the arm 734b, as depicted in FIG. 73C, at a magnitude so as to match the greater length of the arm 734b' of FIG. 73D. Accordingly, FIG. 73E illustrates scaling of the arm 734b to provide the resized length of the arm 734b'. As can be seen, the scaled digital ink of the arm 734b is significantly different than the non-scaled digital ink, and is therefore not desirable.

Conventional normalization deals with this problem with two different techniques, which are now described in relation to FIG. 73E. In the first technique, the mean center line along the horizontal direction of the scaled arm 734b is taken and the original ink weight (i.e., the average distance of the horizontal edges from the mean center line of the non-scaled arm 734b) is used to regenerate the digital ink about that mean center line, thereby discarding the horizontal edges of the scaled arm 734b. This operation eliminates the scaled-up rendering, but typically results in the edges of the resized digital ink element having much greater uniformity than the edges of the original digital ink, thereby significantly changing the appearance. In the second technique, the horizontal edges of the scaled arm 734b are taken and the original ink weight is used to regenerate the digital ink from the edges, thereby discarding the central ink of the scaled arm 734b. This operation also eliminates the scaled-up rendering, but typically results in the edges of the resized digital ink element having much less uniformity that the edges of the original digital ink, thereby significantly changing the appearance. These problems are equally applicable when the resizing operation is a reduction in size.

In the present system and method, aspects of the non-scaled and scaled versions of the digital ink are combined to provide resized digital ink elements having retained features of the original digital ink elements. That is, portions A at the ends of the arm 734b are retained in non-scaled form in the resized arm 734b', as shown in FIGS. 73C and 73D. The lengths of these portions are defined so that characteristic and noticeable features, such as corners of bend connectors (as in FIG. 73), arrowheads of arrow connectors, and joints to other shapes, are maintained in the resized connector. In this way, arrowheads in particular are not resized. In the, section of the arm 734b between the end portions A, areas of relative uniformity (i.e., gradual changes in vertical offset along the horizontal direction at the center mean line and the horizontal edges), such as the portion B in FIG. 73C, and areas of relatively high variability (i.e., sudden changes in vertical offset along the horizontal direction at the center mean line and the horizontal edges), such as the portion C in FIG. 73C, are determined.

For the areas of relative uniformity, the horizontal edges of the scaled arm are taken with ink weight adjusted to the non-resized ink weight and the central horizontal portion discarded, and rendered as portion B' in the resized arm 734b' (as shown in FIG. 73D). Due to the relative uniformity, it can be seen that this portion of the resized digital ink is substantially similar to the original non-resized digital ink. For the areas of high variability, the center mean line of the scaled arm is taken with ink weight adjusted to the non-resized ink weight and the edges discarded, and rendered as portion C' in the resized arm 734b' (as shown in FIG. 73D). Due to the retention of some variability, it can be seen that this portion of the resized digital ink is substantially similar to the original non-resized digital ink, particularly in the non-zoomed views of FIGS. 73A and 73B. The digital ink of all diagram elements, both non-text and text, can be treated in the same way for resizing operations. This treatment can also be made for other operations, such as changes in aspect, direction, etc.

Figure 74A:
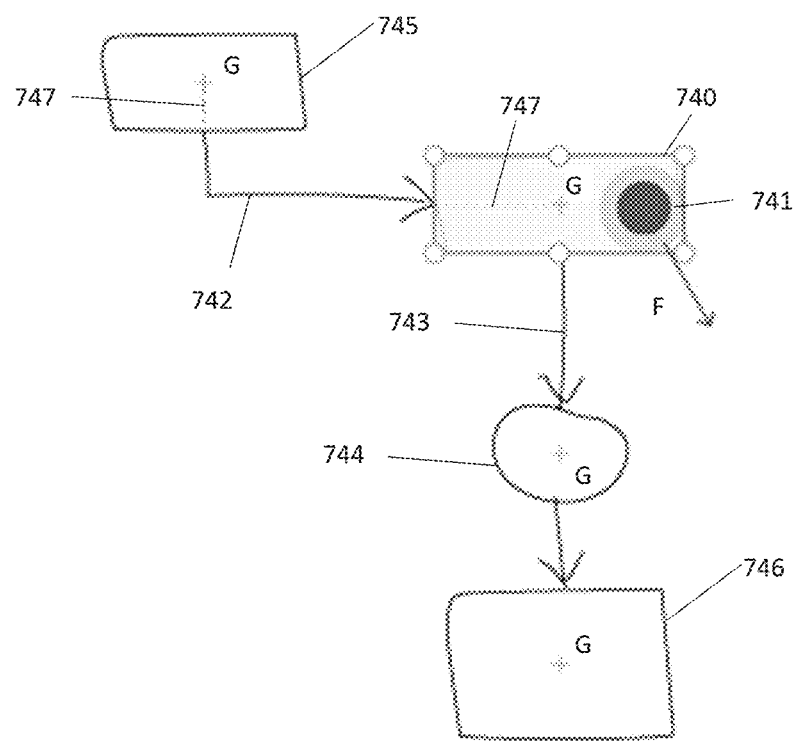
FIGS. 74A and 74B respectively show an example hand-drawn diagram before and after a movement operation on a shape element.
Figure 74B:
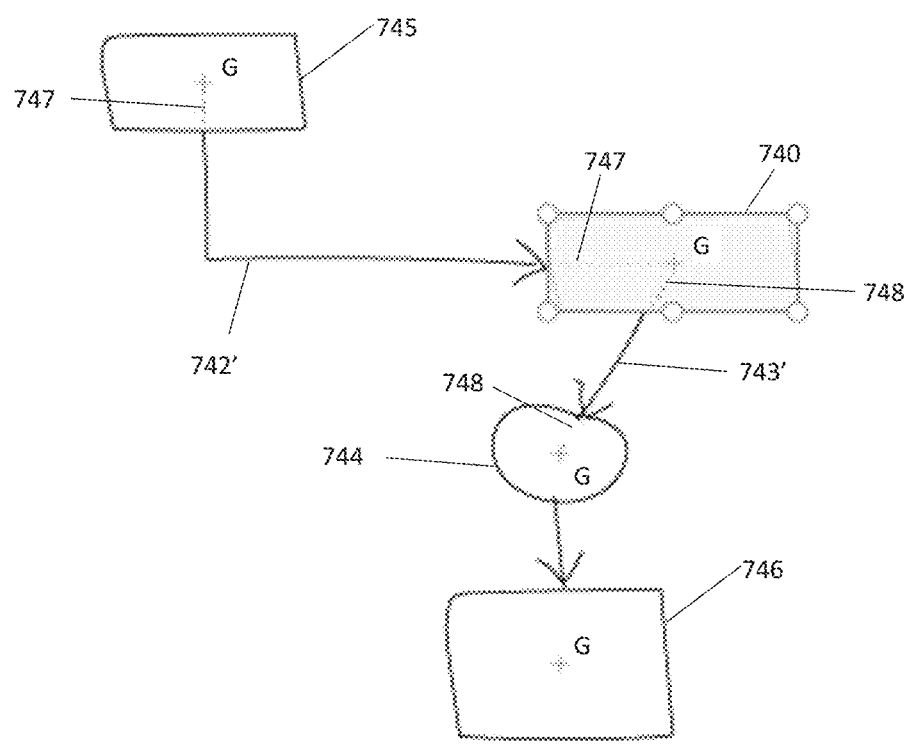

For example, FIGS. 74 and 75 show movement operations on digital ink boxes with the consequential effect on digital ink connectors associated therewith. In FIG. 74A, a box 740 is selected in response to detection of a selection gesture 741 and moved in the direction of arrow F. The box has two associated connectors, a bent open-headed arrow connector 742 and straight open-headed arrow connector 743. The adjusted display at the completion of the movement operation is shown in FIG. 74B, in which the connectors 742 and 743 are respectively displayed as adjusted connectors 742' and 743'. The bent connector 742 is adjusted with the separate arms each lengthened in the manner described above. As can be seen, the dimensions of the arrowhead of the connector 742 are retained in the adjusted connector 742'.

The connector 743, which is displayed substantially vertical in FIG. 74A is adjusted to be shortened in the manner described above and displayed at a slanted angle to the vertical as the adjusted connector 743' in FIG. 74B. As can be seen, the dimensions of the arrowhead of the connector 743 are retained in the adjusted connector 743'. The change in angle of the connector is performed so as to retain the geometry of the connector, e.g., the adjusted connector 743' is rendered to be substantially straight like the original connector 743 and not caused to be curved due to the movement of box 740. Such curving, for example, would be required if the connection or anchor points of the connector 743 to the box 740 and another box 744 were maintained for the adjusted connector 743'. However, adjustment of the connection points is made to retain the connector's geometry and to provide a sensible re-display during and after the movement operation. This is achieved in the present system and method by taking account of the center of geometry of each connected shape.

As can be seen in FIG. 74A, the center of geometry of the boxes 740 and 744, and other connected boxes 745 and 746, are determined by the application 112 as indicated by the cross-marks G. The path of connection between each center of geometry and the associated connector which takes account of the geometry of the connector is also determined, shown for the connector 742 between the boxes 740 and 745, for example, as dashed line 747 which bends at the 'elbow' of the bent connector 742. When the box 740 is moved, the determined connection paths between the centers of geometry of the connected boxes are adjusted to remain between the centers of geometry whist retaining the path geometry, for example, as shown in FIG. 74B, the connection path 747 retains its bent geometry and connection path 748 of the straight connector 743 retains its straight geometry between the centers of gravity of the boxes 740 and 744 such that it becomes angled to the vertical. Accordingly, the adjusted bent connector 742' is rendered along the adjusted connection path 747 and the adjusted connector 743' is rendered along the adjusted connection path 748. It is noted that the depicted marks for the centers of geometry and connection paths are provided in the drawings for illustrative purposes only, and are not typically displayed to users by the application 112. However, the UI of the application 112 may provide users with the ability to display such markings for reference, for example during editing operations.

Figure 75A:
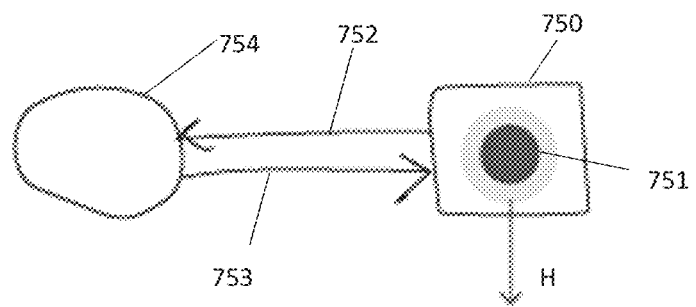
FIGS. 75A and 75B respectively show an example hand-drawn diagram before and after a movement operation on a shape element.
Figure 75B:
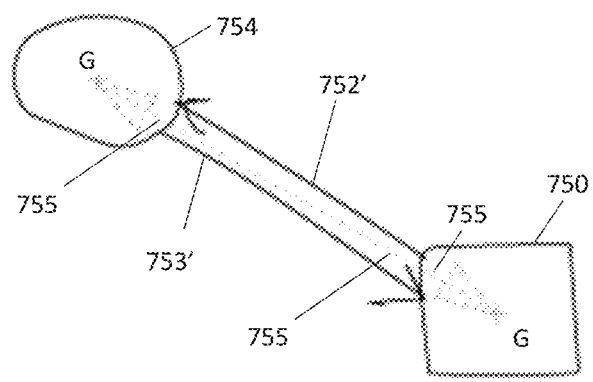

In FIG. 75A, a box 750 is selected in response to detection of a selection gesture 751 and moved in the direction of arrow H. The box has two associated connectors (but could have more in the present example), a first open-headed arrow connector 752 and a second open-headed arrow connector 753, both of which have substantially straight geometry and are substantially parallel to one another. The adjusted display at the completion of the movement operation is shown in FIG. 75B, in which the connectors 752 and 753 are displayed as adjusted connectors 752' and 753'. The connectors 752 and 753, which are displayed substantially horizontal in FIG. 75A are adjusted to be lengthened in the manner described earlier and displayed at a slanted angle to the horizontal as the adjusted connectors 752' and 753' whilst retaining the substantially parallel alignment. As can be seen, the dimensions of the arrowhead of the connectors 752 and 753 are retained in the adjusted connectors 752' and 753'.

Unlike the example of FIG. 74, a path from the centers of geometry (G) of the box 750 and connected box 754 does not flow through the parallel-aligned connectors 752 and 753. Accordingly, the substantially parallel-alignment of the connectors is respected in the movement operation by determining the common connection path of the parallel connectors which generally extends substantially parallel to the connectors substantially centrally there between. When the box 750 is moved, the common connection path is adjusted to remain between the centers of geometry whist retaining the path geometry, for example, as shown in FIG. 75B, common connection path 755 retains its straight geometry between the centers of geometry of the boxes 750 and 754 such that it becomes angled to the horizontal. The adjusted connectors 752' and 753' are rendered along the adjusted common connection path 755 so as to retain the parallel separation therefrom of the original connectors 752 and 753.

Further, FIG. 76 shows a movement operation on a digital ink connector with the consequential effect on a digital ink connector label associated therewith. FIG. 76A, shows a hand-drawn diagram 760 rendered in digital ink. In FIG. 76B, selection of a connector 761 is displayed through the afore-described selection mode typeset display. In addition, the connector status of the selected connector 761 is indicated through display of connection points 762 and 763 at the ends of the connector 761. The selected connector is sought to be moved in the direction of arrow I at the end 763 and during movement a connection zone 764 is displayed. In the example of FIG. 76, the connection zone is displayed as a circle which is color-filled with the selection mode color which guides users during their interaction with connectors to indicate when one or more ends of the connectors are within suitable proximity (determined as described earlier) to other diagram elements to cause connection to those elements if interaction with the connectors is ceased at that point. Accordingly, if the end 763 of the connector 761 is moved too far from containers 765 and 766 display of the connection zone 764 is ceased until the end is brought in proximity of another element again. As can be seen, connectors can be connected to shapes and text, including sub-containers, within containers.

Figure 76A:
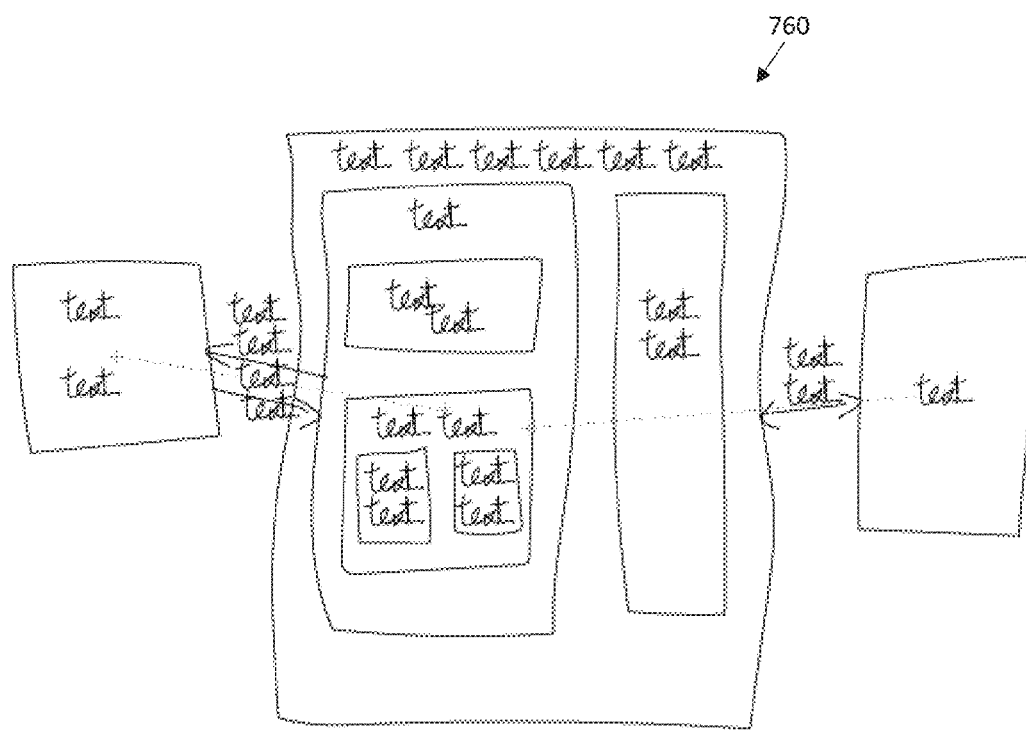
FIGS. 76A to 76E respectively show an example hand-drawn diagram before and after a series of movement operations on a connector element.
Figure 76B:
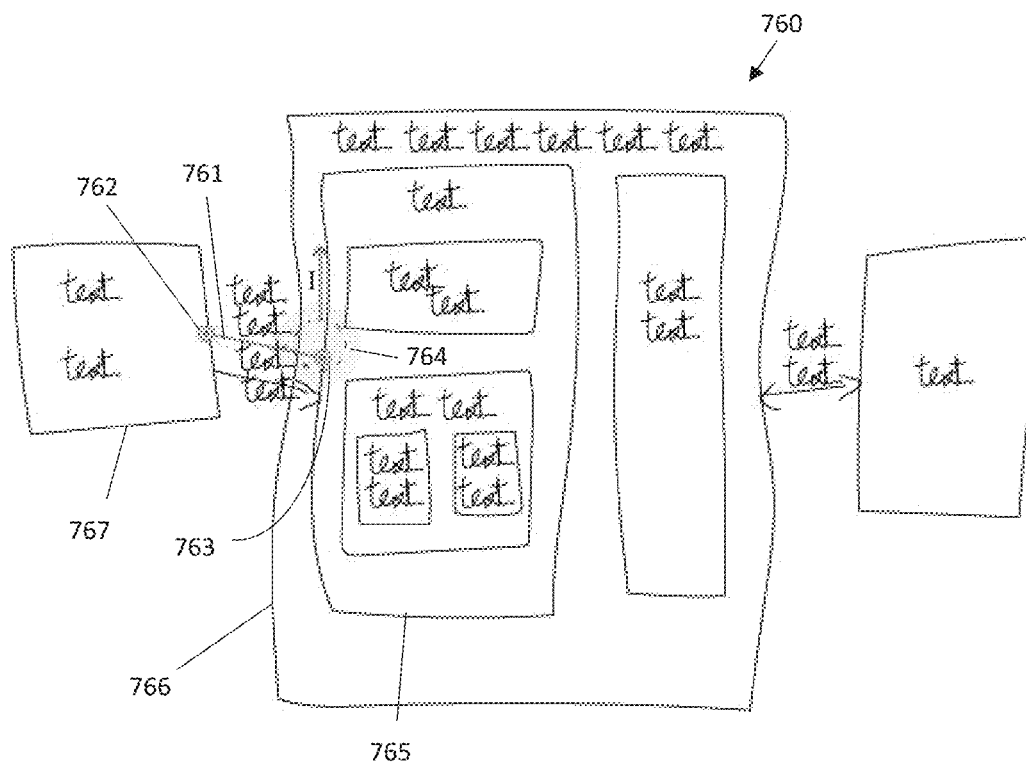
Figure 76C:
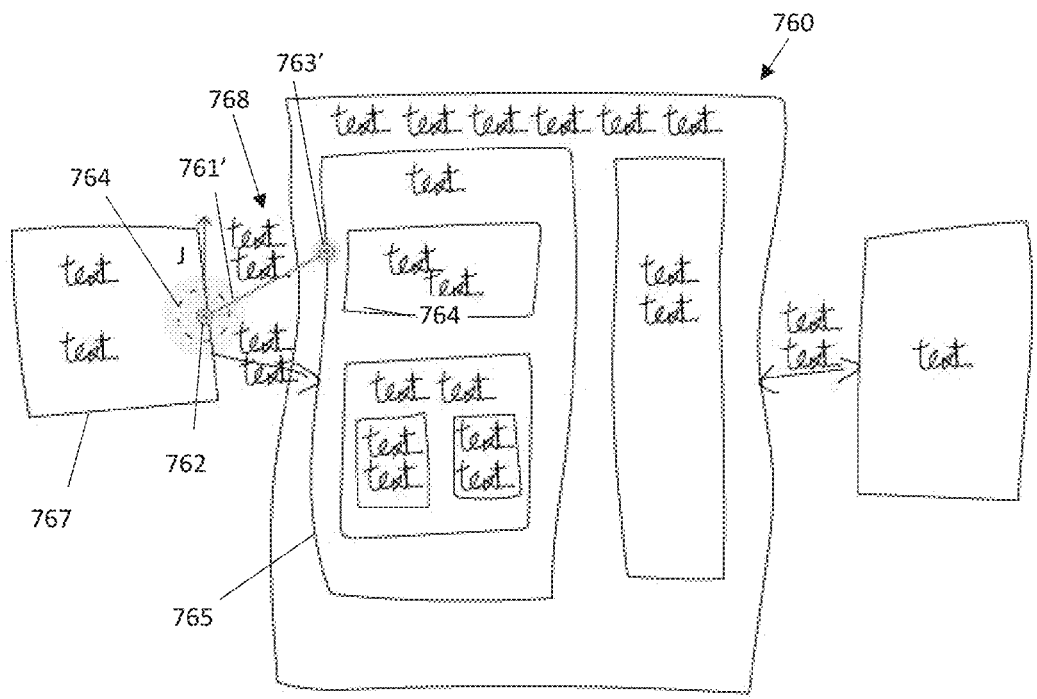

In FIG. 76C, the connector 761 has been moved so that the end 763 is connected to the container 765 at a new connection point 763'. As a result, the angle of the connector 761 relative to the container 765 and a container 767 to which the end 762 is connected, is adjusted with resizing and re-display of the connector 761 as an adjusted connector 761', in the manner described earlier. As can be seen, this adjustment of the position and orientation of the connector 761 causes consequential adjustment of the position of a text label 768 associated with the connector 761, where this association is determined in the manner described earlier. For example, the adjustment of the label 768 is performed so as to maintain an average distance between the text (such as from the barycenter of the recognized text) and the connector 761. Accordingly, the users' labelling of the connector 761 is respected through the movement operation. Further, in FIG. 76C, the connector 761' is sought to be moved again in the direction of arrow J at the end 762 and during movement the connection zone 764 is again displayed.

Figure 76D:
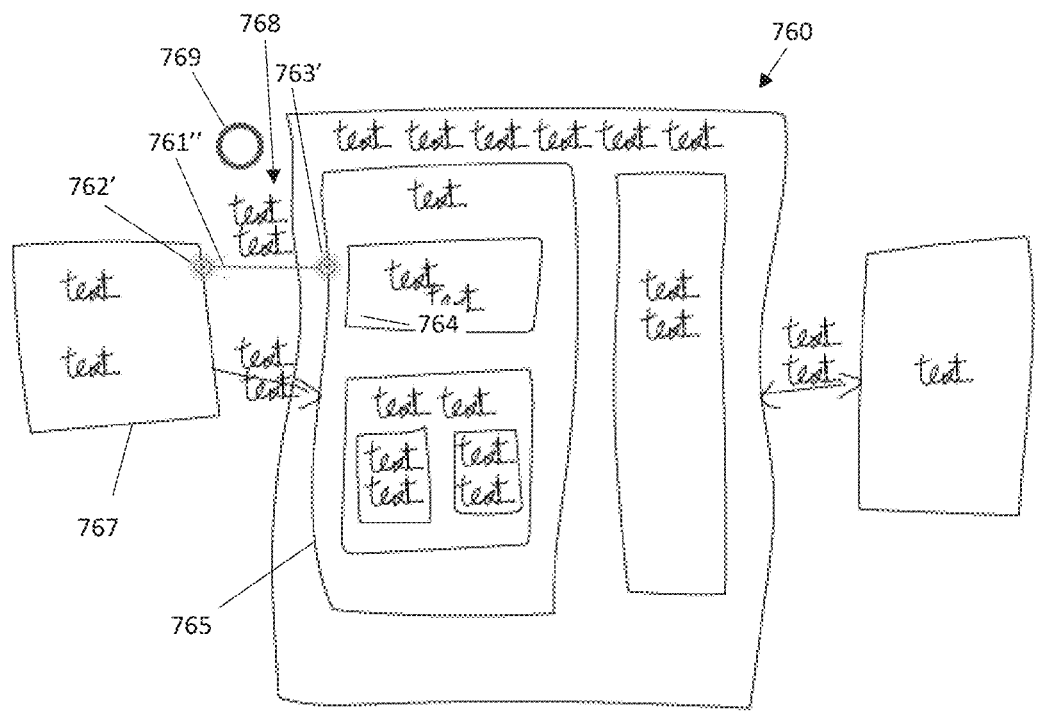
Figure 76E:
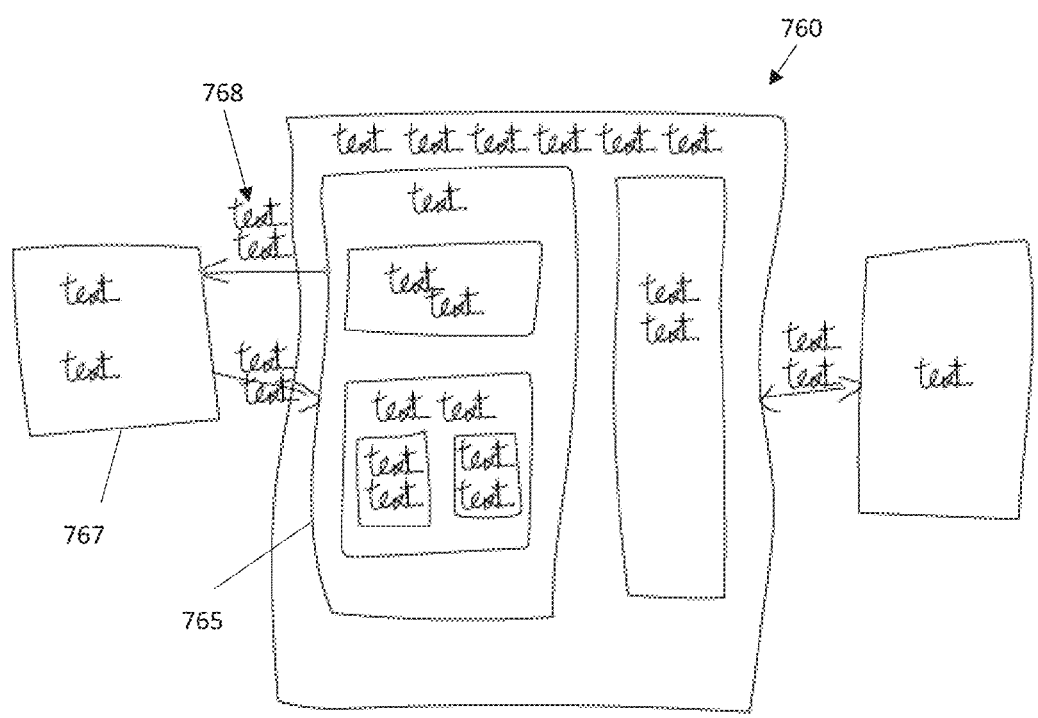

In FIG. 76D, the connector 761' has been moved so that the end 762 is connected to the container 767 at a new connection point 762'. As a result, the angle of the connector 761' relative to the containers 765 and 767 is adjusted with resizing and re-display of the connector 761' as an adjusted connector 761", in the manner described earlier. As can be seen, this adjustment of the position and orientation of the connector 761' again causes consequential adjustment of the position of the text label 768. A gesture 769 is detected as a de-selection gesture, and accordingly the diagram 760 is displayed as shown in FIG. 76E with the moved connector 761 and associated text label 768.

Figure 4A:
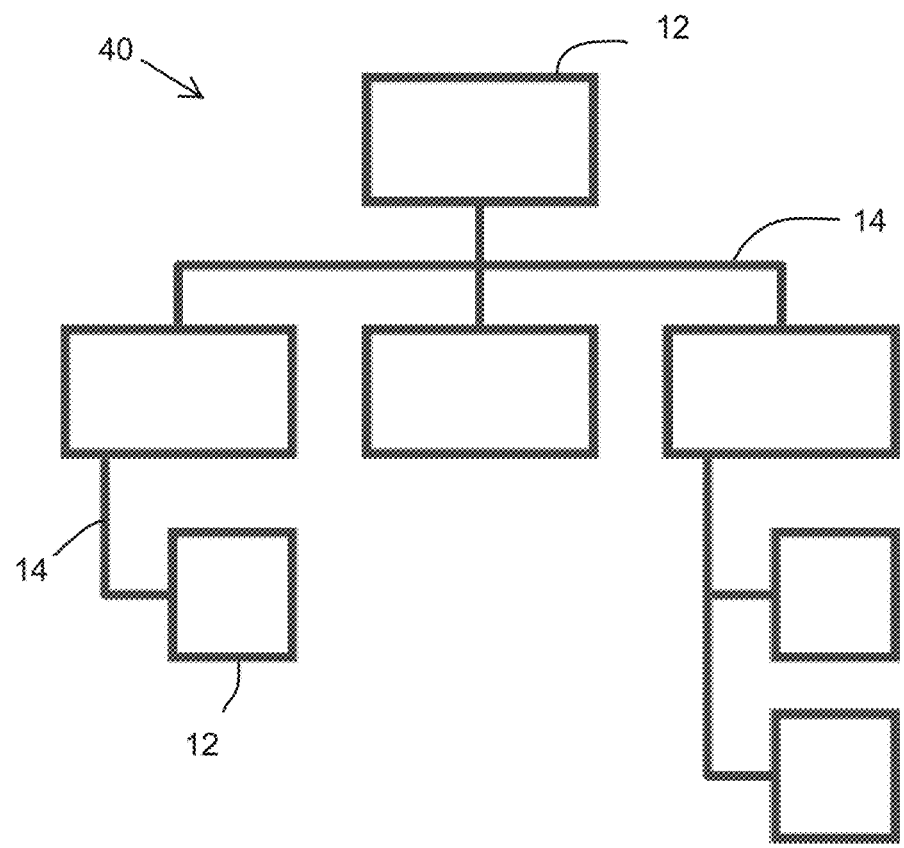
FIGS. 4A and 4B respectively show typeset and handwritten example organizational charts or diagrams.
Figure 4B:
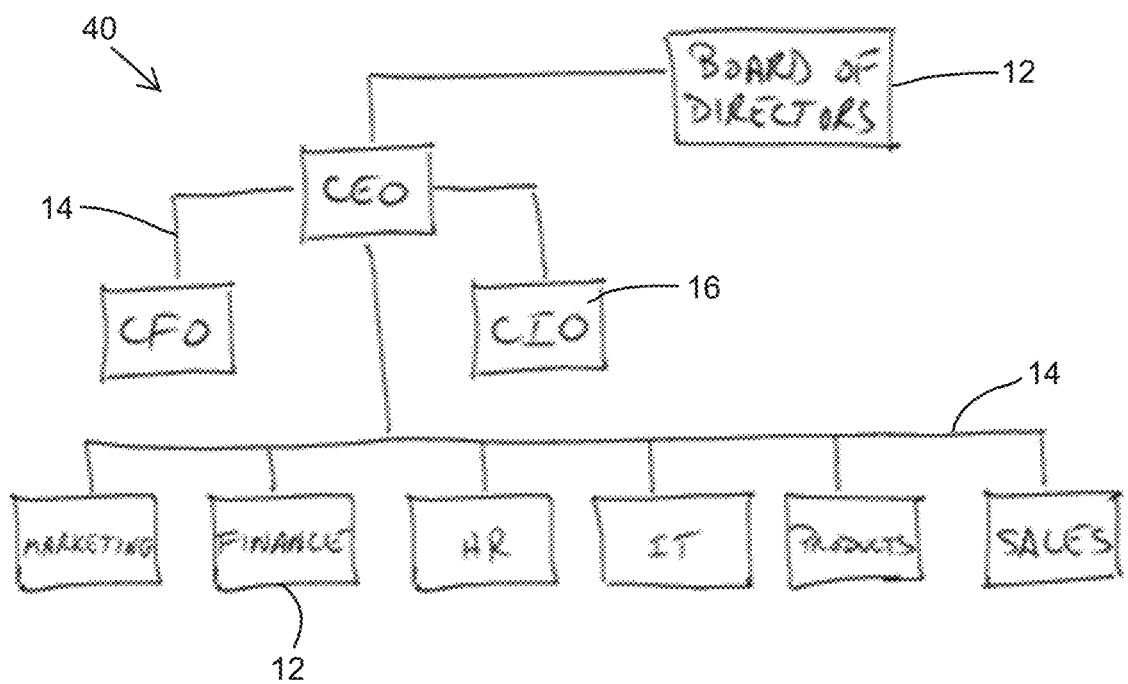
Figure 5A:
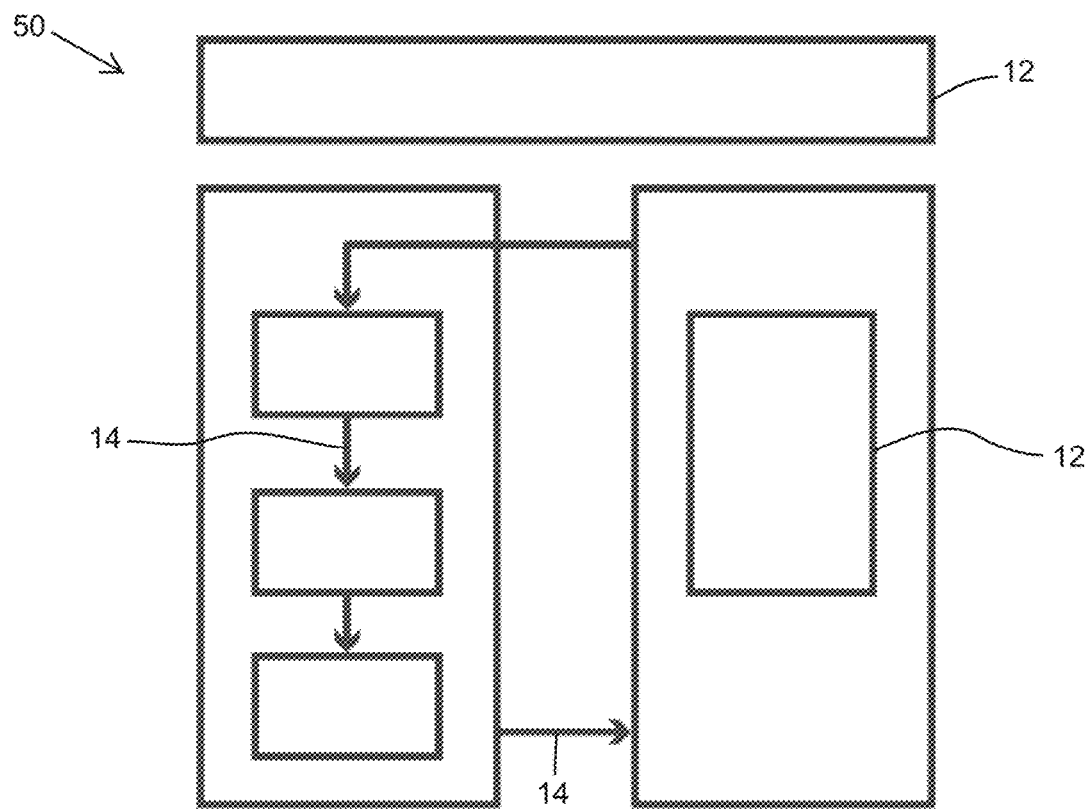
FIGS. 5A and 5B respectively show typeset and handwritten example block/architecture drawings.
Figure 5B:
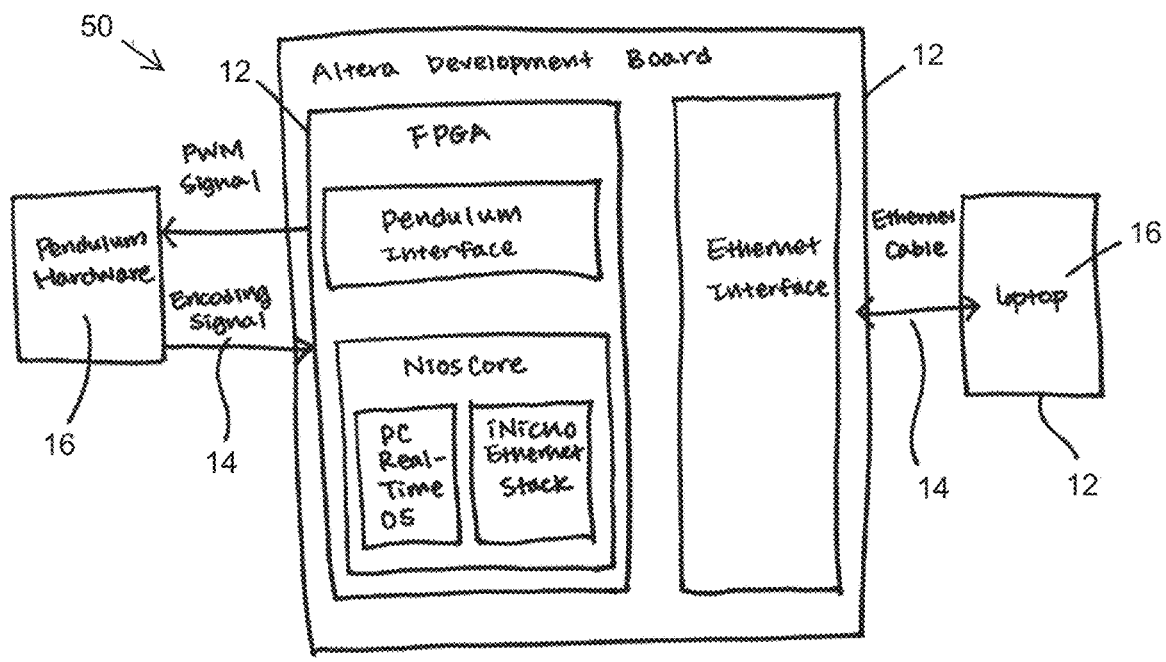
Figure 6A:
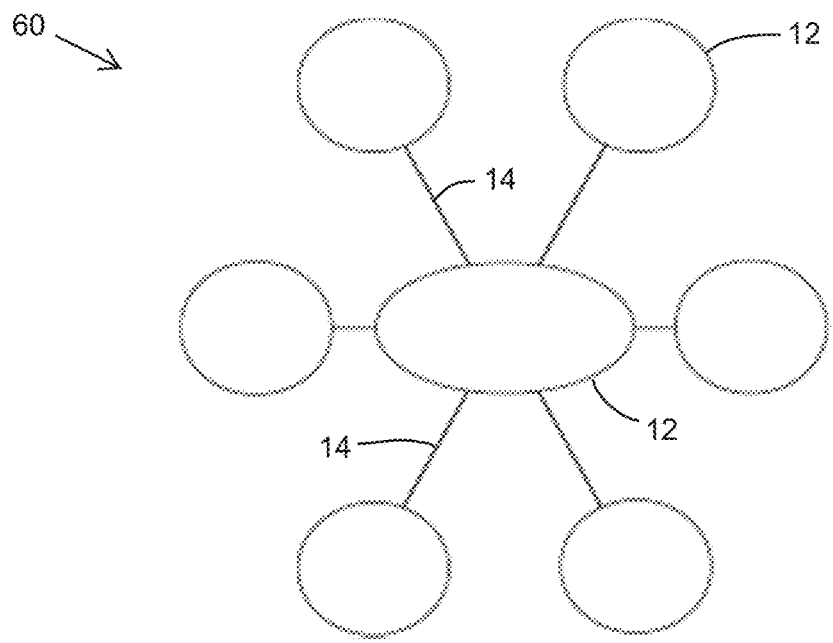
FIGS. 6A and 6B respectively show typeset and handwritten example spider maps.
Figure 6B:
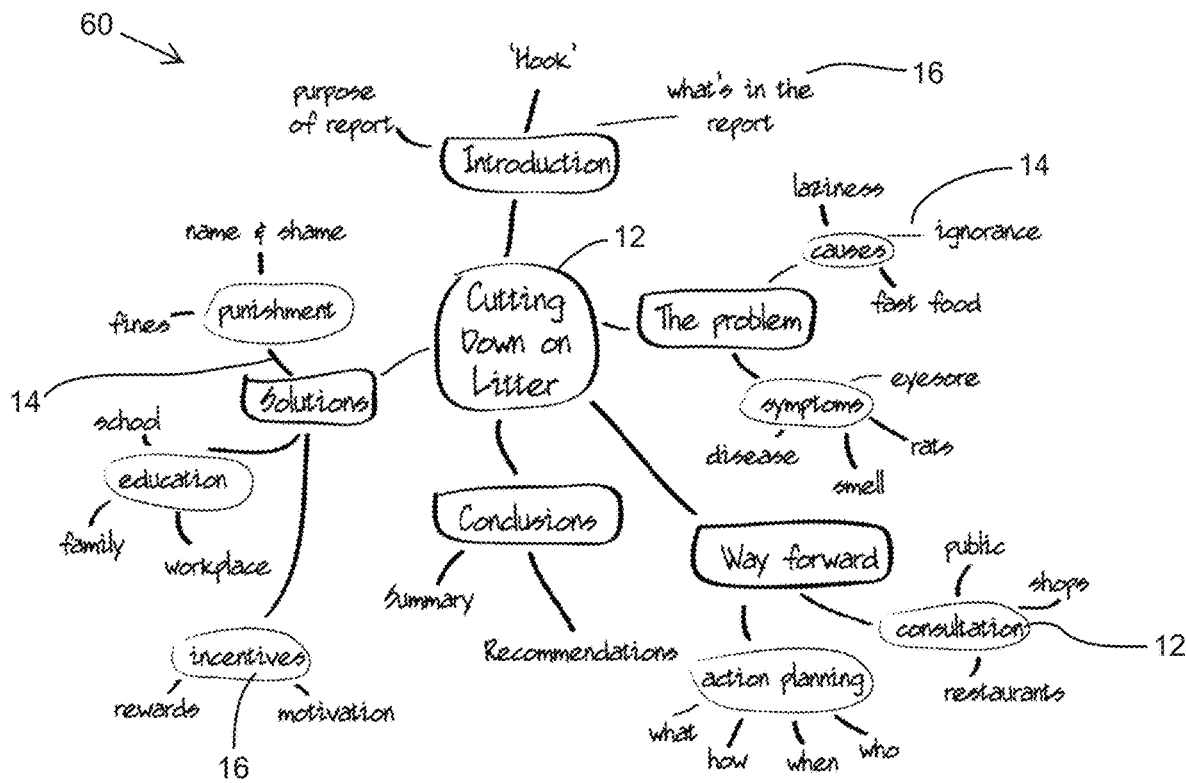
Figure 77A:
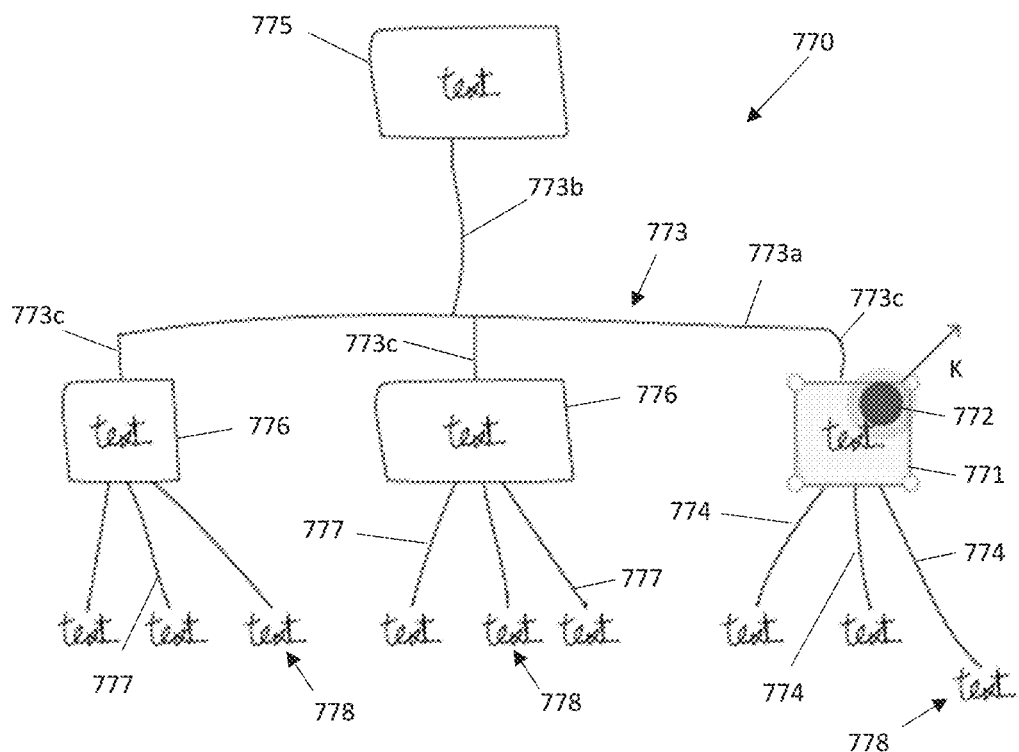
FIGS. 77A and 77B respectively show an example hand-drawn diagram before and after a movement operation on a shape element.

The handling of editing operations on, or which effect, complex connectors in digital ink, such as branched connectors particularly used in organizational charts (see FIG. 4), in a manner which retains intent of users of the hand-drawn diagrams is also provided by the present system and method. FIG. 77A shows a hand-drawn diagram 770 rendered in digital ink as chart having a hierarchical structure of three levels. A box 771 in the second level of the chart is selected in response to detection of a selection gesture 772 and moved in the direction of arrow K. The box has four associated connectors, a branched connector 773 to the first level of the chart and three 'straight' connectors 774 to the third level of the chart. The branched connector 773 is detected by the present system and method as being a complex or multi-connector, as described earlier, with sub-connectors formed of a trunk 773a disposed in the horizontal direction with an upper branch 773b extending vertically upwards from the trunk 773a to a box 775 in the first level and three lower branches 773c extending vertically downwards from the trunk 773a to the box 771 and two boxes 776 in the second level. The box 771 and the boxes 776 are connected via the connectors 774 and connectors 777, respectively, to text blocks 778 in the third level.

Figure 77B:
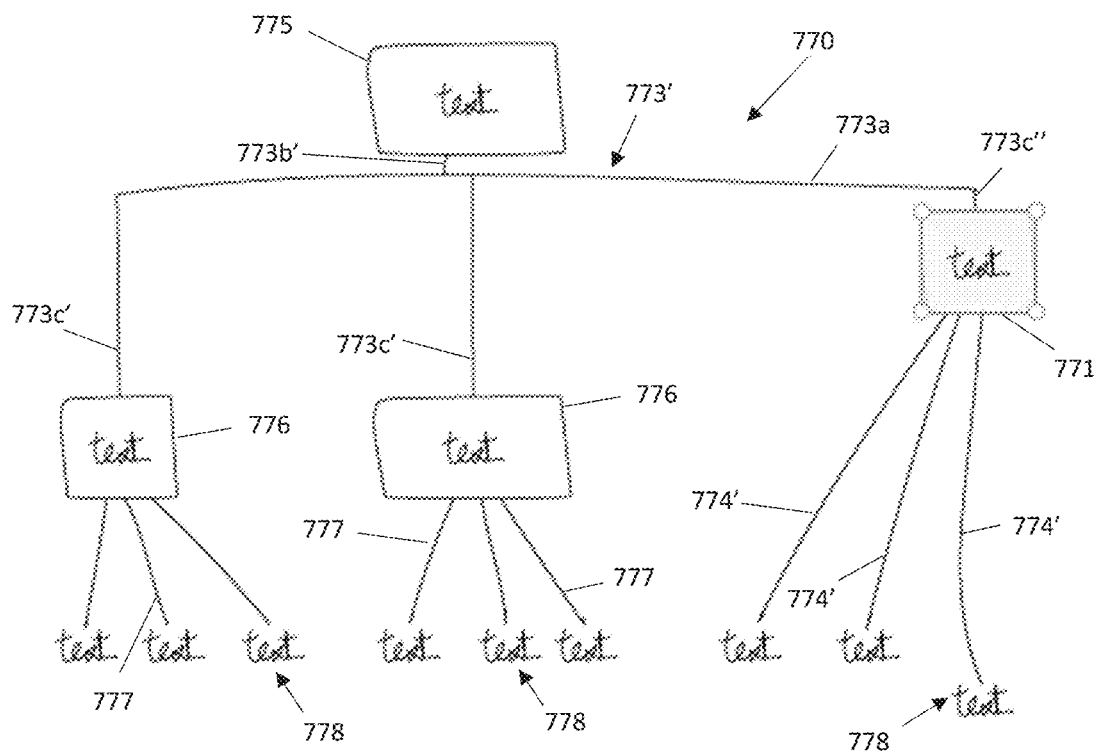

The adjusted display at the completion of the movement operation is shown in FIG. 77B, in which the connectors 773 and 774 are respectively displayed as adjusted connectors 773' and 774'. As can be seen, the straight connectors 774 are adjusted to be lengthened in the manner described above, and the branched connector 773 is adjusted so that the branch 773b is shortened as adjusted branch 773b', the branches 773c connected to the boxes 776 are lengthened as adjusted branches 773c', the branch 773c connected to the moved box 771 is shortened as adjusted branch 773c", and the trunk 773a is retained without adjustment, albeit the relative vertical position of the trunk 773a being moved upwards to accommodate the movement of the box 771 there-beneath. In this way, the hierarchical structure of the hand-drawn chart is respected since the relative positions of the first and second level boxes are retained as are the relative positions of the text blocks of the third level. Alternatively, if the hierarchical structure is not determined as important, the text blocks 778 connected to the moved box 771 via the connectors 774 may be moved with the box 771 by not adjusting the connectors 774, and/or the box 771, and its associated connectors and text blocks, moved above the trunk of the branched connector by not adjusting the relative position of the trunk 773a. Further, the trunk itself may be decreased or increased in length if the move operation causes the boxes to be further or closer to one another.

From these example editing operations on shape and text elements of the diagrams, it is understood that a large range of interactions with the digital ink elements of hand-drawn diagrams is provided by the present system and method, where the effects and outcomes of those interactions are maintained on the digital ink itself. Accordingly, users are provided with consistent control over their hand-drawn content, rather than needing to convert to the typeset version of the diagrams in order to allow editing to be performed.

Returning to the example input, in FIGS. 53A and 53B, a gesture input 1141 is detected as a selection gesture. The gesture 1141 is, for example, a long press on the interface surface 104 of the computing device 100 not on any of the diagram elements. Accordingly, the long press selection gesture is identified by the application 112 as initiating a free-selection mode, e.g., the free-form selection of one or more diagram elements or so-called "lasso" gesture, such that the application 112 expects subsequent operation performed on the selected elements. In response to this identification, a free-selection icon 1142 may be displayed, thereby providing the user with visual feedback of the detection.

Figure 54A:
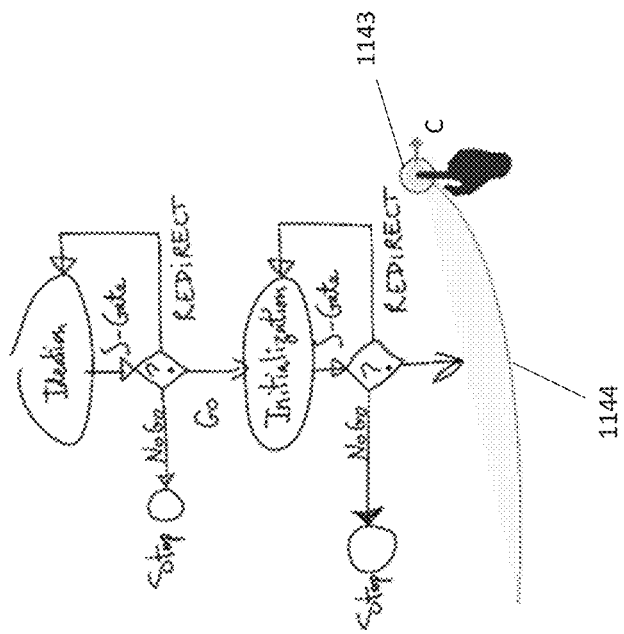
Figures 53B, 54B:
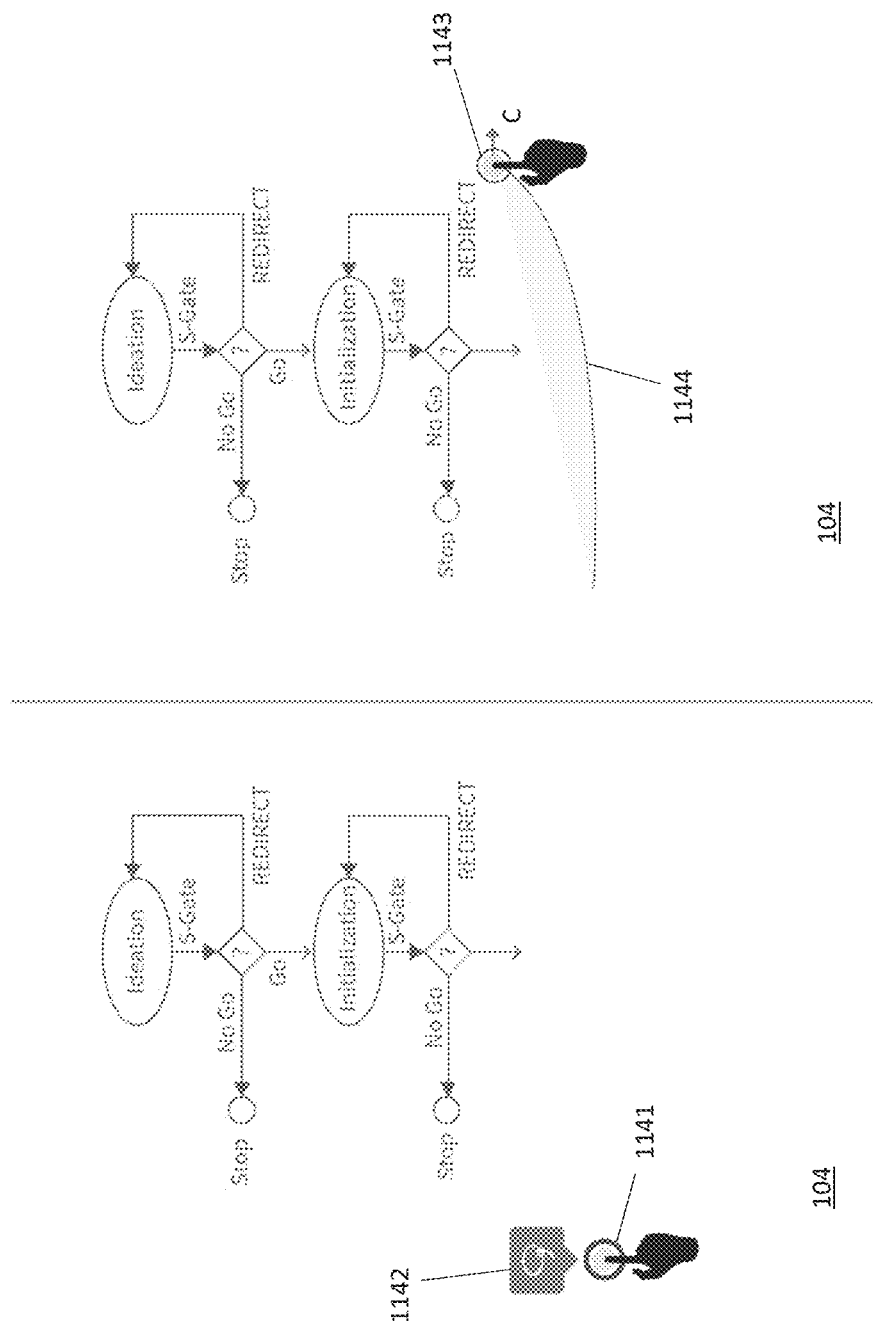

In FIGS. 54A and 54B, a gesture input 1143 is detected as a selection operation in the direction of arrow C. The gesture 1143 is, for example, a slide on the interface surface 104 of the computing device 100 as depicted in FIG. 54. In response to this detection, a selection zone 1144 is displayed with selection mode rendering, thereby providing the user with visual feedback of the detection.

Figures 55A, 56A:
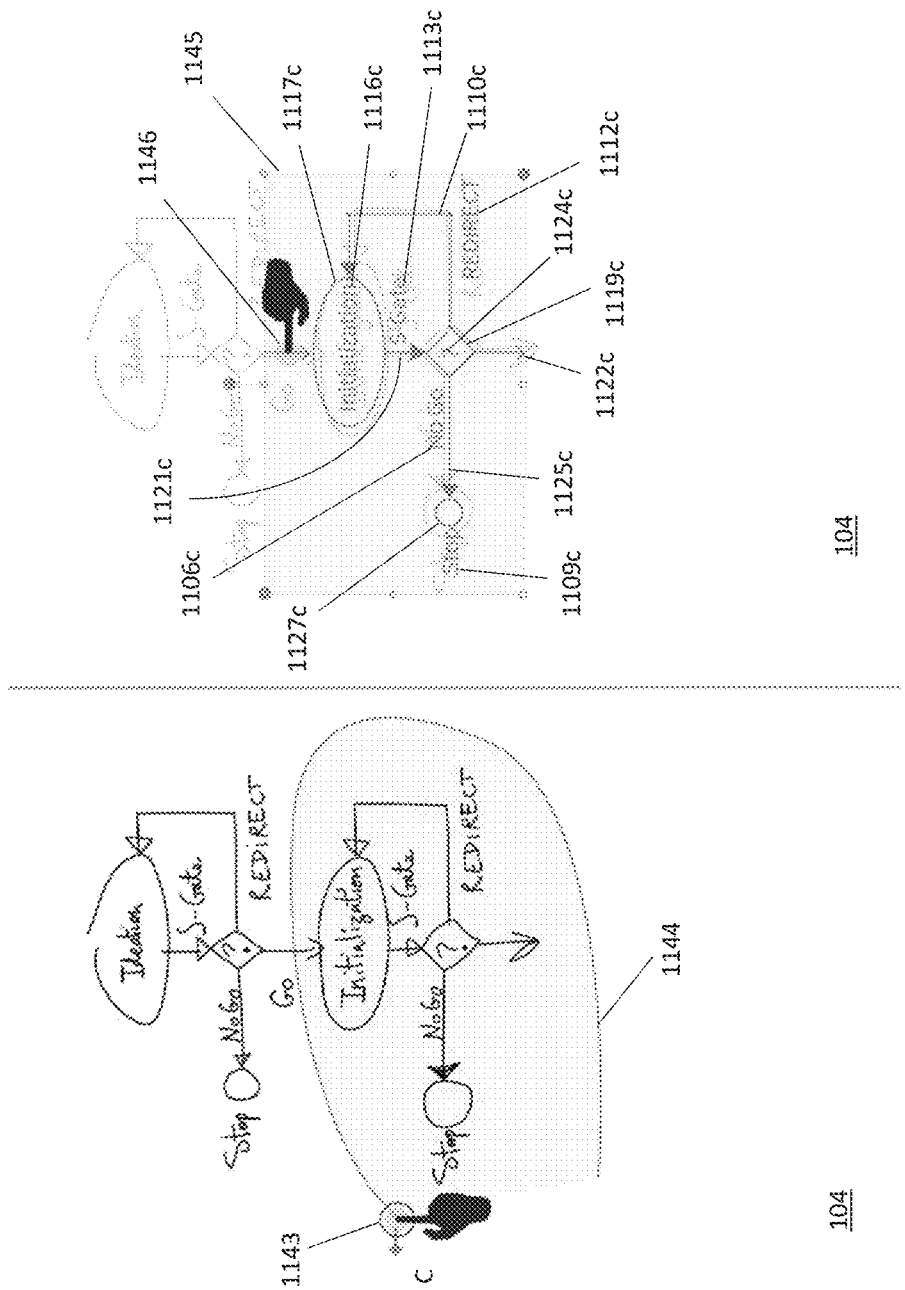

In FIGS. 55A and 55B, continuation of the free-selection gesture 1143 is detected and recognized as extended display of the selection zone 1144.

In FIGS. 56A and 56B, completion of the selection operation is detected due to the free-selection gesture 1143 completing a roughly circular form about certain elements of the diagram 1100 and a selection box 1145 is displayed as a result about the diagram elements within the completed selection zone 1144, namely the respective digital and typeset ink forms of the duplicate text 1106, 1109, 1112 and 1113, the text 1116 and 1124, the duplicate shape 1103, and the shapes 1110, 1114, 1117, 1119, 1122, 1125 and 1129. These selected elements are displayed as selected typeset ink 1103c, 1106c, 1109c, 1110c, 1112c, 1113c, 1114c, 1116c, 1117c, 1119c, 1122c, 1124c, 1125c and 1129c, having the selection mode properties, and the non-selected elements are displayed having the non-selection properties of the multi-selection mode, thereby providing the user with visual feedback of the detection. Accordingly, multiple recognized diagram elements can be quickly selected.

In the example shown in FIG. 56, the free-form selection mode is configured so that both elements that are completely enclosed by the selection zone and also only partially within the selection zone, i.e., the connector arrow 1114, are recognized as selected. Alternatively, the free-form selection mode may be configured so that only those elements that are completely enclosed by the selection zone are recognized as being selected. For the latter case, selection of elements that are partially enclosed for inclusion in the multi-selection can be made by users through selection gestures, such as those described earlier. In any case, in the free-form and multi selection modes, selected elements can be de-selected through the same gestures. For example, in FIGS. 56A and 56B a gesture input 1146 is detected and identified as de-selection of the selected typeset connector 1114c. The gesture 1146 is, for example, a short tap on the interface surface 104 of the computing device 100 on the connector 1114 and within the selection box 1145, as depicted in FIG. 56.

Figure 57A:
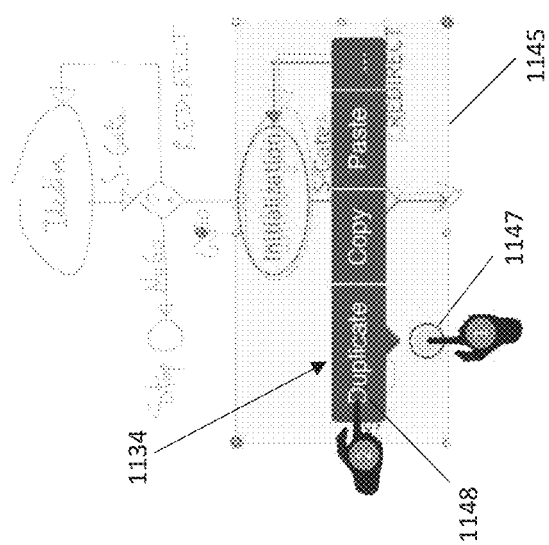
Figure 57B:
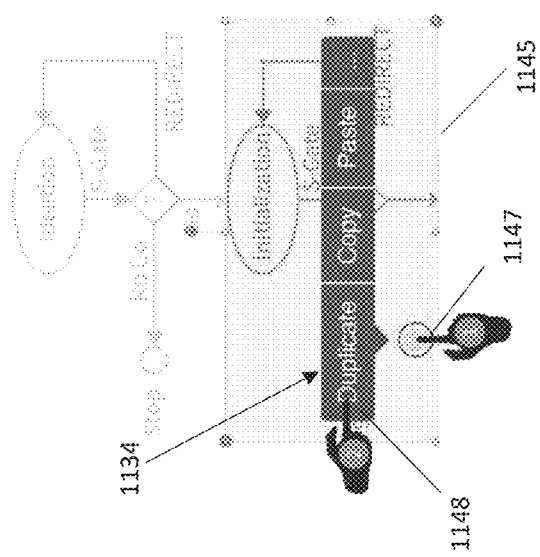

In FIGS. 57A and 57B, the detection result causes the selection mode typeset display of the de-selected connector 1114 to be omitted with display reverting to the respective normal digital and typeset ink and consequential contraction of the selection box 1145 to no longer surround the de-selected connector 1114. Further, a gesture input 1147 is detected as selection of the selection box 1145. The gesture 1147 is, for example, a long tap on the interface surface 104 of the computing device 100 within the selection box 1145 but not on any of the diagram elements therein, as depicted in FIG. 57. In response to this recognized gesture, the application 112 displays the selection menu 1134. A further gesture input 1148 is detected as selection of the Duplicate operation from the menu 1134 causing the selected elements to be duplicated. The duplicate elements are retained in the selection box 1145 in the selected mode rendering with the same positional relationships as the original elements that have been duplicated, however the display of the elements that have been duplicated returns to the normal rendering or reverts to the non-selected rendering, with reduced emphasis, like in FIG. 57. The gesture 1148 is, for example, a press on the interface surface 104 of the computing device 100 as depicted in FIG. 57.

Figure 58A:
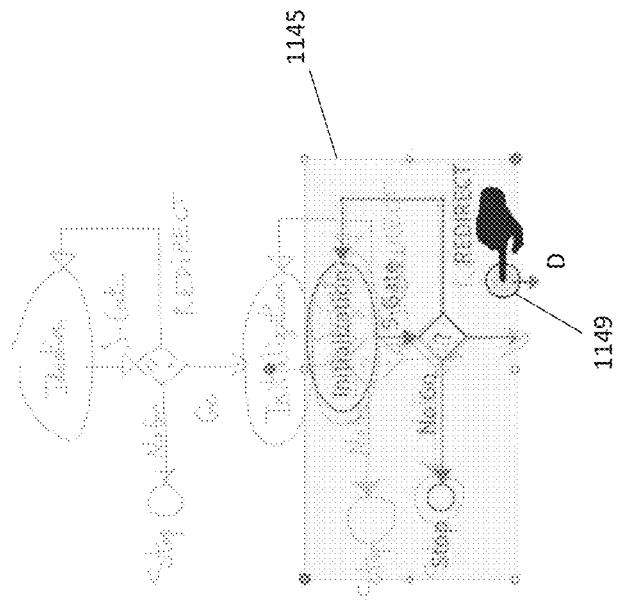
Figure 58B:
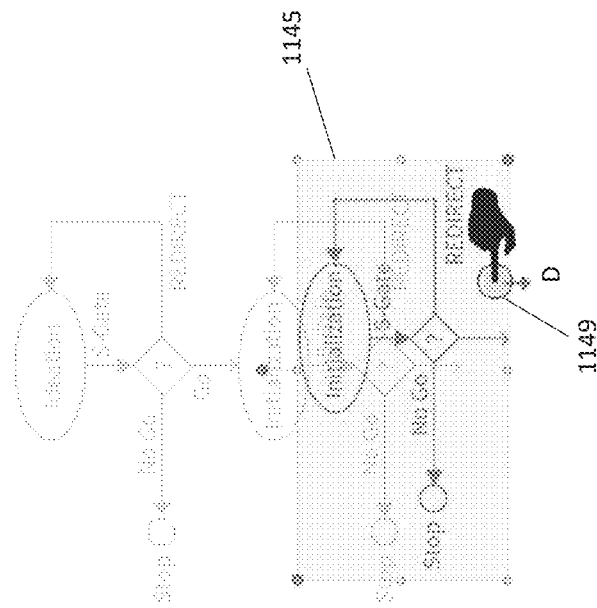

In FIGS. 58A and 58B, a gesture input 1149 is detected and identified as a move operation on the selection box 1145 in the direction of arrow D. The gesture 1149 is, for example, a long tap-and-slide on the interface surface 104 of the computing device 100 within the selection box 1145 but not on any of the diagram elements therein, as depicted in FIG. 58.

Figures 59A, 60A:
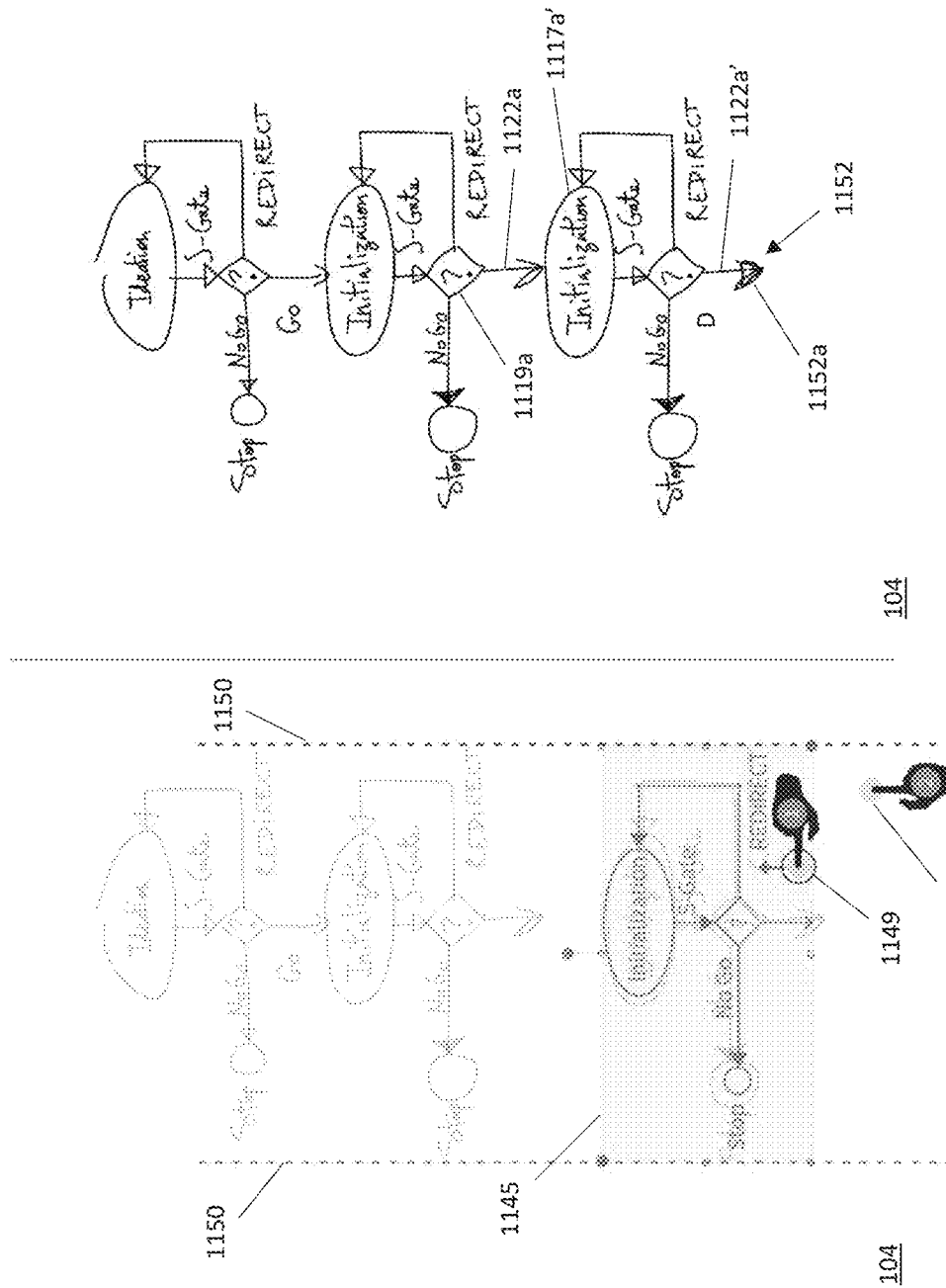

In FIGS. 59A and 59B, the gesture input 1149 is continued to be detected and identified as moving display of the selection box 1145 and the duplicate elements contained therein together with display of alignment guides 1150 as dashed vertical lines along the left and right boundaries of the selection box 1145 and extending there-above and -below. The use, rendering and timing of display of such alignment elements is understood by one of ordinary skill in the art, and may be made with respect to an alignment grid underlying the display interface, which grid may also be used to define one or more extents of the selection box, as shown in FIG. 59. The alignment guides 1150 are provided to guide users in their placement of the moving elements with respect to the non-moving elements of the diagram 1100. For example, in FIG. 59 the move operation on the selection box 1145 by the sliding gesture input 1149 is recognized in the direction of arrow E whereby the user is seeking to position the duplicated elements with respect to the non-selected elements. At completion of the move operation a gesture input 1151 is detected as a de-selection gesture. The gesture 1151 is, for example, a short tap on the interface surface 104 of the computing device 100 outside of the selection box, as shown in FIG. 59.

In FIGS. 60A and 60B, in response to completion of the move operation display of the selection box 1145 is omitted and the selection mode typeset display of the de-selected diagram elements is omitted with display reverting to the respective normal digital and typeset ink, and the display of the other non-selected diagram elements is returned to the respective normal digital and typeset ink. Due to the completed move operation display is made of the duplicate container 1117a positioned adjacent the original arrow 1122 in FIG. 60A and the duplicate typeset ink container 1117b positioned adjacent the original typeset arrow 1122b in FIG. 60B. In this process, the connector status of the original arrow 1122 is affirmed due to its connection between the original container 1119 and the duplicate container 1117.

Further, in FIG. 60A, a hand-drawn shape 1152 input over the open-arrowhead of the duplicate arrow 1122a is displayed as a digital ink shape 1152a. In FIG. 60B, the hand-drawn shape 1152 input over the open-arrowhead of the duplicate typeset arrow 1122b is displayed as the digital ink shape 1152a. The shape 1152 is hand-drawn in a single continuous stroke, detected as non-text and identified as a closed arrowhead due to the characteristics of the shape 1152. As described earlier, this detection of a shape substantially overlaying a previously recognized shape is interpreted by the application 112 as an overwrite gesture.

Accordingly, the overwritten shape is deleted or omitted from display and replaced with the new shape.

Figure 61A:
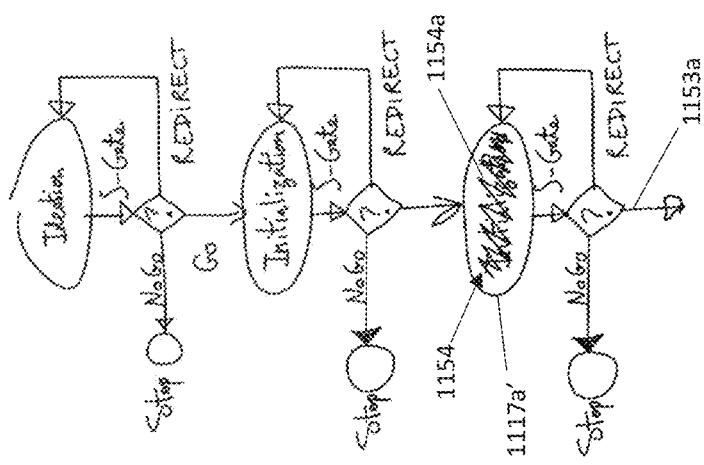

In FIG. 61A, the overwrite causes the open-headed duplicate arrow 1122*a* to be removed from display and display of a closed-headed arrow 1153 as a digital ink closed-headed arrow 1153*a*, with the point of the hand-drawn arrowhead 1152 repositioned on the end of the 'stem' of the duplicate arrow 1122*a*, thereby substantially reforming the open-headed duplicate arrow 1122*a* as a closed-headed arrow. In FIG. 61B, the overwrite causes the typeset open-headed duplicate arrow 1122*b* to be removed from display and display of the closed-headed arrow 1153 as a typeset closed-headed arrow 1153*b*, with the point of the hand-drawn arrowhead 1152 repositioned on the end of the 'stem' of the duplicate typeset arrow 1122*b*, thereby substantially reforming the duplicate open-headed typeset arrow 1122*b* as a closed-headed arrow.

Further, in FIG. 61A, a hand-drawn input 1154 is displayed as digital ink 1154*a* overlaying the duplicate words 1116*a*. In FIG. 61B, the hand-drawn input 1154 is displayed as digital ink 1154*a* overlaying the duplicate typeset words 1116*b*. The input 1154 is detected as a handwritten editing gesture and identified as a scratch-out (erase mark) on the words 1116 contained within the duplicate container 1117. This scratch-out editing operation is interpreted by the application 112 as an erasure of the words 1116.

Figure 62A:
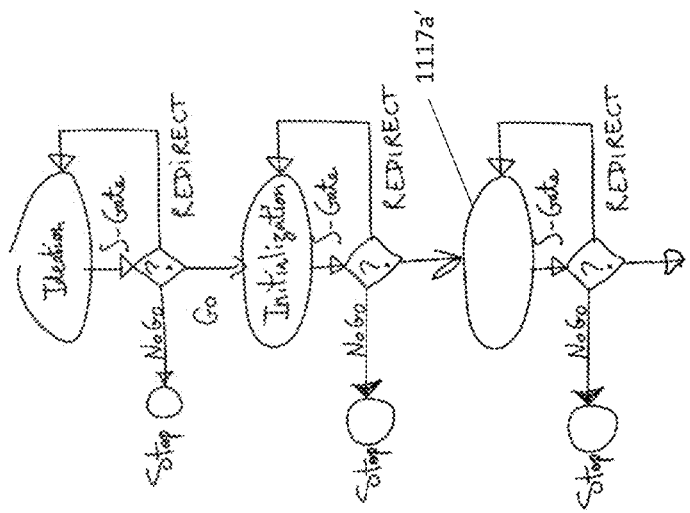
Figures 61B, 62B:
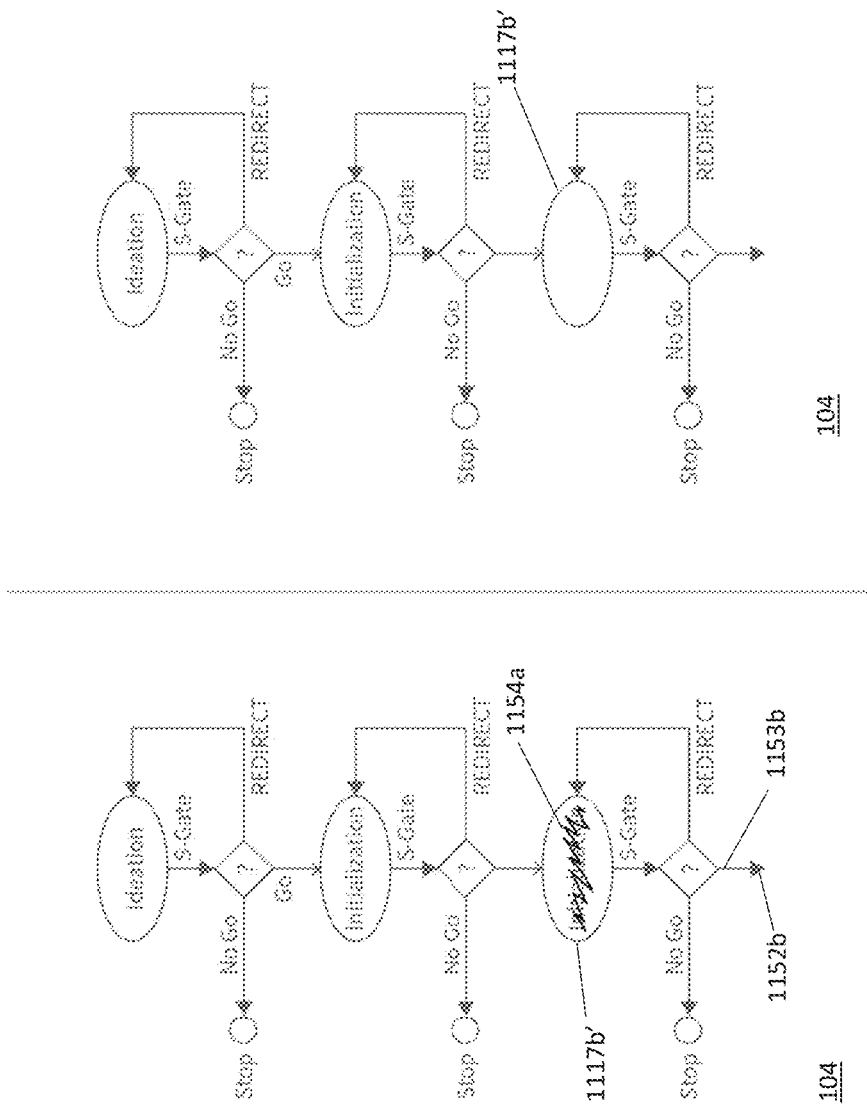
Figure 64A:
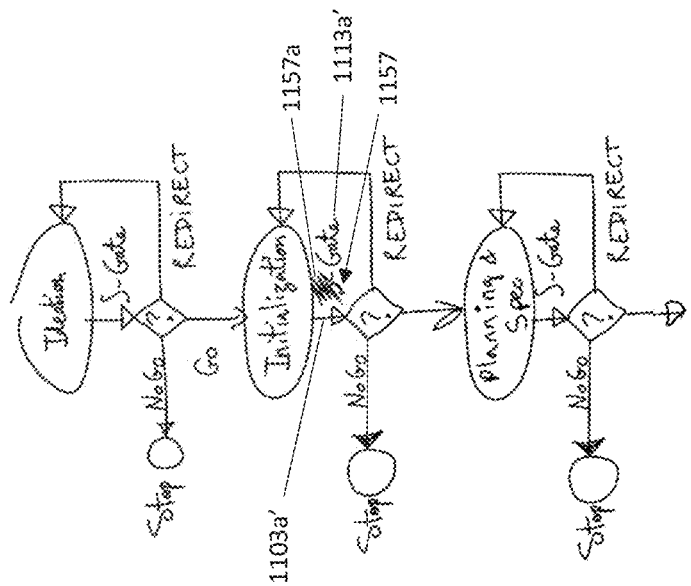
Figure 63A:
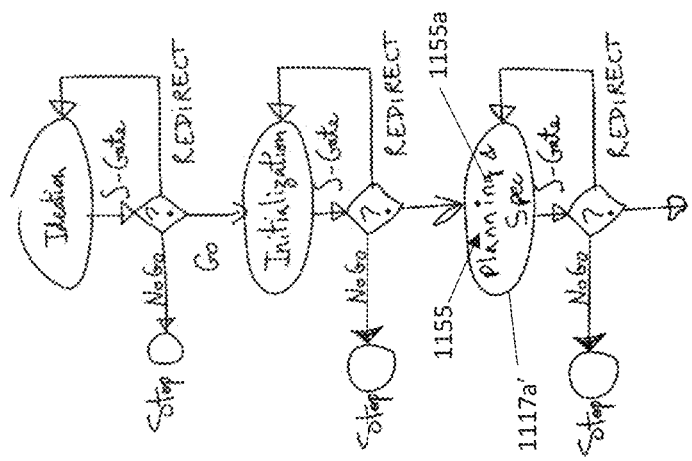
Figures 63B, 64B:
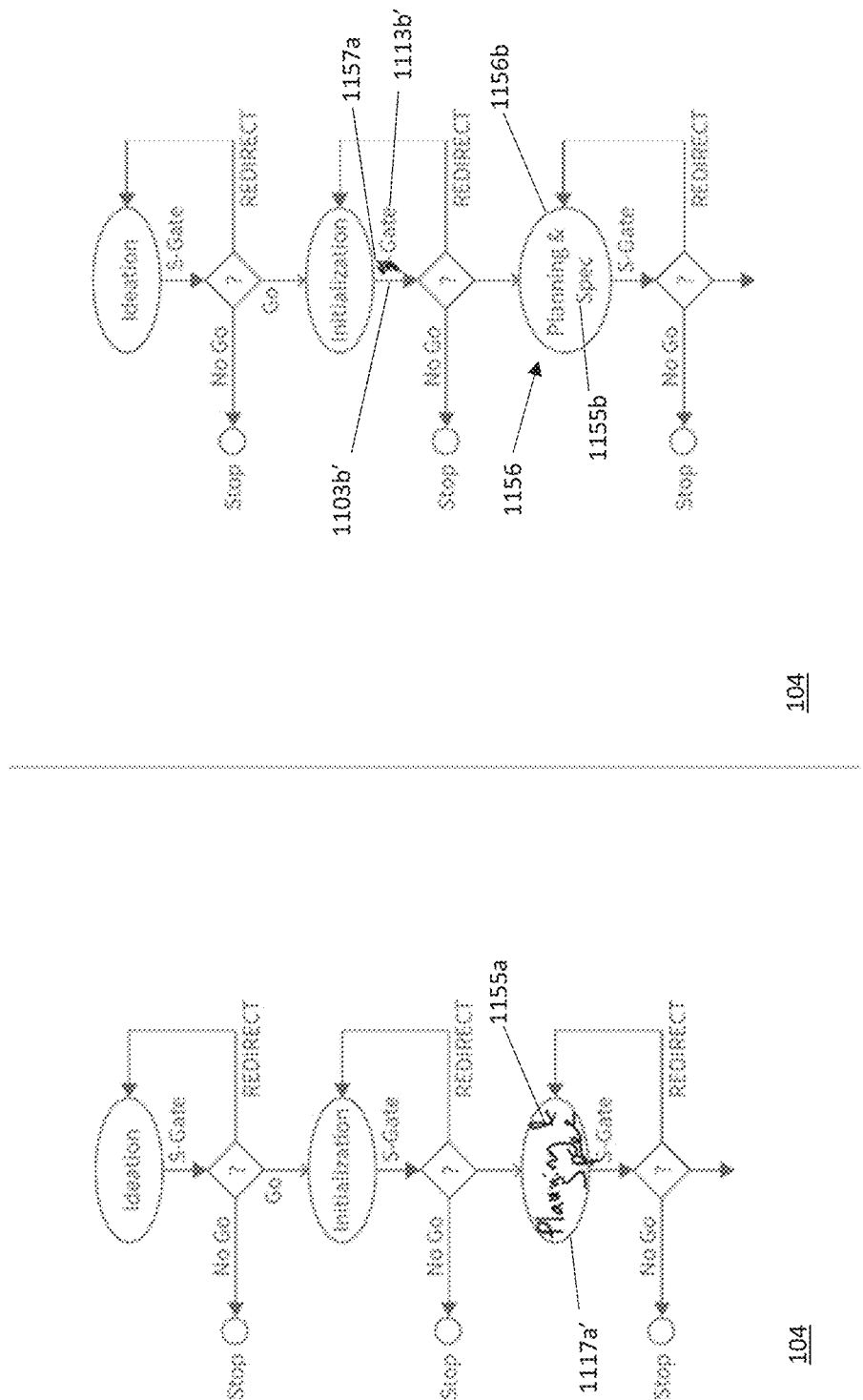

In FIG. 62A, the identified editing operation causes the duplicate words 1116*a* to be removed from display such that the duplicate container 1117*a* is empty. In FIG. 62B, the identified editing operation causes the duplicate typeset words 1116*b* to be removed from display such that the duplicate typeset container 1117*b* is empty In FIG. 63A, handwritten text 1155 input within the duplicate oval 1117*a* is displayed as digital ink text 1155*a*. In FIG. 63B, the handwritten text 1155 input within the duplicate typeset oval 1117*b* is displayed as the digital ink text 1155*a* within the duplicate typeset oval 1117*b*. The text 1155 is detected as text and recognized as the phrase "Planning & Spec", and the duplicate oval 1117 is affirmed as a container which contains the recognized phrase 1155 due to the relative positions and characteristics of the elements 1117 and 1155. In FIG. 63B, it can be seen that the handwritten text 1155*a* is not fully contained in the typeset container 1117*b* due to the typeset size of the container. The application 112 of the present system and method detects that the text 1155 is intended as contained text or a container label, for example, despite some of the handwritten input overlapping the boundaries of the container. This situation may occur also where text or shapes are, or desired to be, written to not completely fit within a digital ink container. These situations are handled however as described in the examples of FIGS. 78 to 83.

Figure 78A:
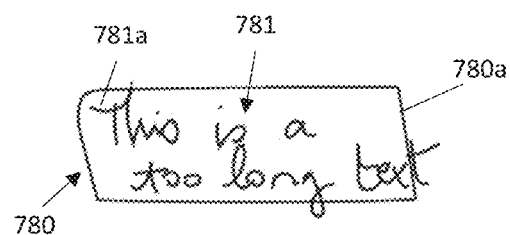
FIGS. 78A and 78B respectively show digital and typeset ink rendering of an example hand-drawn diagram.

FIG. 78 illustrates an example in which text has been handwritten within a container but does not fit within that box. In FIG. 78A, the handwritten input of a shape 780 and text 781 is displayed as a digital ink box 780*a* having digital ink text 781*a* mostly contained therein. The text 781 is detected as text and recognized as the phrase "This is a too long text". The box 780 is detected as non-text and recognized as a rectangle. In order to identify the rectangle 780 as a container containing the recognized phrase 781, the relative positions and characteristics of the inputs 780 and 781 are considered. For example, a pre-set, and settable, spatial threshold is used by the application 112 where comparative metrics of geometric features of the rectangle 780 and the text block 781 relative to that threshold indicate the likelihood of the text block being contained in the rectangle. For example, the distance between the mean centers or barycenters (as described above) of the rectangle 780 and the text block 781 is compared to a distance threshold (as described earlier), or the proportion of overlap of the areas of the rectangle 780 and the text block 781 is compared to an overlap threshold where a high likelihood of containment is indicated when more of the text is written within the potential container than without.

The determination of container status is one consideration and provides reliable and intuitive association of the different diagram elements. Another consideration is the rendered display of the hand-drawn diagram. As explained earlier, the present system and method seeks to perform the minimum amount of automatic manipulation of users' input as possible. However, legibility and sensible display of the input in both digital and typeset ink is supported by implementing a certain degree of refinement, so-called beautification. In FIG. 63, it was seen that a problem occurred with the input of the text 1155 over the typeset container 1117*b* not the digital ink container 1117*a*, due to the typesetting employed by the application 112 during incremental typeset which (slightly) shrinks the digital ink footprint, e.g., the typesetting or fontification results in typeset ink of (slightly) smaller dimensions than the digital ink. A similar issue can occur however if the typesetting enlarges the digital ink footprint, e.g., the typesetting results in typeset ink of (slightly) larger dimensions than the digital ink. The effects of typesetting in this way may be beneficial in other situations however. For example, in FIG. 78B, the recognition result of FIG. 78A is displayed as a typeset phrase 781*b* completely contained within a typeset container 780*b*, unlike the digital ink versions in FIG. 78A.

Figure 80:
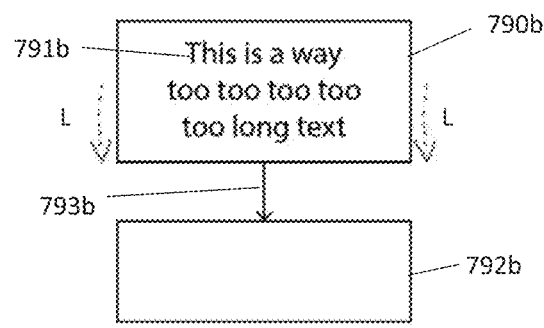
FIG. 80 shows typeset ink rendering of the diagram of FIG. 79 with automatic resizing of the container to contain the text.
Figure 81:
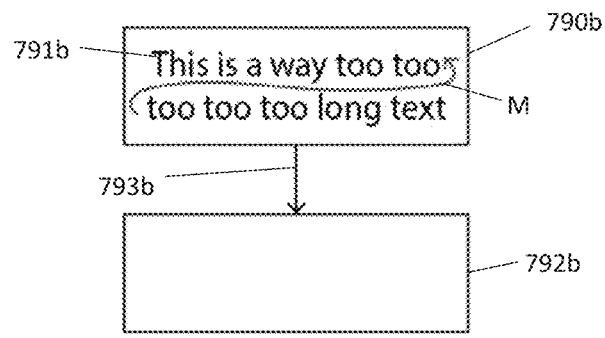
FIG. 81 shows typeset ink rendering of the diagram of FIG. 79 with automatic reflow of the text to be contained in the container.

Beautification can also be carried out on the typeset ink. For example, in FIG. 79, the handwritten input of a shape 790, text 791 and additional shapes 792 and 793 is displayed as a digital ink box 790*a* having digital ink text 791*a* mostly contained therein, and a digital ink box 792*a* with a digital ink arrow 793*a* between the boxes 790 and 792. The text 791 is detected as text and recognized as the phrase "This is a way too too too too too long text". The boxes 790 and 792 and arrow 793 are detected as non-text and recognized as rectangles and an arrow, respectively. Further, the box 790 is identified as a container 790 containing the recognized phrase 791, and the arrow 793 is identified as a connector connecting the container 790 and the rectangle 792. The application 112 however further detects that due to the size of the text block of the text 791 compared to the size of the container 790, e.g., through comparison of the respective geometrical areas, that upon typesetting the typeset text will not fit within the typeset container, which would lead to undesirable rendering. This can be handled, for example, by reducing the size of or changing the type of the font of the typeset text, however this may result in text in different parts of a diagram being of different font size or type (e.g., the present system and method may implement a default, user settable, font style for text) which is undesirable. FIGS. 80 and 81 illustrate different mechanisms for handling this situation automatically, and FIGS. 82 and 83 illustrate manual mechanisms.

In FIG. 80, the vertical extent (i.e., height) of the container 790 is extended by the application 112 along arrows L to be displayed as a typeset container 790*b* containing display of the phrase 791 as a typeset phrase 791*b* completely therein. This is achieved by the application 112 determining the required extent of typeset container to contain the typesetted dimensions of the text. As can be seen, the display of the rectangle 792 and connector 793 as a typeset rectangle 792b and connector 793b is consequentially moved downwards to accommodate the enlarged container 790b. This beautification of the typeset ink therefore provides clean display of the diagram elements whilst retaining the relationships.

Alternatively, in FIG. 81, the container 790 is displayed as a typeset container 790b' without the extension of FIG. 80, and rather the phrase 791 is displayed as a typeset phrase 791b' completely within the non-resized container 790 by reflowing the typeset ink as shown by arrow M. This is achieved by the application 112 determining the relative extent of such reflowed text to the typesetted dimensions of the container. Accordingly, the display of the typeset rectangle 792b and connector 793b is not moved. This beautification of the typeset ink therefore provides clean display of the diagram elements whilst retaining the absolute positions.

Figure 82A:
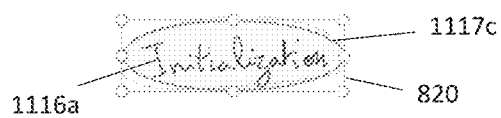
FIG. 82A shows selection mode display of a digital ink shape containing digital ink text.
Figure 82B:
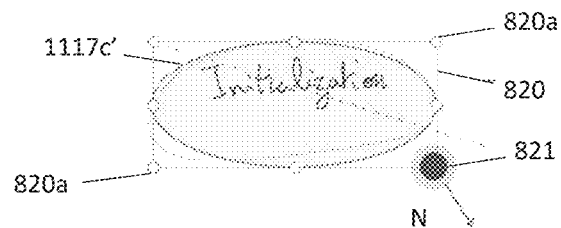
FIG. 82B shows a resizing operation of the selected digital ink shape of FIG. 82A.

Alternatively, or in addition to, the above-described automatic beautification through resizing and reflowing of the typeset ink, the ability to manually beautify input hand-drawn diagrams is also provided by the present system and method. In FIG. 82A, the container 1117 containing the text 1116 is shown in isolation from the diagram 1100 as displayed in selection mode of the container 1117, that is as a selected typeset container 1117c containing the digital ink word 1116a and having a selection box 820 thereabout. In FIG. 82B, a gesture input 821 on a resize handle 820a of the selection box 820 is detected as a move operation on that resize handle 820a in the direction of arrow N. This operation causes resizing of the display of the selected typeset container 1117c as resized selected typeset container 1117c' as depicted in FIG. 82B. However, as can be seen, the non-selected text 1116 is not moved during the resizing of the container 1117. This is because the application 112 defines containers in such a way that the container and its contained contents can be treated independently whilst retaining the container/contained relationship.

Figure 82C:
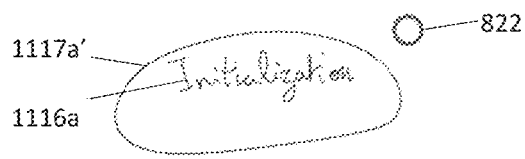
FIG. 82C shows deselection of the resized digital ink shape of FIG. 82B.
Figure 82D:
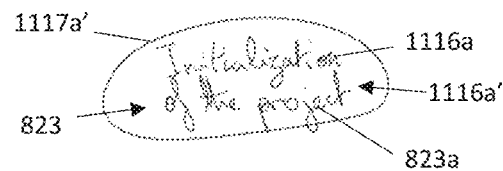
FIG. 82D shows the resized digital ink shape of FIG. 82C containing additional digital ink text.

In FIG. 82C, the detection of a de-selection gesture 822 causes display of the container 1117 as a digital ink container 1117a' which is a resized version of the digital ink container 1117a. In FIG. 82D, handwritten text 823 input within the container 1117a' below the text 1116a is displayed as digital ink text 823a. The application 112 detects that the text 1116 and 823 are related due to the relative positions and characteristics of the inputs 1116, 1117 and 823 (for example, the application 112 uses a pre-set, and settable, spatial threshold where the proximity of the text 1116 and 823 to each other less than the threshold provides a high likelihood of the text belonging to a text block).

Figure 83A:
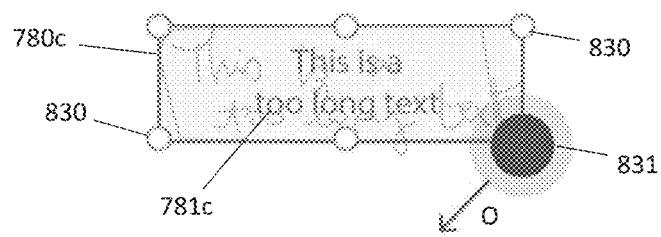
FIG. 83A shows selection mode display of the example hand-drawn diagram of FIG. 78A.

Alternatively, in FIG. 83A, the container 780 and text 781 of FIG. 78A is shown as displayed in selection mode, that is as a selected typeset rectangle 780c containing a selected typeset phrase 781c. As the container 780c is a rectangle it is displayed with selection box handles 830. Further, a gesture input 831 on one of the resize handles 830 is detected as a move operation on that resize handle 830 in the direction of arrow O.

Figure 83B:
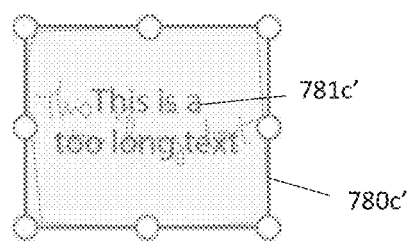
FIG. 83B shows a resizing operation of the selected diagram of FIG. 83A.
Figure 83C:
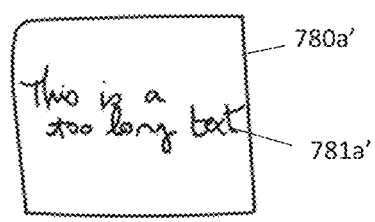
FIG. 83C shows deselection of the resized diagram of FIG. 83B.

In FIG. 83B, the resizing operation causes resizing of the container and its content and display of a selected typeset rectangle 780c' and selected typeset phrase 781c', which is a reflow text block of the text 781. Accordingly, as both the container and the text were selected, the text is moved during the resizing of the container. In FIG. 83C, the de-selected resized elements are displayed as a digital ink container 780a' and digital ink text 781a'.

Figure 84A:
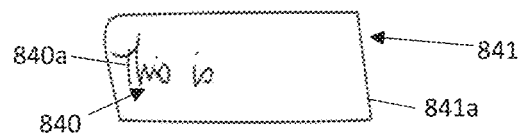
FIGS. 84A and 84B respectively show digital and typeset ink rendering of an example hand-drawn diagram having a container containing text.
Figure 84B:
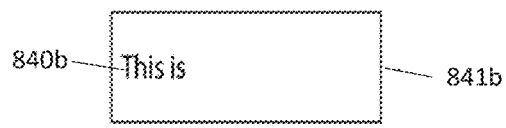
Figure 84C:
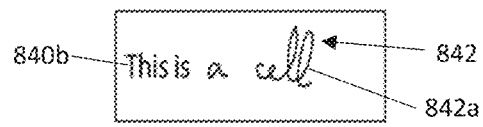
FIGS. 84C and 84D respectively show digital and typeset ink rendering of the diagram of FIGS. 84A and 84B with text added to the container.
Figure 84D:
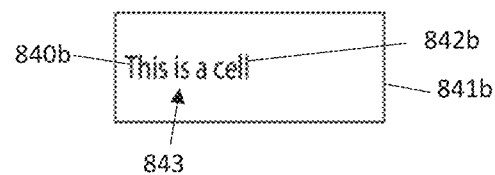

In the example of FIG. 82 handwritten text was added to a container containing digital ink text after resizing of the container. The ability of adding text to a container can however also be performed after typesetting of already contained text, with or without resizing of the container. This can be done in already created diagrams that have been typeset or during incremental typesetting at diagram creation as depicted for the example diagram 1100. An example of the incremental typesetting is illustrated in FIG. 84. In FIG. 84A, handwritten text 840 input within a shape 841 is displayed as digital ink text 840a and a digital ink shape 841a, respectively. The text 840 is detected as text and recognized as the words "This is" and the shape 841 is detected as non-text and recognized as a rectangle. In FIG. 84B, the recognition result is displayed as a typeset rectangle 841b containing typeset words 840b, with the relative positions and dimensions substantially maintained. In FIG. 84C, handwritten text 842 input within the typeset rectangle 841b to the right of the typeset words 840b is displayed as digital ink text 842a. The additional text 842 is detected as text and recognized as the words "a cell". In FIG. 84D, the recognition result is displayed as typeset words 842b, with the relative positions and dimensions of all the elements substantially maintained. As in the example of FIG. 82, the application 112 detects that the text 840 and 842 are related due to the relative positions and characteristics of the inputs 840, 841 and 842, and therefore groups them as text 843 and causes the combined text 840 and 842 to be recognized as a phrase "This is a cell".

Figure 78B:
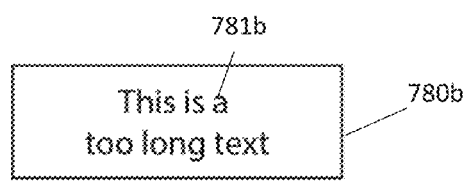
Figure 79:
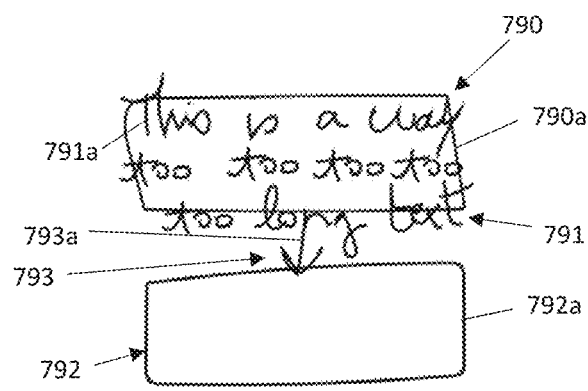
FIG. 79 shows digital ink rendering of an example hand-drawn diagram with text that is too large for a container.
Figure 85A:
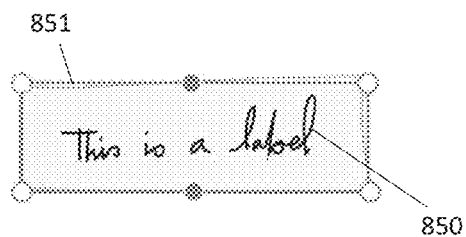
FIG. 85A shows selection mode display of a digital ink cell containing digital ink text.
Figure 85B:
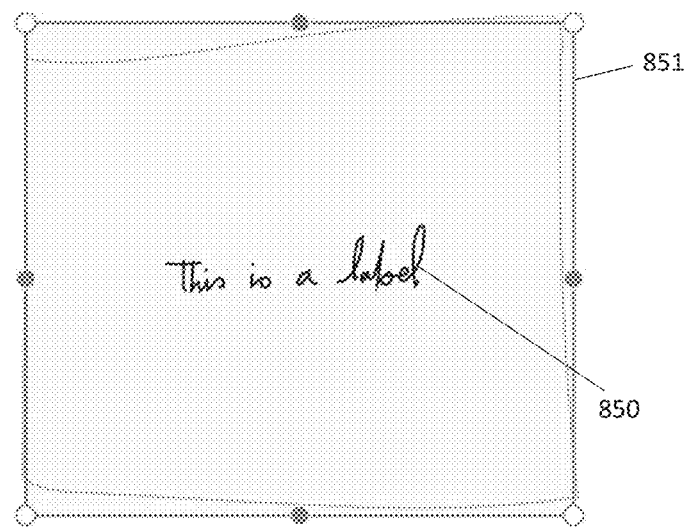
FIG. 85B shows a resizing operation of the selected digital ink cell of FIG. 85A.

In FIG. 84, the typeset text within the container is retained in the same relative position within the container as the digital ink text, namely on the left-hand side or left-justified, despite the availability of space on the right of the text within the container, and therefore respects the user's handwritten input. Alternatively, the present system and method may cause the text position to be adjusted when there is space within the container, such as, centering the text as shown in FIG. 78B, for example. This beautification can be done for either or both typeset and digital ink text, and also for contained shapes, and is provided as a setting for user selection, for example. Generally, such beautification is performed differently for containers and cells, as defined earlier. In particular, for cells which only contain text, the text within the cell may be treated as a label of the cell. Accordingly, the input text is beautified in both digital and typeset ink to be centered (both horizontally and vertically) within the cell, for example. This is illustrated in FIG. 85A, in which a digital ink label 850 is centered in digital ink cell 851. The cell 851 is shown in selection mode and displayed as resized in FIG. 85B in which the digital ink label 850 remains displayed at the center as is defined for cell labels, for example.

Alternatively, such resizing of a cell (e.g., beyond a pre-set, and settable, dimension threshold) may cause the cell to lose its definition as a cell, in which case the contained text is no longer defined as a label in the resized container and is treated as a text block rather than a label, with or without associated beautification. This allows other text blocks and shapes to be easily input into the resized container. Alternatively, or in addition, the loss of cell definition may occur when additional text or shapes are hand-drawn within the resized (or originally drawn sized) cell in a manner in which the application 112 does not automatically link the text to the (beautified) text label (e.g., the added text is without the afore-described threshold used for relating text). The opposite conditions may be used to re-classify containers as cells.

Figure 86A:
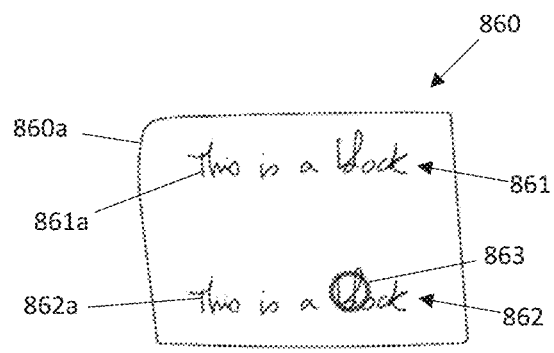
FIG. 86A shows digital ink rendering of an example hand-drawn diagram having a container containing two text blocks.
Figure 86B:
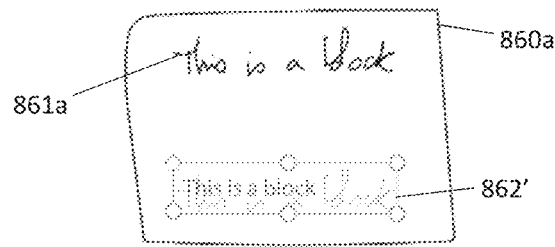
FIG. 86B shows the diagram of FIG. 86A with selection mode display of the second text block.
Figure 86C:
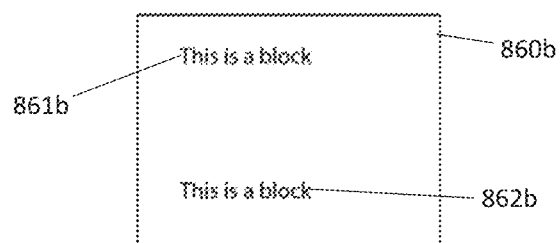
FIG. 86C shows typeset ink rendering of the diagram of FIG. 86A.

FIG. 86 illustrates an example of plural text blocks within a container. In FIG. 86A, an input shape 860 with text 861 and 862 therein is displayed as a digital ink container 860a containing digital ink text 861*a* and digital ink text 862*a*. Upon detection of a selection gesture 863 the text block 862 is displayed in selection mode as selected typeset text block 862' in FIG. 86B. This illustrates that the text 861 and 862 are identified as being individual text blocks in the container. In FIG. 86C, the input 860, 861 and 862 have been typeset and are displayed as a typeset container 860*b* and typeset text blocks 861*b* and 862*b*.

Returning to the example input, in FIG. 64B, the recognition result is displayed as a typeset phrase 1155*b* and the duplicate typeset container 1117*b* automatically resized as a container 1156 containing the typeset phrase 1155*b* displayed as a typeset oval container 1156*b*, with the automatic resizing carried out as discussed above in relation to FIG. 80. Further, in FIG. 64A, a hand-drawn input 1157 is displayed as digital ink 1157*a* overlaying a part of the duplicate term 1113*a*. In FIG. 64B, the hand-drawn input 1157 is displayed as the digital ink 1157*a* overlaying a part of the duplicate typeset term 1113*b*. The input 1157 is detected as a handwritten editing gesture and identified as a scratch-out on part of the duplicate label 1113 on the duplicate connector 1103. This scratch-out editing operation is interpreted by the application 112 as an erasure of the character "S" in "S-Gate" of the duplicate term 1113.

Figure 66A:
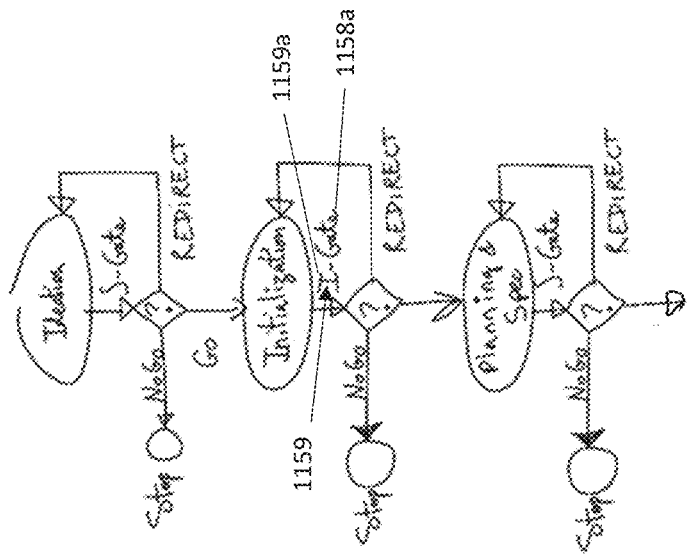
Figure 65A:
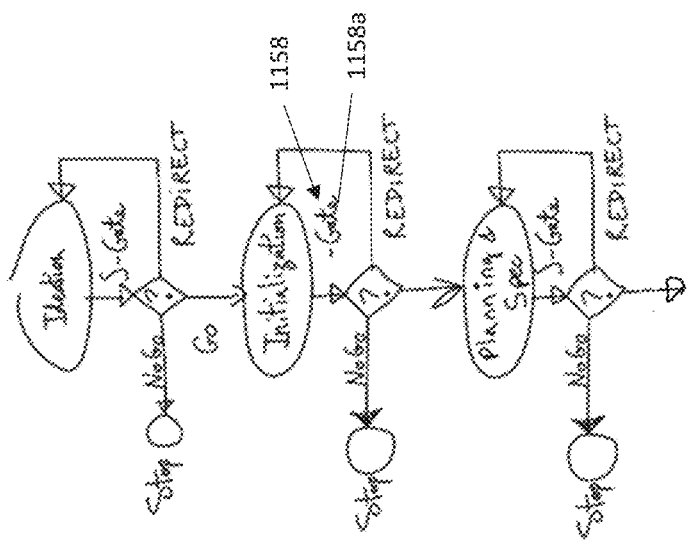
Figures 65B, 66B:
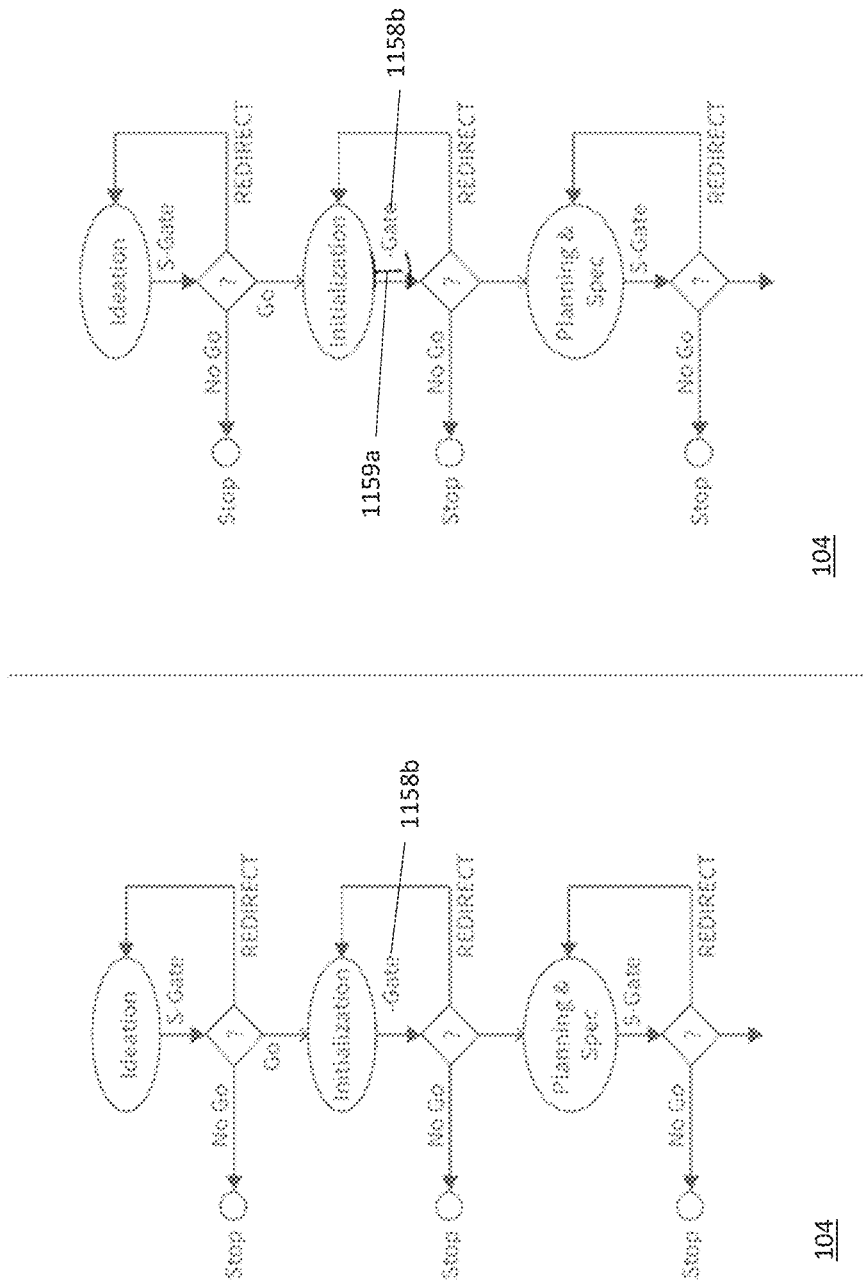

In FIGS. 65A and 65B, the erase operation causes the duplicate term 1113*a* and typeset term 1113*b*, respectively, to be removed from display and display of a term 1158 respectively as a digital ink term 1158*a* and a typeset term 1158*b*, namely "-Gate".

In FIG. 66, handwritten text 1159 input to the left of the text 1158*a* is displayed as digital ink text 1159*a*. In FIG. 66B, the handwritten text 1159 input to the left of the typeset text 1158*b* is displayed as the digital ink text 1159*a*. The text 1159 is detected as text and recognized as the character "I". The text 1159 is recognized as being associated with the text of the label 1157 due to their relative positions and characteristics, e.g., both are text objects, such that the term "I-Gate" is recognized.

In FIG. 67, the recognition result causes the typeset term 1158*b* to be removed from display and display of a term 1160 as typeset term 1160*b*, namely "I-Gate". Upon the detection of further minor inputs similar in nature to those already described, the fully typeset version of the diagram 1100 shown in FIG. 11B is provided by the application 112.

The application 112 provided by the present system and method faithfully allows display of handwritten diagrams in both digital ink and typeset ink forms. The hand-drawn elements are identified, their content recognized using handwriting recognition, and their spatial and context relationships detected, independent of the type of diagram created and the order of drawing of the elements. The diagrams can be edited in both digital ink and typeset ink forms using handwritten and computing device gestures.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for hand-drawing diagrams including text and non-text elements on a computing device, the computing device comprising a processor and at least one non-transitory computer readable medium for detecting and recognizing hand-drawing diagram element input under control of the processor, the at least one non-transitory computer readable medium configured to:
   cause display of a plurality of input diagram elements in interactive digital ink on a display device associated with the computing device, wherein the diagram elements comprise one or more of a geometric shape, a container, a connector, or text;
   incrementally associate one or more of the diagram elements with one or more other of the diagram elements in accordance with a class and type of each diagram element;
   identify the class of each diagram element by classifying one or more strokes of the hand-drawn input as selected from a group consisting of text, non-text, and junk classifications for each of the one or more strokes; and
   incrementally cause re-display of the diagram elements, wherein a display characteristic of a diagram element is influenced based on one or more received interactions with the digital ink, the one or more incremental associations, and a position of the one or more interactions relative to the incrementally associated diagram elements.

2. A system as claimed in claim 1, wherein the strokes are grouped based on spatial and temporal information of the input.

3. A system as claimed in claim 1, wherein the class of each diagram element is identified by classifying the one or more strokes of the hand-drawn input as text and non-text.

4. A system as claimed in claim 1, the at least one non-transitory computer readable medium configured to:
   parse the classified strokes to a handwriting recognition system for recognition of the diagram elements of the classified strokes.

5. A system as claimed in claim 4, the at least one non-transitory computer readable medium configured to:
   identify the type of each diagram element based on the recognized diagram elements and positional relationships between the diagram elements.

6. A system as claimed in claim 1, wherein the display characteristic comprises at least one of resizing or repositioning one or more diagram elements.

7. A method for hand-drawing diagrams including text and non-text elements on a computing device, the computing device comprising a processor and at least one non-transitory computer readable medium for detecting and recognizing hand-drawing diagram element input under control of the processor, the method comprising:
   displaying a plurality of input diagram elements in interactive digital ink on a display device associated with the computing device, wherein the diagram elements comprise one or more of a geometric shape, a container, a connector, or text;
   incrementally associating one or more of the diagram elements with one or more other of the diagram elements in accordance with a class and type of each diagram element;
   identifying the class of each diagram element by classifying one or more strokes of the hand-drawn input as selected from a group consisting of text, non-text, and junk classifications for each of the one or more strokes; and incrementally re-displaying the diagram elements, wherein a display characteristic of a diagram element is influenced based one or more received interactions with the digital ink, the one or more incremental associations, and a position of the one or more interactions relative to the incrementally associated diagram elements.

8. A method as claimed in claim 7, wherein the strokes are grouped based on spatial and temporal information of the input.

9. A method as claimed in claim 7, wherein the class of each diagram element is identified by classifying the one or more strokes of the hand-drawn input as text and non-text.

10. A method as claimed in claim 7, comprising parsing the classified strokes to a handwriting recognition system for recognition of the diagram elements of the classified strokes.

11. A method as claimed in claim 10, comprising identifying the type of each diagram element based on the recognized diagram elements and positional relationships between the diagram elements.

12. A non-transitory computer readable medium having a computer readable program code embodied therein, said computer readable program code adapted to be executed to implement a method for hand-drawing diagrams including text and non-text elements on a computing device, the computing device comprising a processor and at least one non-transitory computer readable medium for detecting and recognizing hand-drawing diagram element input under control of the processor, the method comprising:

displaying a plurality of input diagram elements in interactive digital ink on a display device associated with the computing device, wherein the diagram elements comprise one or more of a geometric shape, a container, a connector, or text;

incrementally associating one or more of the diagram elements with one or more other of the diagram elements in accordance with a class and type of each diagram element;

identifying the class of each diagram element by classifying one or more strokes of the hand-drawn input as selected from a group consisting of text, non-text, and junk classifications for each of the one or more strokes; and incrementally re-displaying the diagram elements, wherein a display characteristic of a diagram element is influenced based on one or more received interactions with the digital ink, the one or more incremental associations, and a position of the one or more interactions relative to the incrementally associated diagram elements.

13. A non-transitory computer readable medium as claimed in claim 12, wherein the strokes are grouped based on spatial and temporal information of the input.

14. A non-transitory computer readable medium as claimed in claim 12, wherein the class of each diagram element is identified by classifying the one or more strokes of the hand-drawn input as text and non-text.

15. A non-transitory computer readable medium as claimed in claim 12, the method comprising parsing the classified strokes to a handwriting recognition system for recognition of the diagram elements of the classified strokes.

16. A non-transitory computer readable medium as claimed in claim 15, the method comprising identifying the type of each diagram element based on the recognized diagram elements and positional relationships between the diagram elements.

* * * * *